United States Patent
Roach et al.

(10) Patent No.: US 12,020,496 B2
(45) Date of Patent: *Jun. 25, 2024

(54) SYSTEMS AND METHODS FOR MOBILE AUTOMATED CLEARING HOUSE ENROLLMENT

(71) Applicant: MITEK SYSTEMS, INC., San Diego, CA (US)

(72) Inventors: John J. Roach, San Diego, CA (US); Grisha Nepomniachtchi, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,865

(22) Filed: Feb. 5, 2023

(65) Prior Publication Data

US 2023/0290166 A1  Sep. 14, 2023

Related U.S. Application Data

(63) Continuation of application No. 17/751,346, filed on May 23, 2022, now Pat. No. 11,599,861, which is a (Continued)

(51) Int. Cl.
*G06V 30/146* (2022.01)
*G06Q 20/02* (2012.01)
(Continued)

(52) U.S. Cl.
CPC ....... *G06V 30/1475* (2022.01); *G06Q 20/023* (2013.01); *G06Q 20/042* (2013.01);
(Continued)

(58) Field of Classification Search
None
See application file for complete search history.

(56) References Cited

U.S. PATENT DOCUMENTS

| 4,311,914 A | 1/1982 | Huber |
| 5,326,959 A | 7/1994 | Perazza |

(Continued)

FOREIGN PATENT DOCUMENTS

| CA | 2773730 A1 | 4/2012 |
| KR | 1020040076131 A | 8/2004 |

(Continued)

OTHER PUBLICATIONS

"OCR: The Most Important Scanning Feature You Never Knew You Needed." hp (blog), Feb. 24, 2012. Accessed May 13, 2015. http://h71036.www7.hp.com/hho/cache/608037-0-0-39-121.html.
(Continued)

*Primary Examiner* — Jason M. Borlinghaus
(74) *Attorney, Agent, or Firm* — Procopio, Cory, Hargreaves & Savitch LLP

(57) ABSTRACT

Systems and methods for mobile enrollment in automated clearing house (ACH) transactions using mobile-captured images of financial documents are provided. Applications running on a mobile device provide for the capture and processing of images of documents needed for enrollment in an ACH transaction, such as a blank check, remittance statement and driver's license. Data from the mobile-captured images that is needed for enrolling in ACH transactions is extracted from the processed images, such as a user's name, address, bank account number and bank routing number. The user can edit the extracted data, select the type of document that is being captured, authorize the creation of an ACH transaction and select an originator of the ACH transaction. The extracted data and originator information is transmitted to a remote server along with the user's authorization so the ACH transaction can be setup between the originator's and receiver's bank accounts.

19 Claims, 53 Drawing Sheets

Mobile Device Processing

Related U.S. Application Data continuation of application No. 16/691,378, filed on Nov. 21, 2019, now Pat. No. 11,341,469, which is a continuation of application No. 13/526,532, filed on Jun. 19, 2012, now Pat. No. 10,528,925, which is a continuation-in-part of application No. 12/906,036, filed on Oct. 15, 2010, now Pat. No. 8,577,118, which is a continuation-in-part of application No. 12/778,943, filed on May 12, 2010, now Pat. No. 8,582,862, and a continuation-in-part of application No. 12/346,026, filed on Dec. 30, 2008, now Pat. No. 7,978,900.

(60) Provisional application No. 61/022,279, filed on Jan. 18, 2008.

(51) Int. Cl.
  *G06Q 20/04*      (2012.01)
  *G06Q 20/10*      (2012.01)
  *G06Q 20/32*      (2012.01)
  *G06V 10/24*      (2022.01)
  *G06V 10/28*      (2022.01)
  *G06V 10/32*      (2022.01)
  *G06V 30/10*      (2022.01)
  *G06V 30/162*     (2022.01)
  *G06V 30/166*     (2022.01)
  *H04N 1/00*       (2006.01)
  *H04N 101/00*     (2006.01)

(52) U.S. Cl.
  CPC ......... *G06Q 20/045* (2013.01); *G06Q 20/10* (2013.01); *G06Q 20/3223* (2013.01); *G06Q 20/3276* (2013.01); *G06V 10/243* (2022.01); *G06V 10/28* (2022.01); *G06V 10/32* (2022.01); *G06V 30/162* (2022.01); *G06V 30/166* (2022.01); *G06V 30/10* (2022.01); *H04N 1/00244* (2013.01); *H04N 1/00307* (2013.01); *H04N 2101/00* (2013.01); *H04N 2201/001* (2013.01); *H04N 2201/0084* (2013.01)

(56) References Cited

U.S. PATENT DOCUMENTS

| | | |
|---|---|---|
| 5,600,732 A | 2/1997 | Ott et al. |
| 5,751,841 A | 5/1998 | Leong et al. |
| 5,761,686 A | 6/1998 | Bloomberg |
| 5,920,847 A | 7/1999 | Kolling et al. |
| 5,966,473 A | 10/1999 | Takahashi et al. |
| 5,999,636 A | 12/1999 | Juang |
| 6,038,351 A | 3/2000 | Rigakos |
| 6,038,553 A | 3/2000 | Hyde, Jr. |
| 6,070,150 A | 5/2000 | Remington et al. |
| 6,125,362 A | 9/2000 | Elworthy |
| 6,282,326 B1 | 8/2001 | Lee et al. |
| 6,304,684 B1 | 10/2001 | Niczyporuk et al. |
| 6,345,130 B1 | 2/2002 | Dahl |
| 6,408,094 B1 | 6/2002 | Mirzaoff et al. |
| 6,516,078 B1 | 2/2003 | Yang et al. |
| 6,621,919 B2 | 9/2003 | Mennie et al. |
| 6,735,341 B1 | 5/2004 | Horie et al. |
| 6,807,294 B2 | 10/2004 | Yamazaki |
| 6,947,610 B2 | 9/2005 | Sun |
| 6,985,631 B2 | 1/2006 | Zhang |
| 6,993,205 B1 | 1/2006 | Lorie et al. |
| 7,020,320 B2 | 3/2006 | Filatov |
| 7,072,862 B1 | 7/2006 | Wilson |
| 7,133,558 B1 | 11/2006 | Ohara et al. |
| 7,245,765 B2 | 7/2007 | Myers et al. |
| 7,283,656 B2 | 10/2007 | Blake et al. |
| 7,301,564 B2 | 11/2007 | Fan |
| 7,331,523 B2 | 2/2008 | Meier et al. |
| 7,376,258 B2 | 5/2008 | Klein et al. |
| 7,377,425 B1 | 5/2008 | Ma et al. |
| 7,426,316 B2 | 9/2008 | Vehvilinen |
| 7,433,098 B2 | 10/2008 | Klein et al. |
| 7,478,066 B2 | 1/2009 | Remington et al. |
| 7,548,641 B2 | 6/2009 | Gilson et al. |
| 7,558,418 B2 | 7/2009 | Verma et al. |
| 7,584,128 B2 | 9/2009 | Mason et al. |
| 7,593,595 B2 | 9/2009 | Heaney, Jr. et al. |
| 7,606,741 B2 | 10/2009 | King et al. |
| 7,636,483 B2 | 12/2009 | Yamaguchi et al. |
| 7,735,721 B1 | 6/2010 | Ma et al. |
| 7,778,457 B2 | 8/2010 | Nepomniachtchi et al. |
| 7,793,831 B2 | 9/2010 | Beskitt |
| 7,793,835 B1 | 9/2010 | Coggeshall et al. |
| 7,817,854 B2 | 10/2010 | Taylor |
| 7,869,098 B2 | 1/2011 | Corso et al. |
| 7,873,200 B1 | 1/2011 | Oakes, III et al. |
| 7,876,949 B1 | 1/2011 | Oakes, III et al. |
| 7,949,176 B2 | 5/2011 | Nepomniachtchi |
| 7,950,698 B2 | 5/2011 | Popadic et al. |
| 7,953,268 B2 | 5/2011 | Nepomniachtchi |
| 7,974,899 B1 | 7/2011 | Prasad et al. |
| 7,978,900 B2 | 7/2011 | Nepomniachtchi et al. |
| 7,982,770 B1 | 7/2011 | Kahn et al. |
| 7,983,468 B2 | 7/2011 | Ibikunle et al. |
| 7,986,346 B2 | 7/2011 | Kaneda et al. |
| 7,995,196 B1 | 8/2011 | Fraser |
| 7,996,317 B1 | 8/2011 | Gurz |
| 8,000,514 B2 | 8/2011 | Nepomniachtchi et al. |
| 8,023,155 B2 | 9/2011 | Jiang |
| 8,025,226 B1 | 9/2011 | Hopkins, III et al. |
| 8,109,436 B1 | 2/2012 | Hopkins, III |
| 8,118,216 B2 | 2/2012 | Hoch et al. |
| 8,121,948 B2 | 2/2012 | Gustin et al. |
| 8,126,252 B2 | 2/2012 | Abernethy et al. |
| 8,160,149 B2 | 4/2012 | Demos |
| 8,180,137 B2 | 5/2012 | Faulkner et al. |
| 8,233,714 B2 | 7/2012 | Zuev et al. |
| 8,238,638 B2 | 8/2012 | Mueller et al. |
| 8,290,237 B1 | 10/2012 | Burks et al. |
| 8,300,917 B2 | 10/2012 | Borgia et al. |
| 8,320,657 B1 | 11/2012 | Burks et al. |
| 8,326,015 B2 | 12/2012 | Nepomniachtchi |
| 8,339,642 B2 | 12/2012 | Ono |
| 8,340,452 B2 | 12/2012 | Marchesotti |
| 8,358,826 B1 | 1/2013 | Medina, III et al. |
| 8,370,254 B1 | 2/2013 | Hopkins, III et al. |
| 8,374,383 B2 | 2/2013 | Long et al. |
| 8,379,914 B2 | 2/2013 | Nepomniachtchi et al. |
| 8,442,844 B1 | 5/2013 | Trandal et al. |
| 8,532,419 B2 | 9/2013 | Coleman |
| 8,538,124 B1 | 9/2013 | Harpel et al. |
| 8,540,158 B2 | 9/2013 | Lei et al. |
| 8,542,921 B1 | 9/2013 | Medina |
| 8,559,766 B2 | 10/2013 | Tilt et al. |
| 8,582,862 B2 | 11/2013 | Nepomniachtchi et al. |
| 8,688,579 B1 | 4/2014 | Ethington et al. |
| 8,699,779 B1 | 4/2014 | Prasad et al. |
| 8,837,833 B1 | 9/2014 | Wang et al. |
| 8,861,883 B2 | 10/2014 | Tanaka |
| 8,879,783 B1 | 11/2014 | Wang et al. |
| 8,959,033 B1 | 2/2015 | Oakes, III et al. |
| 8,977,571 B1 | 3/2015 | Bueche, Jr. et al. |
| 9,058,512 B1 | 6/2015 | Medina, III |
| 9,208,393 B2 | 12/2015 | Kotovich et al. |
| 9,460,141 B1 | 10/2016 | Coman |
| 9,613,258 B2 | 4/2017 | Chen et al. |
| 9,679,214 B2 | 6/2017 | Kotovich et al. |
| 9,710,702 B2 | 7/2017 | Nepomniachtchi et al. |
| 9,773,186 B2 | 9/2017 | Nepomniachtchi et al. |
| 9,786,011 B1 | 10/2017 | Engelhorn et al. |
| 9,842,331 B2 | 12/2017 | Nepomniachtchi et al. |
| 10,095,947 B2 | 10/2018 | Nepomniachtchi et al. |
| 10,102,583 B2 | 10/2018 | Strange |
| 10,275,673 B2 | 4/2019 | Kotovich et al. |
| 10,360,447 B2 | 7/2019 | Nepomniachtchi et al. |
| 10,373,136 B1 | 8/2019 | Pollack et al. |
| 10,452,908 B1 | 10/2019 | Ramanathan et al. |

(56) References Cited

U.S. PATENT DOCUMENTS

| | | |
|---|---|---|
| 10,546,206 B2 | 1/2020 | Nepomniachtchi et al. |
| 10,621,660 B1 | 4/2020 | Medina et al. |
| 10,789,496 B2 | 9/2020 | Kotovich et al. |
| 10,789,501 B2 | 9/2020 | Nepomniachtchi et al. |
| 10,891,475 B2 | 1/2021 | Nepomniachtchi et al. |
| 10,909,362 B2 | 2/2021 | Nepomniachtchi et al. |
| 11,157,731 B2 | 10/2021 | Nepomniachtchi et al. |
| 11,380,113 B2 | 7/2022 | Nepomniachtchi et al. |
| 11,393,272 B2 | 7/2022 | Kriegsfeld et al. |
| 2001/0014183 A1 | 8/2001 | Sansom-Wai et al. |
| 2001/0016084 A1 | 8/2001 | Pollard et al. |
| 2001/0019334 A1 | 9/2001 | Carrai et al. |
| 2001/0019664 A1 | 9/2001 | Pilu |
| 2001/0044899 A1 | 11/2001 | Levy |
| 2002/0003896 A1 | 1/2002 | Yamazaki |
| 2002/0012462 A1 | 1/2002 | Fujiwara |
| 2002/0023055 A1 | 2/2002 | Antognini et al. |
| 2002/0037097 A1 | 3/2002 | Hoyos et al. |
| 2002/0041717 A1 | 4/2002 | Murata et al. |
| 2002/0044689 A1 | 4/2002 | Roustaei et al. |
| 2002/0046341 A1 | 4/2002 | Kazaks et al. |
| 2002/0067846 A1 | 6/2002 | Foley |
| 2002/0073044 A1 | 6/2002 | Singhal |
| 2002/0077976 A1 | 6/2002 | Meyer et al. |
| 2002/0080013 A1 | 6/2002 | Anderson, III et al. |
| 2002/0085745 A1 | 7/2002 | Jones et al. |
| 2002/0120846 A1 | 8/2002 | Stewart et al. |
| 2002/0128967 A1 | 9/2002 | Meyer et al. |
| 2002/0138351 A1 | 9/2002 | Houvener et al. |
| 2002/0143804 A1 | 10/2002 | Dowdy |
| 2002/0150279 A1 | 10/2002 | Scott et al. |
| 2003/0009420 A1 | 1/2003 | Jones |
| 2003/0072568 A1 | 4/2003 | Lin et al. |
| 2003/0086615 A1 | 5/2003 | Dance et al. |
| 2003/0099379 A1 | 5/2003 | Monk et al. |
| 2003/0099401 A1 | 5/2003 | Driggs et al. |
| 2003/0156201 A1 | 8/2003 | Zhang |
| 2003/0161523 A1 | 8/2003 | Moon et al. |
| 2003/0177100 A1 | 9/2003 | Filatov |
| 2004/0012679 A1 | 1/2004 | Fan |
| 2004/0017947 A1 | 1/2004 | Yang |
| 2004/0024769 A1 | 2/2004 | Forman et al. |
| 2004/0037448 A1 | 2/2004 | Brundage |
| 2004/0081332 A1 | 4/2004 | Tuttle et al. |
| 2004/0109597 A1 | 6/2004 | Lugg |
| 2004/0205474 A1 | 10/2004 | Eskin et al. |
| 2004/0213434 A1 | 10/2004 | Emerson et al. |
| 2004/0213437 A1 | 10/2004 | Howard et al. |
| 2004/0218799 A1 | 11/2004 | Mastie et al. |
| 2004/0236688 A1 | 11/2004 | Bozeman |
| 2004/0236690 A1 | 11/2004 | Bogosian et al. |
| 2004/0247168 A1 | 12/2004 | Pintsov et al. |
| 2005/0011957 A1 | 1/2005 | Attia et al. |
| 2005/0065893 A1 | 3/2005 | Josephson |
| 2005/0071283 A1 | 3/2005 | Randle et al. |
| 2005/0080698 A1 | 4/2005 | Perg et al. |
| 2005/0091161 A1 | 4/2005 | Gustin et al. |
| 2005/0097046 A1 | 5/2005 | Singfield |
| 2005/0100216 A1 | 5/2005 | Myers et al. |
| 2005/0125295 A1 | 6/2005 | Tidwell et al. |
| 2005/0129300 A1 | 6/2005 | Sandison et al. |
| 2005/0141028 A1 | 6/2005 | Koppich |
| 2005/0143136 A1 | 6/2005 | Lev et al. |
| 2005/0163362 A1 | 7/2005 | Jones et al. |
| 2005/0180661 A1 | 8/2005 | El Bernoussi et al. |
| 2005/0192897 A1 | 9/2005 | Rogers et al. |
| 2005/0196069 A1 | 9/2005 | Yonaha |
| 2005/0196071 A1 | 9/2005 | Prakash et al. |
| 2005/0213805 A1 | 9/2005 | Blake et al. |
| 2005/0219367 A1 | 10/2005 | Kanda et al. |
| 2005/0220324 A1 | 10/2005 | Klein et al. |
| 2005/0229010 A1 | 10/2005 | Monk et al. |
| 2005/0242186 A1 | 11/2005 | Ohbuchi |
| 2005/0261990 A1 | 11/2005 | Gocht et al. |
| 2006/0008167 A1 | 1/2006 | Yu et al. |
| 2006/0008267 A1 | 1/2006 | Kim |
| 2006/0012699 A1 | 1/2006 | Miki |
| 2006/0039629 A1 | 2/2006 | Li et al. |
| 2006/0045322 A1 | 3/2006 | Clarke et al. |
| 2006/0045342 A1 | 3/2006 | Kim et al. |
| 2006/0045344 A1 | 3/2006 | Paxton et al. |
| 2006/0045379 A1 | 3/2006 | Heaney et al. |
| 2006/0071950 A1 | 4/2006 | Kurzweil et al. |
| 2006/0072822 A1 | 4/2006 | Hatzav et al. |
| 2006/0088214 A1 | 4/2006 | Handley et al. |
| 2006/0106717 A1 | 5/2006 | Randle et al. |
| 2006/0140504 A1 | 6/2006 | Fujimoto et al. |
| 2006/0164682 A1 | 7/2006 | Lev |
| 2006/0177118 A1 | 8/2006 | Ibikunle et al. |
| 2006/0182331 A1 | 8/2006 | Gilson et al. |
| 2006/0186194 A1 | 8/2006 | Richardson et al. |
| 2006/0210192 A1 | 9/2006 | Orhun |
| 2006/0221415 A1 | 10/2006 | Kawamoto |
| 2006/0242063 A1 | 10/2006 | Peterson et al. |
| 2006/0280354 A1 | 12/2006 | Murray |
| 2006/0291727 A1 | 12/2006 | Bargeron |
| 2007/0009155 A1 | 1/2007 | Potts et al. |
| 2007/0053574 A1 | 3/2007 | Verma et al. |
| 2007/0058851 A1 | 3/2007 | Quine et al. |
| 2007/0064991 A1 | 3/2007 | Douglas et al. |
| 2007/0071324 A1 | 3/2007 | Thakur |
| 2007/0076940 A1 | 4/2007 | Goodall et al. |
| 2007/0081796 A1 | 4/2007 | Fredlund et al. |
| 2007/0084911 A1 | 4/2007 | Crowell |
| 2007/0086642 A1 | 4/2007 | Foth et al. |
| 2007/0086643 A1 | 4/2007 | Spier et al. |
| 2007/0110277 A1 | 5/2007 | Hayduchok et al. |
| 2007/0114785 A1 | 5/2007 | Porter |
| 2007/0118391 A1 | 5/2007 | Malaney et al. |
| 2007/0131759 A1 | 6/2007 | Cox et al. |
| 2007/0140678 A1 | 6/2007 | Yost et al. |
| 2007/0154071 A1 | 7/2007 | Lin et al. |
| 2007/0156438 A1 | 7/2007 | Popadic et al. |
| 2007/0168382 A1 | 7/2007 | Tillberg et al. |
| 2007/0171288 A1 | 7/2007 | Inoue et al. |
| 2007/0174214 A1 | 7/2007 | Welsh et al. |
| 2007/0195174 A1 | 8/2007 | Oren |
| 2007/0206877 A1 | 9/2007 | Wu et al. |
| 2007/0211964 A1 | 9/2007 | Agam et al. |
| 2007/0214078 A1 | 9/2007 | Coppinger |
| 2007/0244782 A1 | 10/2007 | Chimento |
| 2007/0265887 A1 | 11/2007 | Mclaughlin et al. |
| 2007/0288382 A1* | 12/2007 | Narayanan .............. G06Q 20/04 705/45 |
| 2007/0297664 A1 | 12/2007 | Blaikie |
| 2008/0010215 A1 | 1/2008 | Rackley, III et al. |
| 2008/0031543 A1 | 2/2008 | Nakajima et al. |
| 2008/0040259 A1 | 2/2008 | Snow et al. |
| 2008/0040280 A1 | 2/2008 | Davis et al. |
| 2008/0062437 A1 | 3/2008 | Rizzo |
| 2008/0086420 A1 | 4/2008 | Gilder et al. |
| 2008/0089573 A1 | 4/2008 | Mori et al. |
| 2008/0128505 A1 | 6/2008 | Challa et al. |
| 2008/0152238 A1 | 6/2008 | Sarkar |
| 2008/0174815 A1 | 7/2008 | Komaki |
| 2008/0183576 A1 | 7/2008 | Kim et al. |
| 2008/0192129 A1 | 8/2008 | Walker et al. |
| 2008/0193020 A1 | 8/2008 | Sibiryakov et al. |
| 2008/0212901 A1 | 9/2008 | Castiglia et al. |
| 2008/0231714 A1 | 9/2008 | Estevez et al. |
| 2008/0235263 A1 | 9/2008 | Riaz et al. |
| 2008/0247629 A1 | 10/2008 | Gilder et al. |
| 2008/0249931 A1 | 10/2008 | Gilder et al. |
| 2008/0249936 A1 | 10/2008 | Miller et al. |
| 2008/0267510 A1 | 10/2008 | Paul et al. |
| 2008/0306787 A1 | 12/2008 | Hamilton et al. |
| 2009/0041377 A1 | 2/2009 | Edgar |
| 2009/0063431 A1 | 3/2009 | Erol et al. |
| 2009/0092322 A1 | 4/2009 | Erol et al. |
| 2009/0108080 A1 | 4/2009 | Meyer et al. |
| 2009/0114716 A1 | 5/2009 | Ramachandran |
| 2009/0125510 A1 | 5/2009 | Graham et al. |
| 2009/0141962 A1 | 6/2009 | Borgia et al. |
| 2009/0159659 A1 | 6/2009 | Norris et al. |

(56) References Cited

U.S. PATENT DOCUMENTS

| | | |
|---|---|---|
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0185752 A1 | 7/2009 | Dwivedula et al. |
| 2009/0190830 A1 | 7/2009 | Hasegawa |
| 2009/0196485 A1 | 8/2009 | Mueller et al. |
| 2009/0198493 A1 | 8/2009 | Hakkani-Tur et al. |
| 2009/0201541 A1 | 8/2009 | Neogi et al. |
| 2009/0216672 A1 | 8/2009 | Zulf |
| 2009/0261158 A1 | 10/2009 | Lawson |
| 2009/0265134 A1 | 10/2009 | Sambasivan et al. |
| 2009/0271287 A1 | 10/2009 | Halpern |
| 2009/0285444 A1 | 11/2009 | Erol et al. |
| 2010/0030524 A1 | 2/2010 | Warren |
| 2010/0037059 A1 | 2/2010 | Sun et al. |
| 2010/0038839 A1 | 2/2010 | Dewitt et al. |
| 2010/0073735 A1 | 3/2010 | Hunt et al. |
| 2010/0074547 A1 | 3/2010 | Yu et al. |
| 2010/0080471 A1 | 4/2010 | Haas et al. |
| 2010/0082470 A1 | 4/2010 | Walach et al. |
| 2010/0102119 A1 | 4/2010 | Gustin et al. |
| 2010/0104171 A1 | 4/2010 | Faulkner et al. |
| 2010/0114765 A1 | 5/2010 | Gustin et al. |
| 2010/0114766 A1 | 5/2010 | Gustin et al. |
| 2010/0114771 A1 | 5/2010 | Gustin et al. |
| 2010/0114772 A1 | 5/2010 | Gustin et al. |
| 2010/0150424 A1 | 6/2010 | Nepomniachtchi et al. |
| 2010/0161466 A1 | 6/2010 | Gilder |
| 2010/0200660 A1 | 8/2010 | Moed et al. |
| 2010/0208282 A1 | 8/2010 | Isaev |
| 2010/0239160 A1 | 9/2010 | Enomoto et al. |
| 2010/0246972 A1 | 9/2010 | Koyama et al. |
| 2010/0253787 A1 | 10/2010 | Grant |
| 2010/0254604 A1 | 10/2010 | Prabhakara et al. |
| 2010/0284611 A1 | 11/2010 | Lee et al. |
| 2011/0013822 A1 | 1/2011 | Blackson et al. |
| 2011/0026810 A1 | 2/2011 | Hu |
| 2011/0052065 A1 | 3/2011 | Nepomniachtchi et al. |
| 2011/0075936 A1 | 3/2011 | Deaver |
| 2011/0081051 A1 | 4/2011 | Tayal et al. |
| 2011/0091092 A1 | 4/2011 | Nepomniachtchi et al. |
| 2011/0134248 A1 | 6/2011 | Heit et al. |
| 2011/0170740 A1 | 7/2011 | Coleman |
| 2011/0188759 A1 | 8/2011 | Filimonova et al. |
| 2011/0194750 A1 | 8/2011 | Nepomniachtchi |
| 2011/0249905 A1 | 10/2011 | Singh et al. |
| 2011/0255795 A1 | 10/2011 | Nakamura |
| 2011/0280450 A1 | 11/2011 | Nepomniachtchi et al. |
| 2011/0289028 A1 | 11/2011 | Sato |
| 2012/0010885 A1 | 1/2012 | Hakkani-Tr et al. |
| 2012/0023567 A1 | 1/2012 | Hammad |
| 2012/0030104 A1 | 2/2012 | Huff et al. |
| 2012/0033892 A1 | 2/2012 | Blenkhorn et al. |
| 2012/0051649 A1 | 3/2012 | Saund et al. |
| 2012/0070062 A1 | 3/2012 | Houle et al. |
| 2012/0072859 A1 | 3/2012 | Wang et al. |
| 2012/0086989 A1 | 4/2012 | Collins et al. |
| 2012/0106802 A1 | 5/2012 | Isieh et al. |
| 2012/0109792 A1 | 5/2012 | Eftekhari et al. |
| 2012/0113489 A1 | 5/2012 | Heit et al. |
| 2012/0150773 A1 | 6/2012 | Dicorpo et al. |
| 2012/0197640 A1 | 8/2012 | Hakkani-Tr et al. |
| 2012/0201416 A1 | 8/2012 | Dewitt et al. |
| 2012/0226600 A1 | 9/2012 | Dolev |
| 2012/0230577 A1 | 9/2012 | Calman et al. |
| 2012/0265655 A1 | 10/2012 | Stroh |
| 2012/0278336 A1 | 11/2012 | Malik et al. |
| 2012/0308139 A1 | 12/2012 | Dhir |
| 2013/0004076 A1 | 1/2013 | Koo et al. |
| 2013/0022231 A1 | 1/2013 | Nepomniachtchi et al. |
| 2013/0051610 A1 | 2/2013 | Roach et al. |
| 2013/0058531 A1 | 3/2013 | Hedley et al. |
| 2013/0085935 A1 | 4/2013 | Nepomniachtchi et al. |
| 2013/0120595 A1 | 5/2013 | Roach et al. |
| 2013/0148862 A1 | 6/2013 | Roach et al. |
| 2013/0155474 A1 | 6/2013 | Roach et al. |
| 2013/0181054 A1 | 7/2013 | Durham et al. |
| 2013/0182002 A1 | 7/2013 | Macciola et al. |
| 2013/0182951 A1 | 7/2013 | Shustorovich et al. |
| 2013/0182973 A1 | 7/2013 | Macciola et al. |
| 2013/0202185 A1 | 8/2013 | Irwin, Jr. et al. |
| 2013/0204777 A1 | 8/2013 | Irwin, Jr. et al. |
| 2013/0223721 A1 | 8/2013 | Nepomniachtchi et al. |
| 2013/0272607 A1 | 10/2013 | Chattopadhyay et al. |
| 2013/0297353 A1 | 11/2013 | Strange et al. |
| 2013/0311362 A1 | 11/2013 | Milam et al. |
| 2013/0317865 A1 | 11/2013 | Tofte et al. |
| 2013/0325706 A1 | 12/2013 | Wilson et al. |
| 2014/0032406 A1 | 1/2014 | Roach et al. |
| 2014/0037183 A1 | 2/2014 | Gorski et al. |
| 2014/0040141 A1 | 2/2014 | Gauvin et al. |
| 2014/0044303 A1 | 2/2014 | Chakraborti |
| 2014/0046841 A1 | 2/2014 | Gauvin et al. |
| 2014/0064621 A1 | 3/2014 | Reese et al. |
| 2014/0108456 A1 | 4/2014 | Ramachandrula et al. |
| 2014/0126790 A1 | 5/2014 | Duchesne et al. |
| 2014/0133767 A1 | 5/2014 | Lund et al. |
| 2014/0172467 A1 | 6/2014 | He et al. |
| 2014/0188715 A1 | 7/2014 | Barlok et al. |
| 2014/0233837 A1 | 8/2014 | Sandoz et al. |
| 2014/0254887 A1 | 9/2014 | Amtrup et al. |
| 2014/0258838 A1 | 9/2014 | Evers et al. |
| 2014/0270540 A1 | 9/2014 | Spector et al. |
| 2014/0281871 A1 | 9/2014 | Brunner et al. |
| 2014/0307959 A1 | 10/2014 | Filimonova et al. |
| 2015/0012382 A1 | 1/2015 | Ceribelli et al. |
| 2015/0012442 A1 | 1/2015 | Ceribelli et al. |
| 2015/0040001 A1 | 2/2015 | Kannan et al. |
| 2015/0142545 A1 | 5/2015 | Ceribelli et al. |
| 2015/0142643 A1 | 5/2015 | Ceribelli et al. |
| 2015/0334184 A1 | 11/2015 | Liverance |
| 2016/0092730 A1 | 3/2016 | Smirnov et al. |
| 2017/0185972 A1 | 6/2017 | Bozeman |
| 2017/0316263 A1 | 11/2017 | Nepomniachtchi et al. |
| 2018/0101751 A1 | 4/2018 | Ghosh et al. |
| 2018/0101836 A1 | 4/2018 | Nepomniachtchi et al. |
| 2018/0240081 A1 | 8/2018 | Doyle et al. |
| 2020/0304650 A1 | 9/2020 | Roach et al. |
| 2020/0342248 A1 | 10/2020 | Nepomniachtchi et al. |
| 2021/0090372 A1 | 3/2021 | Kriegsfeld et al. |
| 2022/0351161 A1 | 11/2022 | Roach et al. |

FOREIGN PATENT DOCUMENTS

| | | |
|---|---|---|
| KR | 20070115834 A | 12/2007 |
| WO | 03069425 A2 | 8/2003 |
| WO | 2006075967 A1 | 7/2006 |
| WO | 2006136958 A2 | 12/2006 |
| WO | 2012144957 A1 | 10/2012 |

OTHER PUBLICATIONS

Abdulkader et al. "Low Cost Correction of OCR Errors Using Learning in a Multi-Engine Environment." Proceedings of the 10th International Conference on Document Analysis and Recognition (ICDAR '09). IEEE Computer Society, Washington, D.C., USA. Pages 576-580. http://dx.doi.org/10.1109/ICDAR.2009.24.

Bassil, Youssef. "OCR Post-Processing Error Correction Algorithm Using Google's Online Spelling Suggestion." Journal of Emergin Trends in Computing and Information Sciences 3, No. 1 (Jan. 2012): 1. Accessed May 13, 2015. http://arxiv.org/ftp/arxiv/papers/1204/1204.0191.pdf.

Bienieki et al. "Image preprocessing for improving OCR accuracy." Perspective Technologies and Methods in MEMS Design, 2007. International Conference on MEMSTECH 2007. IEEE, 2007.

Chattopadhyay et al. "On the Enhancement and Binarization of Mobile Captured Vehicle Identification Number for an Embedded Solution." 10th IAPR International Workshop on Document Analysis Systems (DAS), 2012. pp. 235-239. Mar. 27-29, 2012.

(56) References Cited

OTHER PUBLICATIONS

Cook, John. "Three Algorithms for Converting Color to Grayscale." Singular Value Consulting. Aug. 24, 2009. Accessed May 13, 2015. http://www.johndcook.com/blog/2009/08/24/algorithms-convert-color-grayscale/.

Gatos et al. "Improved Document Image Binarization by Using a Combination of Multiple Binarization Techniques and Adapted Edge Information." 19th International Conference on Pattern Recognition, 2008. IEEE.

He et al, "Corner deterctor Based on Global and Local Curvature Properties" Optical Engineering 47(5), 0570008 (2008).

International Search Report and Written Opinion received in PCT/US2011/056593, mailed May 30, 2012, 9 pages.

Notice of Allowance dated Feb. 22, 2023 received in U.S. Appl. No. 17/236,373 in 30 pages.

Notice of Allowance for related U.S. Appl. No. 16/160,796, mailed on Jan. 22, 2021, in 17 pages.

Notice of Allowance for related U.S. Appl. No. 16/579,625, mailed on Jan. 13, 2020 in 27 pages.

Notice of Allowance for related U.S. Appl. No. 17/829,025, mailed on Apr. 11, 2023, in 13 pages.

Office Action dated Feb. 1, 2023 in related U.S. Appl. No. 16/987,782, in 104 pages.

Office Action dated Jan. 12, 2023 in related U.S. Appl. No. 17/479,904, in 34 pages.

Office Action dated Sep. 25, 2019 for related U.S. Appl. No. 16/518,815, in 10 pages.

Office Action for related CA Patent Application No. 2,773,730, dated Aug. 21, 2017, in 4 pages.

Office Action for related U.S. Appl. No. 16/259,896, mailed on Dec. 12, 2019, in 22 pages.

Office Action for related U.S. Appl. No. 17/983,785, mailed on Mar. 30, 2023, in 46 pages.

Relativity. "Searching Manual." Aug. 27, 2010. Accessed May 13, 2015. http://www.inventus.com/wp-content/uploads/2010/09/Relativity-Searching-Manual-6.6.pdf.

Shah et al. "OCR-Based chassis-No. recognition using artificial neural networks."2009 IEEE Conference on Vehicular Electronics and Safety. pp. 31-31. Nov. 11-12, 2009.

Stevens. "Advanced Programming in the UNIX Enrivonment." Addison-Wesley Publishing Company, pp. 195-196 (1992).

"Tokenworks Introduces IDWedge ID Scanner Solution." 2008.

Junker et al. "Evaluating OCR and Non-OCR Text Representation for Learning Document Classifiers." Proceedings of the 4th International Conference on Document Analysis and Recognition. Ulm, Germany. Aug. 18-20, 1997. p. 1606-1066 (1997). Accessed http://citeseerxist.psu.eduviewdoc/download?doi=10.1.1.6.6732&rep=rep1-&type=pdf.

PDF417, Wikipedia: the free encyclopedia, Oct. 21, 2008, https://en.wikipedia.org/w/index.php?title=PDF417&oldid=246681430 (Year: 2008); 3 pages.

* cited by examiner

Mobile Device Processing

Server Side Processing

Detect Document in Image

Convert original color image into smaller color image (color "icon" image)

The check in this image is intentionally depicted in landscape orientation.

Document Processing

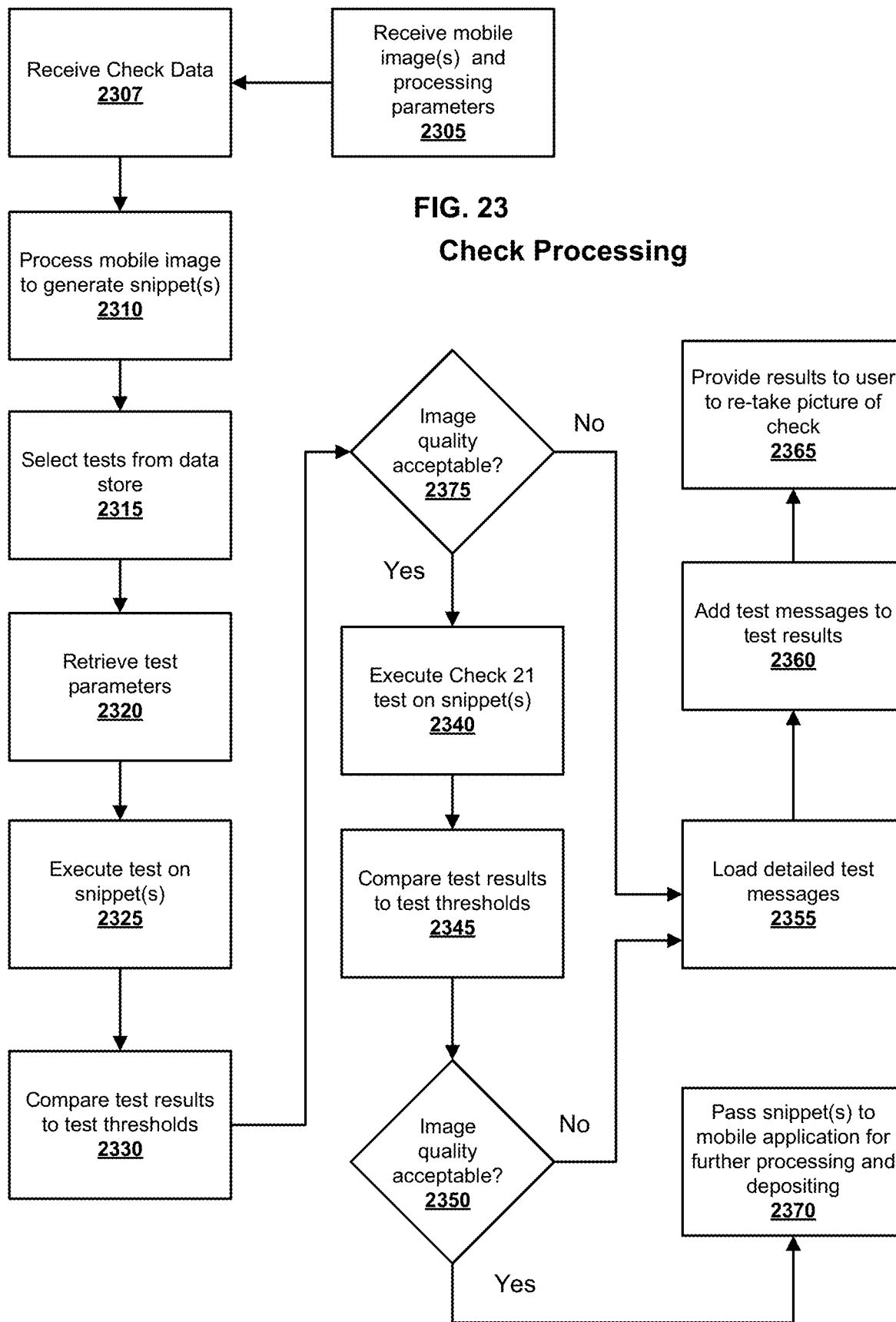

This figure is intentionally blurry.

This figure is intentionally blurry.

This figure is intentionally blurry.

Test Document Contrast

This figure is intentionally blurry.

Test Document Skew

Cut-Off Corner Test

Cut-Off Corner Test

This figure is intentionally blurry.

Warped Image Test

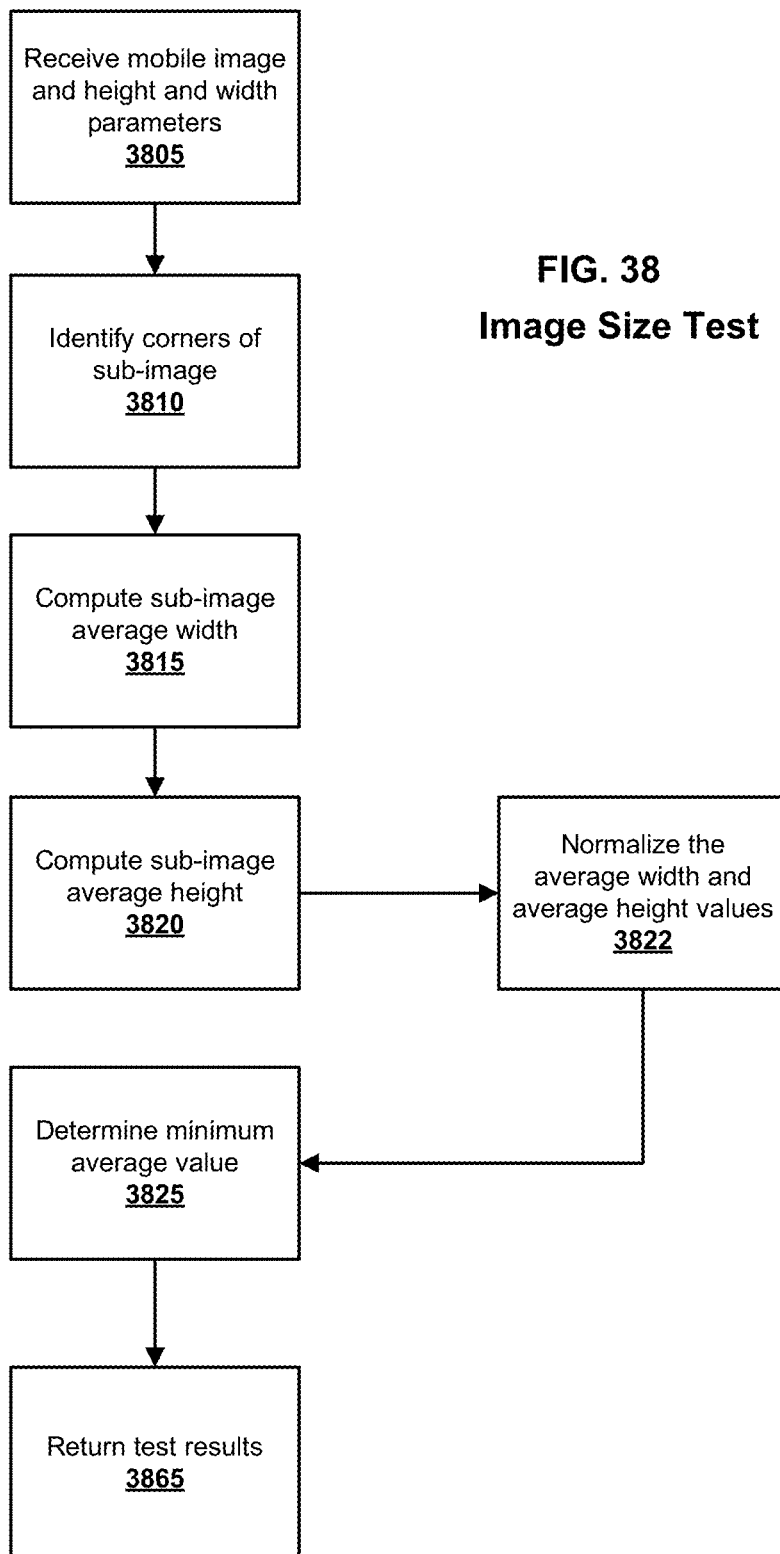

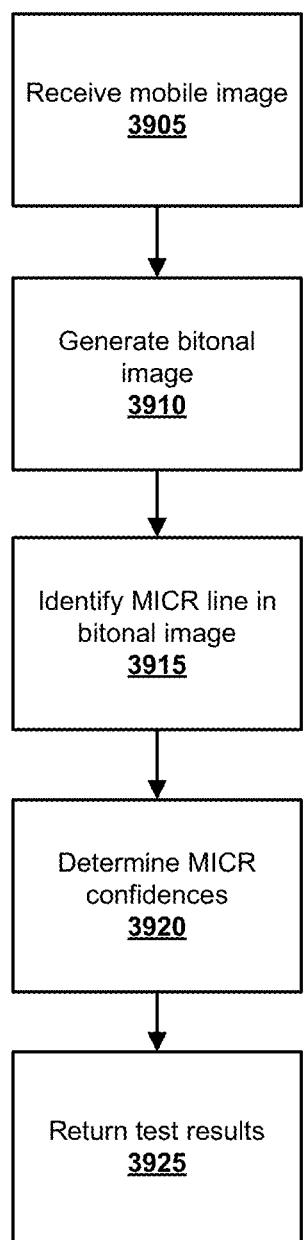
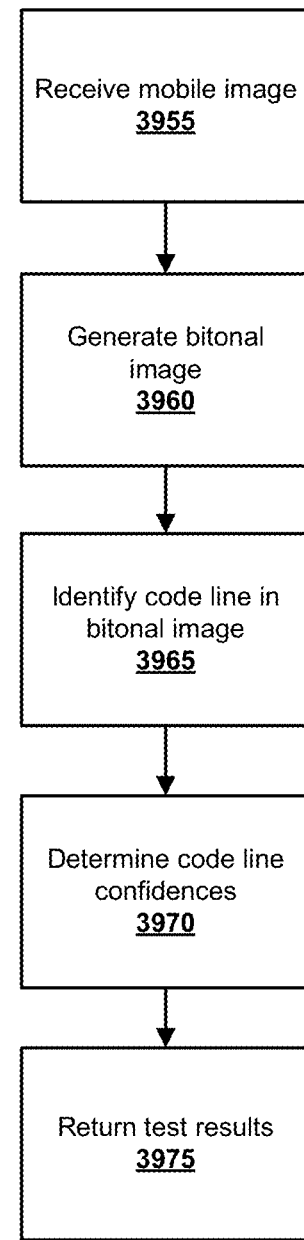
FIG. 39A
MICR-line Test
FIG. 39B
Code line Test

Aspect Ratio Test
For Two-Side Documents

Front-as-Rear Test

Form Identification
and Data Extraction

Dynamic Data Capture

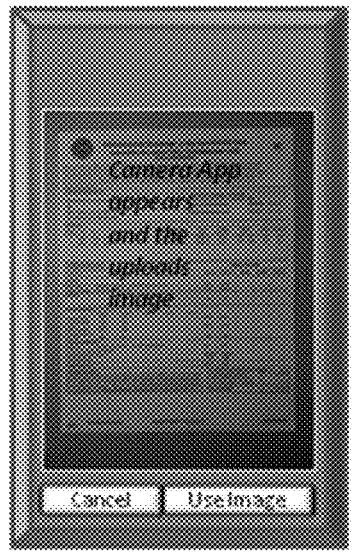
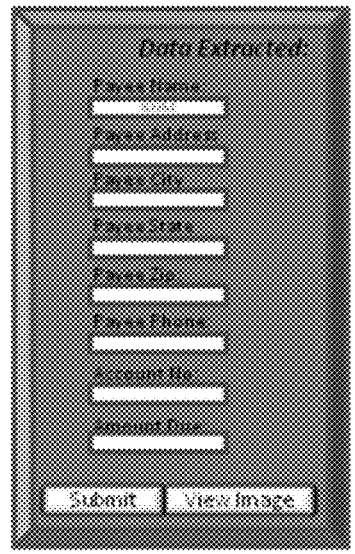
FIG. 46D        FIG. 46E
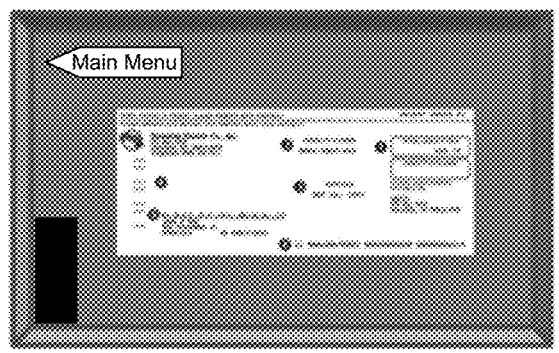
FIG. 46F

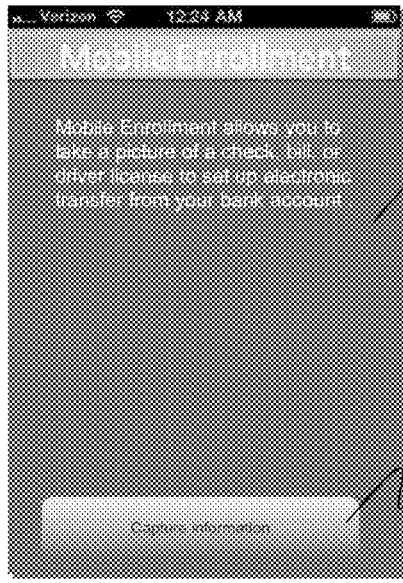
FIG. 50A
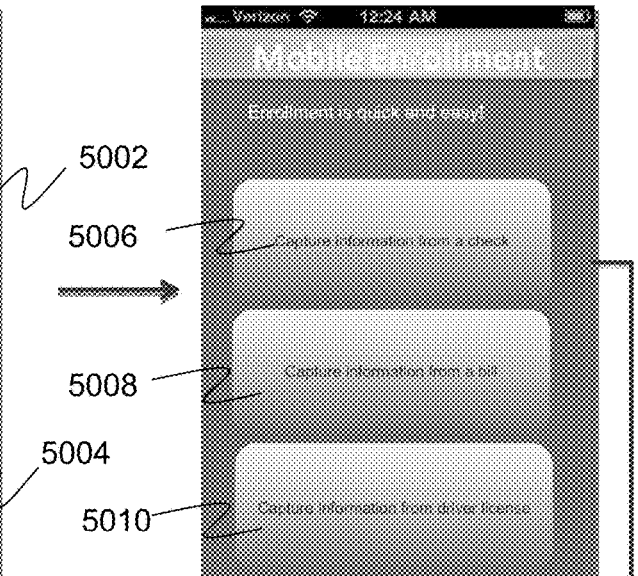
FIG. 50B
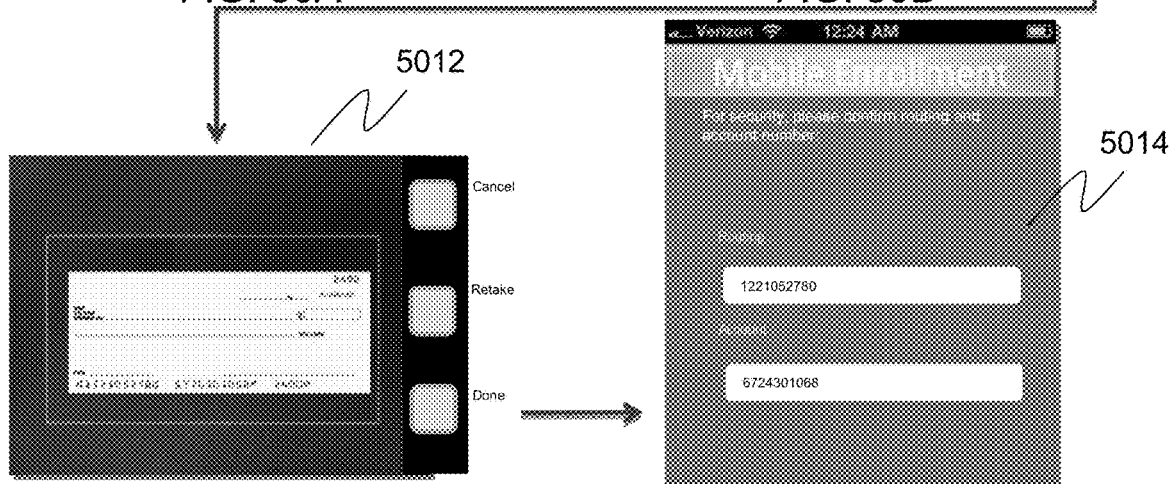
FIG. 50C
FIG. 50D

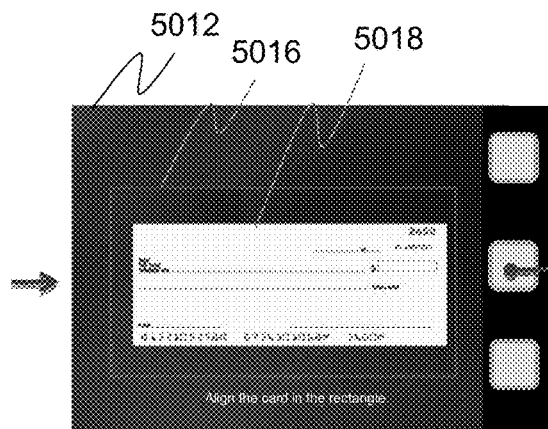
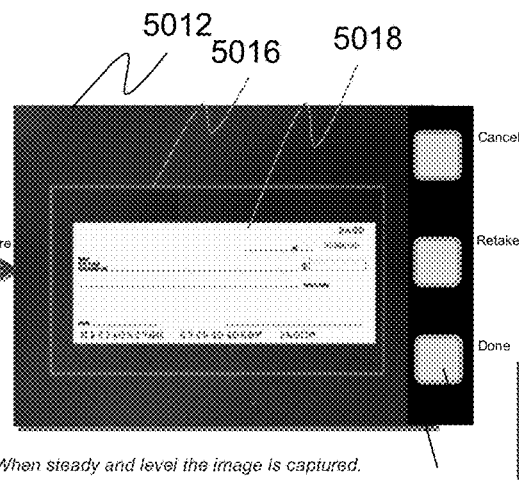
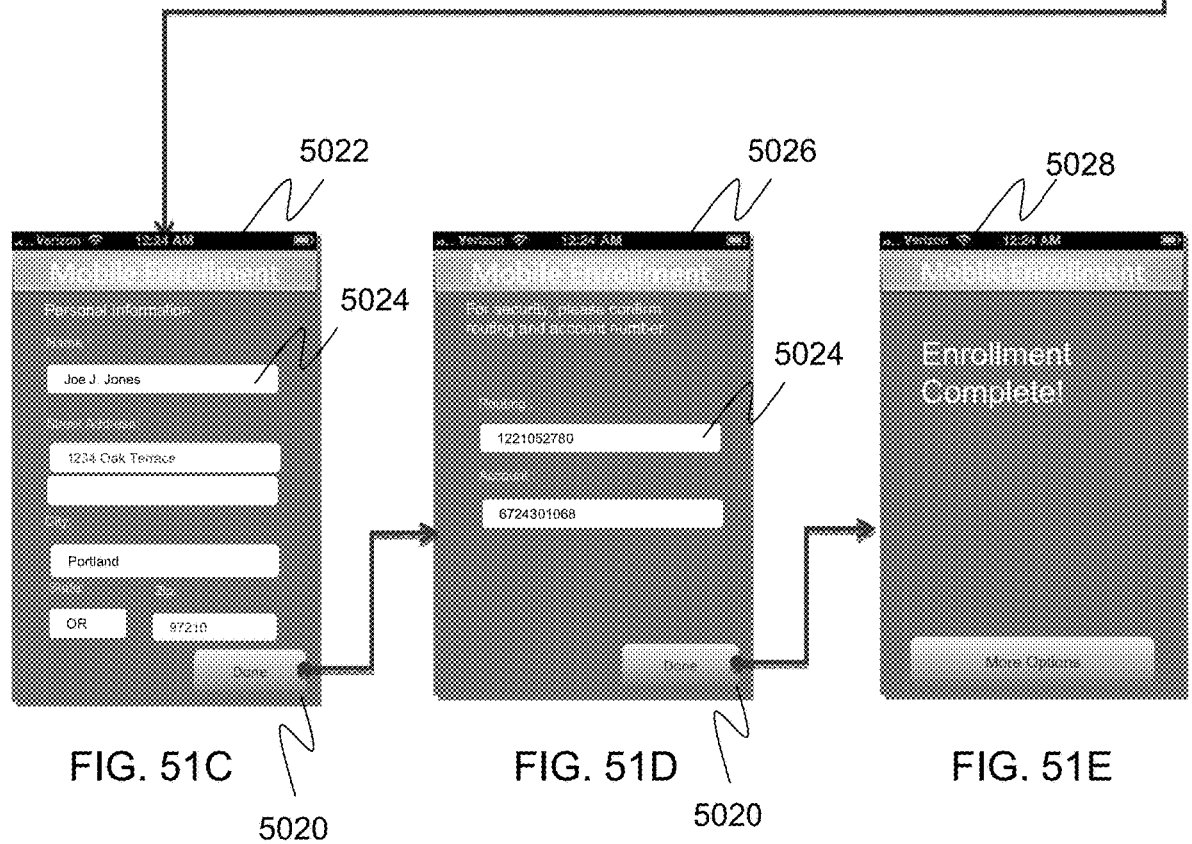
FIG. 51A
FIG. 51B
FIG. 51C
FIG. 51D
FIG. 51E

Overlay text should read "Align the bill in the rectangle."

When steady and level the image is captured.

SYSTEMS AND METHODS FOR MOBILE AUTOMATED CLEARING HOUSE ENROLLMENT

RELATED APPLICATIONS INFORMATION

This application is a continuation of U.S. application Ser. No. 17/751,346, which is a continuation of U.S. patent application Ser. No. 16/691,378, filed on Nov. 21, 2019, which is a continuation of U.S. patent application Ser. No. 13/526,532, filed on Jun. 19, 2012, which is a continuation-in-part of U.S. patent application Ser. No. 12/906,036, filed on Oct. 15, 2010, which is a continuation-in-part of U.S. patent application Ser. No. 12/778,943, filed on May 12, 2010, and a continuation-in-part of U.S. patent application Ser. No. 12/346,026, filed on Dec. 30, 2008, which claims priority to U.S. Provisional Patent Application No. 61/022,279, filed on Jan. 18, 2008, which are all hereby incorporated herein by reference in their entireties as if set forth in full. This application is also related to U.S. patent application Ser. No. 12/717,080, filed on Mar. 3, 2010, which is hereby incorporated herein by reference in its entirety as if set forth in full.

BACKGROUND

1. Technical Field

The embodiments described herein generally relate to automated document processing and more particularly, to systems and methods for mobile capture and processing of documents for enrollment in an automated clearing house (ACH) transaction.

2. Related Art

An Automated Clearing House (ACH) transaction is a type of electronic funds transfer (EFT) that occurs between two separate entities, often known as a receiver and an originator. The receiver is a party which grants authorization to the originator for the transfer of funds to or from the receiver's bank account. The originator may be a business or service provider to which the receiver owes money, such as a utility company, loan provider, etc. For example, a customer may want to have the amount of their monthly phone bill debited directly from their checking account and transferred to the phone company. By setting up an ACH transaction, the customer, or receiver, does not have to remember to mail out a check to the phone company every month. The phone company, or originator, also benefits in that it does not need to physically process a check that arrives in the mail and can instead electronically debit an amount from the customer's checking account on the same day of the month.

ACH transactions also work in the seemingly opposite situation, such as when a company wants to make a recurring payment to an individual's checking account; for example, an employer that wishes to pay an employee twice a month. The employee is still considered the receiver, while the employer is still termed the originator. Again, the benefit to the employee is that they do not have to wait to receive a physical check and then go to a bank to deposit the money, as the money is electronically deposited into their bank account on a particular date. The employer does not have to mail out physical checks and wait for them to be deposited.

However, the receiver is required to authorize any ACH transaction involving their account, regardless of whether the transaction is a debit or credit to the receiver's bank account. Authorizing an ACH transaction requires an oral, written or electronic authorization by the receiver, as well as basic information on the receiver's bank account, such as the account number and the bank's routing number. Additional information may be obtained, including the receiver's name and address, a driver's license number, or other type of personal information that may be used to confirm the identity of the receiver.

In many cases, an ACH transaction requires authorization from the receiver in the form of a blank or voided check which contains the routing number, account number, name and address of the receiver. The receiver must then mail the check to the originator to complete ACH enrollment for a particular transaction. For example, if a receiver wants their phone company to automatically debit the amount of the receiver's monthly phone bill from the receiver's bank account, an ACH transaction is setup by having the receiver send the voided check to the originator for processing. The ACH enrollment process will therefore take several days to complete and require that the receiver mail a check and an enrollment form to the originator. Thus, the ACH enrollment process is both complicated and time consuming.

SUMMARY

Systems and methods for mobile enrollment in automated clearing house (ACH) transactions using mobile-captured images of financial documents are provided. Applications running on a mobile device provide for the capture and processing of images of documents needed for enrollment in an ACH transaction, such as a blank check, remittance statement and driver's license. Data from the mobile-captured images that is needed for enrolling in ACH transactions is extracted from the processed images, such as a user's name, address, bank account number and bank routing number. The user can edit the extracted data, select the type of document that is being captured, authorize the creation of an ACH transaction and select an originator of the ACH transaction. The extracted data and originator information is transmitted to a remote server along with the user's authorization so the ACH transaction can be setup between the originator's and receiver's bank accounts.

In a first exemplary embodiment, a computer-readable medium comprises instructions which, when executed by a computer, perform a process of mobile enrollment in an automated clearing house (ACH) transaction, comprise: receiving an identity of at least one originator for the automated clearing house (ACH) transaction; receiving an image of a document captured by a mobile device of a receiver of the ACH transaction; correcting at least one aspect of the image to create a corrected image; executing one or more image quality assurance tests on the corrected image to assess the quality of the corrected image; and extracting ACH enrollment data from the corrected image that is needed to enroll a user in the ACH transaction between the originator and the receiver.

In a second exemplary embodiment, a system for mobile enrollment in an automated clearing house (ACH) transaction comprises: a mobile device which captures an image of a document, receives an authorization of a receiver for enrollment in the ACH transaction and receives an originator identity of at least one originator of the ACH transaction; a mobile ACH enrollment server which receives the captured image, authorization and originator identity and extracts ACH enrollment data from the captured image; and an originator server which receives the authorization, originator identity and ACH enrollment data and enrolls the receiver in an ACH transaction with the originator.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The various embodiments provided herein are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

FIG. 23 is a flow diagram of a process for performing mobile image quality assurance on an image of a check captured by a mobile device according to an embodiment.

FIG. 38 is a flow diagram of a process that for performing an Image Size Test on a subimage according to an embodiment.

FIG. 39A is a flow chart of a method for executing a MICR-line Test according to an embodiment.

FIG. 39B is a flow chart of a method for executing a code line Test according to an embodiment.

FIG. 46A-46F are images representing application that can reside on mobile device and be using in according with the systems and method disclosed herein according to an embodiment.

FIGS. 50A-50D illustrate one embodiment of a graphical user interface (GUI) of the mobile ACH enrollment system and method as has been described above.

FIGS. 51A-51E illustrate the workflow of ACH enrollment where an image of a check is captured and the checking account number and routing number are extracted from the image of the check.

DETAILED DESCRIPTION

Figure 1:
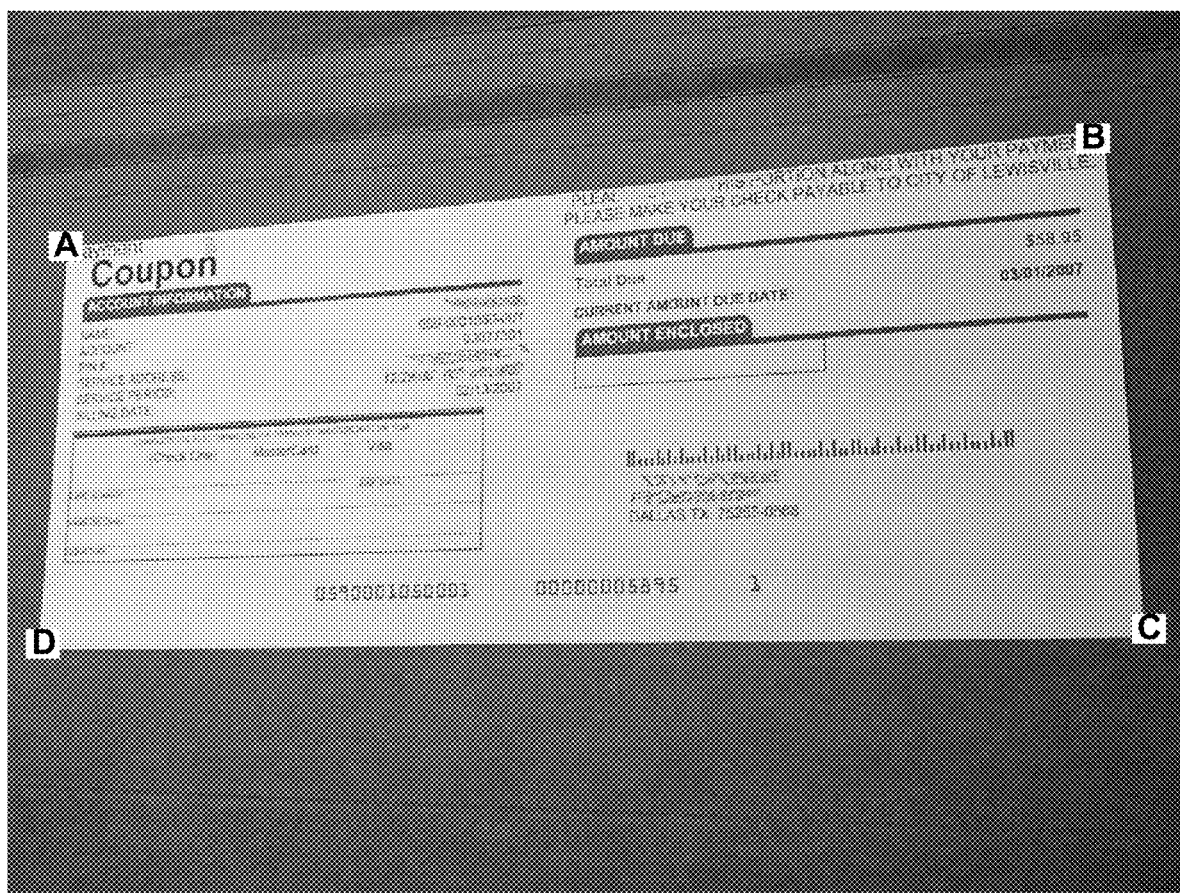
FIG. 1 is an image of a remittance coupon 100 illustrating an example remittance coupon that might be imaged with the systems and methods described herein.

The embodiments described herein are directed towards automated document processing and systems and methods for document image processing using mobile devices. System and methods are provided for processing a remittance coupon captured using a mobile device. Generally, in some embodiments an original color image of a document is captured using a mobile device and then converted the color image to a bi-tonal image. More specifically, in some embodiments, a color image of a document taken by a mobile device is received and converted into a bi-tonal image of the document that is substantially equivalent in its resolution, size, and quality to document images produced by "standard" scanners.

The term "standard scanners" as used herein, but is not limited to, transport scanners, flat-bed scanners, and specialized check-scanners. Some manufacturers of transport scanners include UNISYS®, BancTec IBM®, and Canon®. With respect to specialized check-scanners, some models include the TellerScan® TS200 and the Panini® My Vision X. Generally, standard scanners have the ability to scan and produce high quality images, support resolutions from 200 dots per inch to 300 dots per inch (DPI), produce gray-scale and bi-tonal images, and crop an image of a check from a larger full-page size image. Standard scanners for other types of documents may have similar capabilities with even higher resolutions and higher color-depth.

The term "color images" as used herein, but is not limited to, images having a color depth of 24 bits per a pixel (24 bit/pixel), thereby providing each pixel with one of 16 million possible colors. Each color image is represented by pixels and the dimensions W (width in pixels) and H (height in pixels). An intensity function I maps each pixel in the [W×H] area to its RGB-value. The RGB-value is a triple (R,G,B) that determines the color the pixel represents. Within the triple, each of the R(Red), G(Green) and B(Blue) values are integers between 0 and 255 that determine each respective color's intensity for the pixel.

The term, "gray-scale images" as used herein, but is not limited to, images having a color depth of 8 bits per a pixel (8 bit/pixel), thereby providing each pixel with one of 256 shades of gray. As a person of ordinary skill in the art would appreciate, gray-scale images also include images with color depths of other various bit levels (e.g. 4 bit/pixel or 2 bit/pixel). Each gray-scale image is represented by pixels and the dimensions W (width in pixels) and H (height in pixels). An intensity function I maps each pixel in the [W×H] area onto a range of gray shades. More specifically, each pixel has a value between 0 and 255 which determines that pixel's shade of gray.

Bi-tonal images are similar to gray-scale images in that they are represented by pixels and the dimensions W (width in pixels) and H (height in pixels). However, each pixel within a bi-tonal image has one of two colors: black or white. Accordingly, a bi-tonal image has a color depth of 1 bit per a pixel (1 bit/pixel). The similarity transformation, as utilized by some embodiments of the invention, is based off the assumption that there are two images of [W×H] and [W'×H'] dimensions, respectively, and that the dimensions are proportional (i.e. W/W'=H/H'). The term "similarity transformation" may refer to a transformation ST from [W×H] area onto [W'×H'] area such that ST maps pixel p=p(x,y) on pixel p'=p'(x',y') with x'=x*W'/W and y=y*H'/H.

The systems and methods provided herein advantageously allow a user to capture an image of a remittance coupon, and in some embodiments, a form of payment, such as a check, for automated processing. Typically, a remittance processing service will scan remittance coupons and checks using standard scanners that provide a clear image of the remittance coupon and accompanying check. Often these scanners produce either gray-scale and bi-tonal images that are then used to electronically process the payment. The systems and methods disclosed herein allow an image of remittance coupons, and in some embodiments, checks to be captured using a camera or other imaging device included in or coupled to a mobile device, such as a mobile phone. The systems and methods disclosed herein can test the quality of a mobile image of a document captured using a mobile device, correct some defects in the image, and convert the image to a format that can be processed by remittance processing service.

FIG. 1 is an image illustrating an example remittance coupon 1900 that can be imaged with the systems and methods described herein. The mobile image capture and processing systems and methods described herein can be used with a variety of documents, including financial documents such as personal checks, business checks, cashier's checks, certified checks, and warrants. By using an image of the remittance coupon 100, the remittance process can be automated and performed more efficiently. As would be appreciated by those of skill in the art, remittance coupons are not the only types of documents that might be processed using the system and methods described herein. For example, in some embodiments, a user can capture an image of a remittance coupon and an image of a check associated with a checking account from which the remittance payment will be funded.

Figure 2:
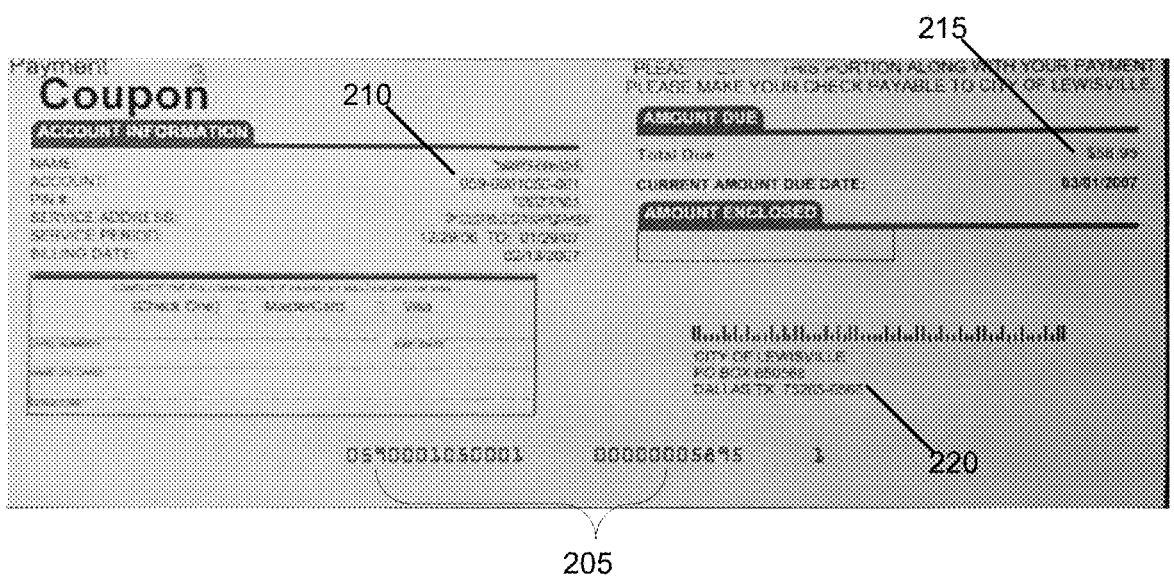
FIG. 2 is a geometrically corrected image created using image processing techniques disclosed herein using the mobile image of the remittance coupon 100 illustrated in FIG. 1.

FIG. 2 is a geometrically corrected image created using image processing techniques disclosed herein and using the mobile image of the remittance coupon 100 illustrated in FIG. 1. A remittance coupon may include various fields, and some fields in the documents might be considered "primary" fields. For example, some remittance coupons also include computer-readable bar codes or code lines 205 that include text or other computer-readable symbols that can be used to encode account-related information. The account-related information can be used to reconcile a payment received with the account for which the payment is being made. Code line 205 can be detected and decoded by a computer system to extract the information encoded therein. The remittance coupon can also include an account number field 210 and an amount due field 215. Remittance coupons can also include other fields, such as the billing company name and address 220, a total outstanding balance, a minimum payment amount, a billing date, and payment due date. The examples are merely illustrative of the types of information that may be included on a remittance coupon and it will be understood that other types of information can be included on other types of remittance coupons.

Figure 3:
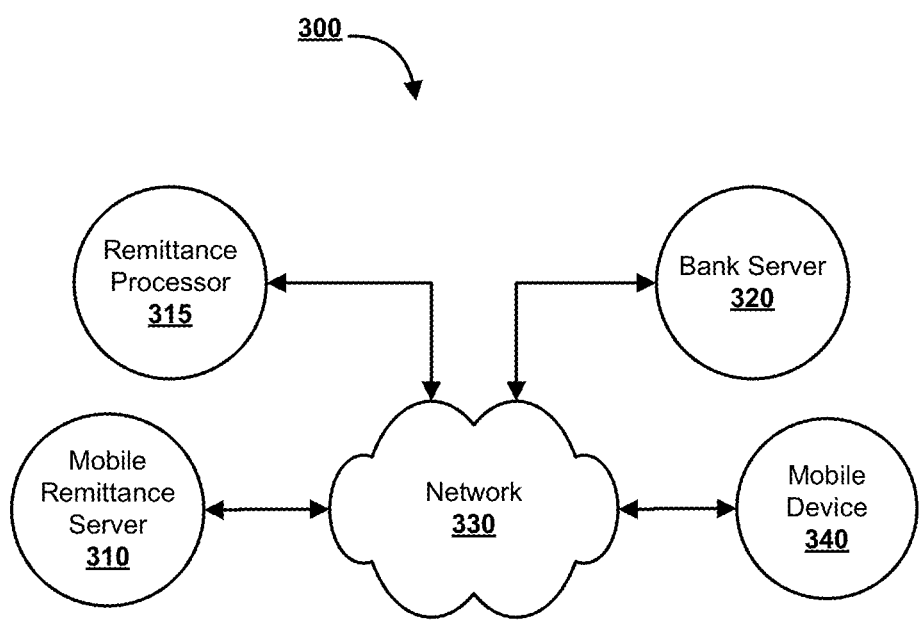
FIG. 3 is high level block diagram of a system that can be used to implement the systems and methods described herein.

FIG. 3 is high level block diagram of a system 300 that can be used to implement the systems and methods described herein. System 300 include a mobile device 340. The mobile device can comprise a mobile telephone handset, Personal Digital Assistant, or other mobile communication device. The mobile device can include a camera or other imaging device, such as a scanner, or might include functionality that allows it to connect to a camera or other imaging device. The connection to an external camera or other imaging device can comprise a wired or wireless connection. In this way the mobile device can connect to an external camera or other imaging device and receive images from the camera or other imaging device.

Images of the documents taken using the mobile device or downloaded to the mobile device can be transmitted to mobile remittance server 310 via network 330. Network 330 can comprise one or more wireless and/or wired network connections. For example, in some cases, the images can be transmitted over a mobile communication device network, such as a code division multiple access ("CDMA") telephone network, or other mobile telephone network. Network 330 can also comprise one or more connections across the Internet. Images taken using, for example, a mobile device's camera, can be 24 bit per pixel (24 bit/pixel) JPG images. It will be understood, however, that many other types of images might also be taken using different cameras, mobile devices, etc.

Mobile remittance server 310 can be configured to perform various image processing techniques on images of remittance coupons, checks, or other financial documents captured by the mobile device 340. Mobile remittance server 310 can also be configured to perform various image quality assurance tests on images of remittance coupons or financial documents captured by the mobile device 340 to ensure that the quality of the captured images is sufficient to enable remittance processing to be performed using the images. Examples of various processing techniques and testing techniques that can be implemented on mobile remit server 210 are described in detail below.

Figure 45:
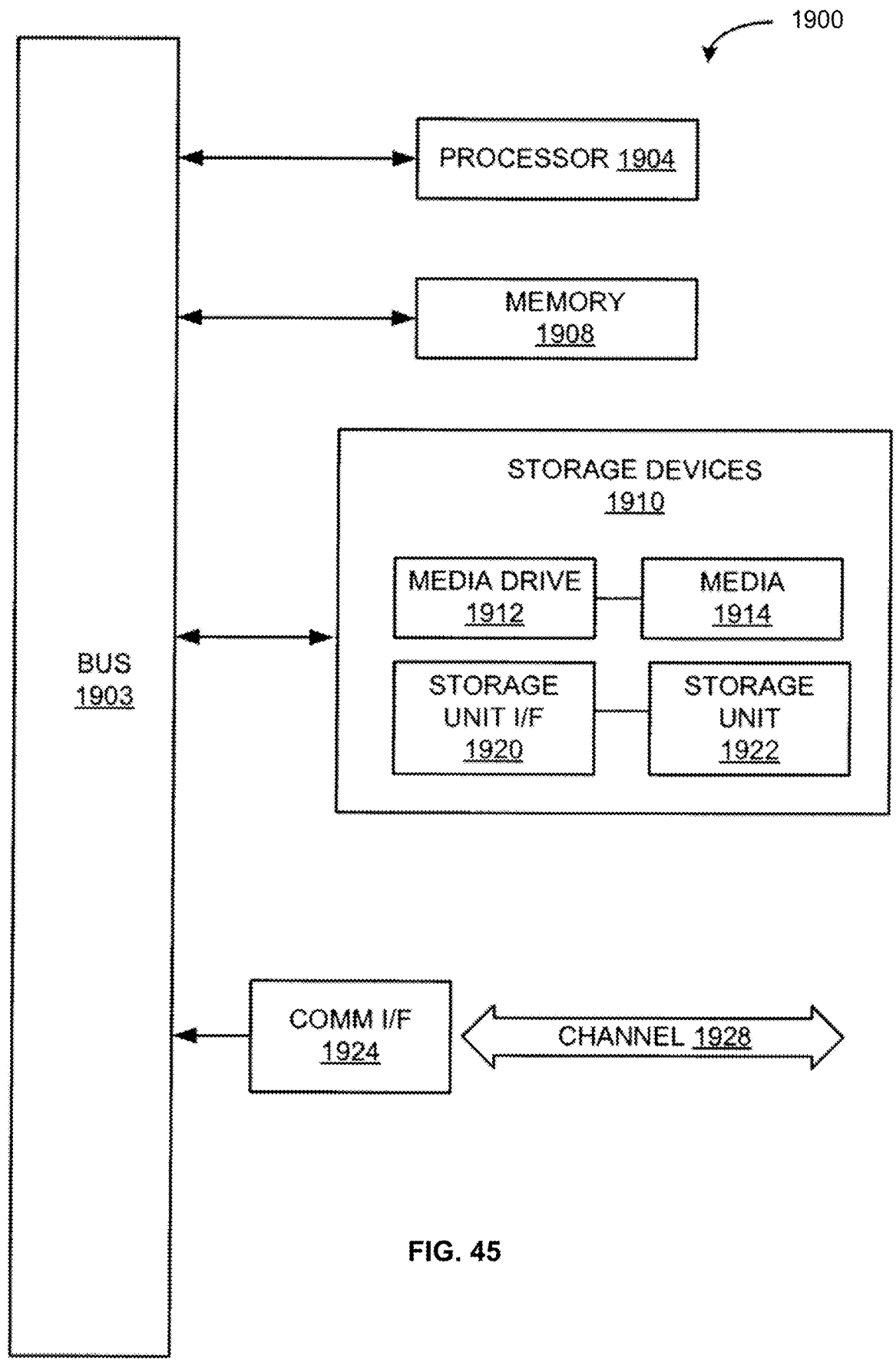
FIG. 45 is a block diagram of functional elements of a computer system that can be used to implement the mobile device and/or the servers described in the systems and methods disclosed herein.

Mobile remittance server 310 can also be configured to communicate with one or more remittance processor servers 315. According to an embodiment, the mobile remittance server 310 can perform processing and testing on images captured by mobile device 340 to prepare the images for processing by a third-party remittance processor and to ensure that the images are of a sufficient quality for the third-party remittance processor to process. The mobile remittance server 310 can send the processed images to the remittance processor 315 via the network 330. In some embodiments, the mobile remittance server 310 can send additional processing parameters and data to the remittance processor 315 with the processed mobile image. This information can include information collected from a user by the mobile device 340. According to an embodiment, the mobile remittance server 310 can be implemented using hardware or a combination of software and hardware. FIG. 45, describe below, illustrates a computer system that can be used to implement mobile remittance server 310 according to an embodiment.

According to an embodiment, the mobile remittance server 310 can be configured to communicate to one or more bank server 320 via the network 330. Bank server 320 can be configured to process payments in some embodiments. For example, in some embodiments, mobile device 340 can be used to capture an image of a remittance coupon and an image of a check that can be used to make an electronic payment of the remittance payment. For example, the remittance processor server 315 can be configured to receive an image of a remittance coupon and an image of a check from the mobile remittance server 310. The remittance processor 315 can electronically deposit the check into a bank account associated with the entity for which the electronic remittance is being performed. According to some embodiments, the bank server 320 and the remittance processor 315 can be implemented on the same server or same set of servers.

In other embodiments, the remittance processor 315 can handle payment. For example, the remittance processor can be operate by or on behalf of an entity associated with the coupon of FIG. 1, such as a utility or business. The user's account can then be linked with a bank, Paypal, or other account, such that when remittance processor 315 receives the remittance information, it can charge the appropriate amount to the user's account. FIGS. 46A-F illustrates example screens of an application that can run on a mobile device 340 and can be used for mobile remittance as described herein.

Figure 46A:
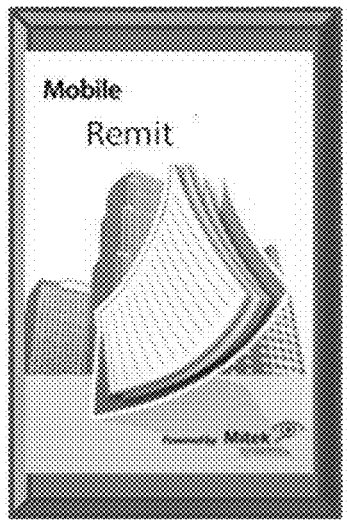
Figure 46B:
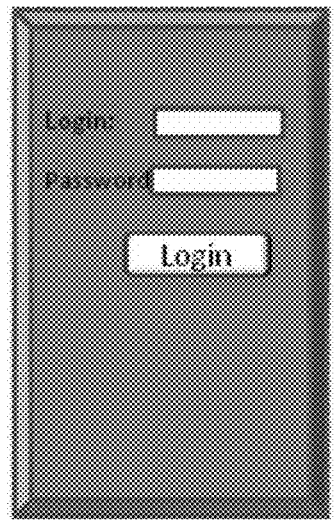
Figure 46C:
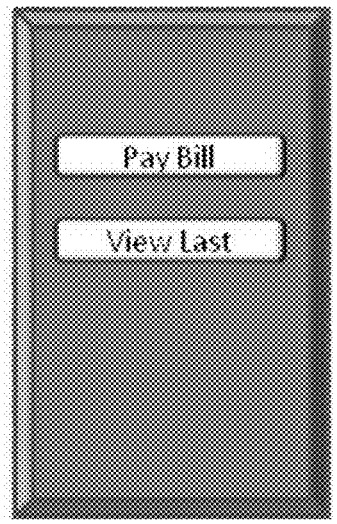

FIG. 46A is an image of an icon representing application that can reside on mobile device 340. When the application is activated, a login screen as illustrated in FIG. 46B can be displayed into which the user can input certain credentials such as a login or username and password. Once these credentials are validated, the user can be presented a screen as illustrated in FIG. 46C allowing them to pay certain bills using the application. In certain embodiments, the user can also view other information such as previous or last payments.

When the user elects to pay a bill, the camera application can be launched as illustrated in FIG. 46D, which can enable the user to obtain an image of the coupon. As illustrated, control buttons can be presented to allow the user to accept the image or cancel and possibly obtain a new image. Data can then be extracted from the image, as discussed in detail below, and as illustrated in FIG. 46E. The data can be presented as various fields and can enable the user to correct or alter the information as appropriate. In certain embodiments, the user can even access a grayscale image of the coupon illustrated in FIG. 46F.

Once the image is captured and corrected, and the data is extracted and adjusted, then the image, data, and any required credential information, such as username, password, and phone or device identifier, can be transmitted to the mobile remittance server 310 for further processing. This further processing is described in detail with respect to the remaining figure sin the description below.

Figures 4, 5:
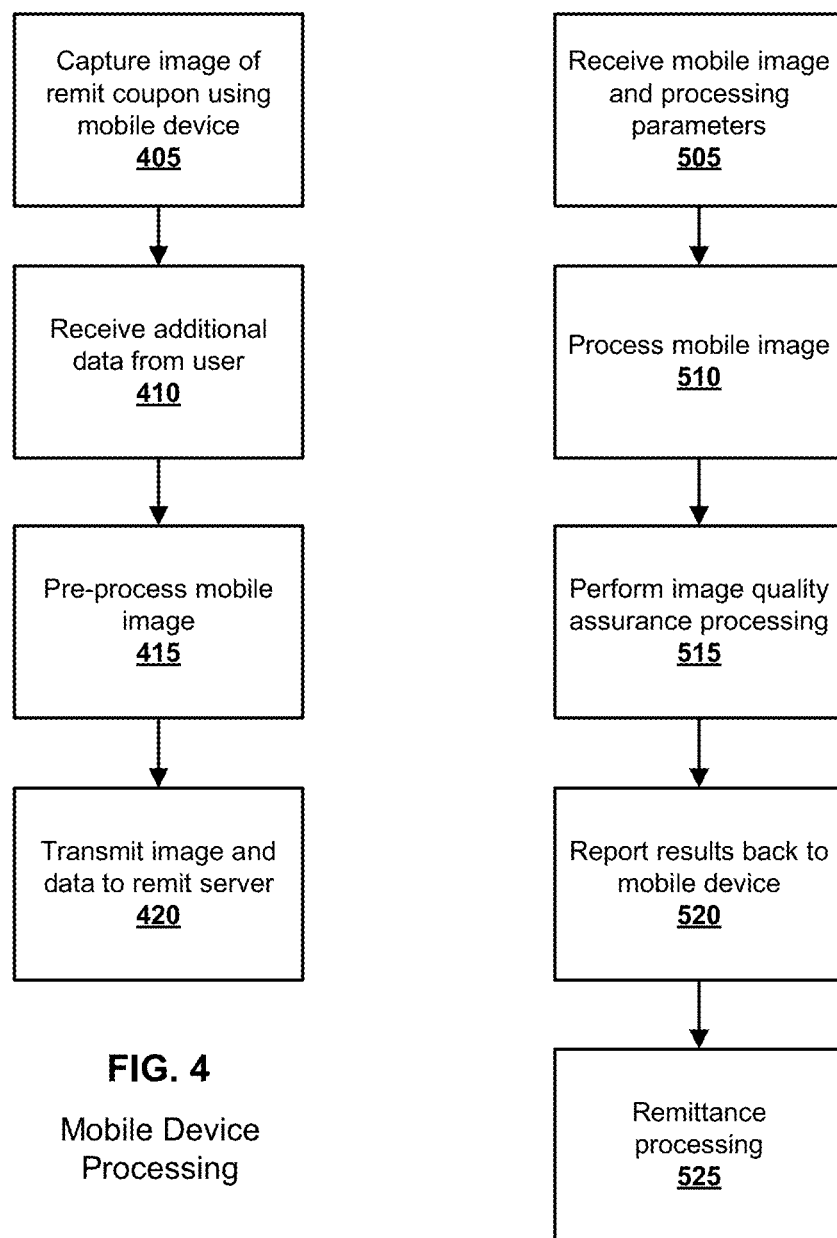
FIG. 4 is a flow diagram of an example method for capturing an image of a remittance coupon using a mobile device according to an embodiment.
FIG. 5 is a flow diagram of an example method for processing an image of a remittance coupon captured using a mobile device according to an embodiment.

First, FIG. 4 is a flow diagram of an example method for capturing an image of a remittance coupon using a mobile device according to an embodiment. According to an embodiment, the method illustrated in FIG. 4 can be implemented in mobile device 340.

An image of a remittance coupon is captured using a camera or other optical device of the mobile device 340 (step 405). For example, a user of the mobile device 340 can click a button or otherwise activate a camera or other optical device of mobile device 340 to cause the camera or other optical device to capture an image of a remittance coupon. FIG. 1 illustrates an example of a mobile image of a remittance coupon that has been captured using a camera associated with a mobile device 340.

According to an embodiment, the mobile device 340 can also be configured to optionally receive additional information from the user (step 410). For example, in some embodiments, the mobile device can be configured to prompt the user to enter data, such as a payment amount that represents an amount of the payment that the user wishes to make. The payment amount can differ from the account balance or minimum payment amount shown on the remittance coupon. For example, the remittance coupon might show an account balance of $1000 and a minimum payment amount of $100, but the user might enter a payment amount of $400.

According to an embodiment, the mobile device 340 can be configured to perform some preprocessing on the mobile image (step 415). For example, the mobile device 340 can be configured to convert the mobile image from a color image to a grayscale image or to bitonal image. Other preprocessing steps can also be performed on the mobile device. For example, the mobile device can be configured to identify the corners of the remittance coupon and to perform geometric corrections and/or warping corrections to correct defects in the mobile image. Examples of various types of preprocessing that can be performed on the mobile device 340 are described in detail below.

Mobile device 340 can then transmit the mobile image of the remittance coupon and any additional data provided by user to mobile remittance server 310.

FIG. 5 is a flow diagram of an example method for processing an image of a remittance coupon captured using a mobile device according to an embodiment. According to an embodiment, the method illustrated in FIG. 4 can be implemented in mobile remittance server 310.

Mobile remittance server 310 can receive the mobile image and any data provided by the user from the mobile device 340 via the network 330 (step 505). The mobile remittance server 310 can then perform various processing on the image to prepare the image for image quality assurance testing and for submission to a remittance processor 315 (step 510). Various processing steps can be performed by the mobile remittance server 310. Examples of the types of processing that can be performed by mobile remittance server 310 are described in detail below.

Mobile remittance server 310 can perform image quality assurance testing on the mobile image to determine whether there are any issues with the quality of the mobile image that might prevent the remittance provider from being able to process the image of the remittance coupon (step 515). Various mobile quality assurance testing techniques that can be performed by mobile remittance server 310 are described in detail below.

According to an embodiment, mobile remittance server 310 can be configured to report the results of the image quality assurance testing to the mobile device 340 (step 520). This can be useful for informing a user of mobile device 340 that an image that the user captured of a remittance coupon passed quality assurance testing, and thus, should be of sufficient quality that the mobile image can be processed by a remittance processor server 315. According to an embodiment, the mobile remittance server 310 can be configured to provide detailed feedback messages to the mobile device 340 if a mobile image fails quality assurance testing. Mobile device 340 can be configured to display this feedback information to a user of the device to inform the user what problems were found with the mobile image of the remittance coupon and to provide the user with the opportunity to retake the image in an attempt to correct the problems identified.

If the mobile image passes the image quality assurance testing, the mobile remittance server 310 can submit the mobile image plus any processing parameters received from the mobile device 340 to the remittance processor server 315 for processing (step 525). According to an embodiment, mobile remittance server 310 can include a remittance processing server configured to perform the steps 525 including the methods illustrated in FIGS. 42 and 43. According to an embodiment, the remittance processing step 525 can include identifying a type of remittance coupon found in a mobile image. According to some embodiments, coupon templates can be used to improve data capture accuracy. According to an embodiment, if form identification fails and a coupon template that matches the format of a coupon, a dynamic data capture method can be applied to extract information from the remittance coupon.

Image Processing

Mobile device 340 and mobile remittance server 310 can be configured to perform various processing on a mobile image to correct various defects in the image quality that could prevent the remittance processor 215 from being able to process the remittance due to poor image quality.

For example, an out of focus image of a remittance coupon or check, in embodiments where the mobile device can also be used to capture check images for payment processing, can be impossible to read an electronically process. For example, optical character recognition of the contents of the imaged document based on a blurry mobile image could result in incorrect payment information being extracted from the document. As a result, the wrong account could be credited for the payment or an incorrect payment amount could be credited. This may be especially true if a check and a payment coupon are both difficult to read or the scan quality is poor.

Many different factors may affect the quality of an image and the ability of a mobile device based image capture and processing system. Optical defects, such as out-of-focus images (as discussed above), unequal contrast or brightness, or other optical defects, can make it difficult to process an image of a document, e.g., a check, payment coupon, deposit slip, etc. The quality of an image can also be affected by the document position on a surface when photographed or the angle at which the document was photographed. This affects the image quality by causing the document to appear, for example, right side up, upside down, skewed, etc. Further, if a document is imaged while upside-down it might be impossible or nearly impossible to for the system to determine the information contained on the document.

In some cases, the type of surface might affect the final image. For example, if a document is sitting on a rough surface when an image is taken, that rough surface might show through. In some cases the surface of the document might be rough because of the surface below it. Additionally, the rough surface may cause shadows or other problems that might be picked up by the camera. These problems might make it difficult or impossible to read the information contained on the document.

Lighting may also affect the quality of an image, for example, the location of a light source and light source distortions. Using a light source above a document can light the document in a way that improves the image quality, while a light source to the side of the document might produce an image that is more difficult to process. Lighting from the side can, for example, cause shadows or other lighting distortions. The type of light might also be a factor, for example, sun, electric bulb, florescent lighting, etc. If the lighting is too bright, the document can be washed out in the image. On the other hand, if the lighting is too dark, it might be difficult to read the image.

The quality of the image can also be affected by document features, such as, the type of document, the fonts used, the colors selected, etc. For example, an image of a white document with black lettering may be easier to process than a dark colored document with black letters. Image quality may also be affected by the mobile device used. Some mobile camera phones, for example, might have cameras that save an image using a greater number of mega pixels. Other mobile cameras phones might have an auto-focus feature, automatic flash, etc. Generally, these features may improve an image when compared to mobile devices that do not include such features.

A document image taken using a mobile device might have one or more of the defects discussed above. These defects or others may cause low accuracy when processing the image, for example, when processing one or more of the fields on a document. Accordingly, in some embodiments, systems and methods using a mobile device to create images of documents can include the ability to identify poor quality images. If the quality of an image is determined to be poor, a user may be prompted to take another image.

Detecting an Out of Focus Image

Mobile device 340 and mobile remittance server 310 can be configured to detect an out of focus image. A variety of metrics might be used to detect an out-of-focus image. For example, a focus measure can be employed. The focus measure can be the ratio of the maximum video gradient between adjacent pixels measured over the entire image and normalized with respect to an image's gray level dynamic range and "pixel pitch". The pixel pitch may be the distance between dots on the image. In some embodiments a focus score might be used to determine if an image is adequately focused. If an image is not adequately focused, a user might be prompted to take another image.

According to an embodiment, the mobile device 340 can be configured to detect whether an image is out of focus using the techniques disclosed herein. In an embodiment, the mobile remittance server 310 can be configured to detect out of focus images. In some embodiments, the mobile remittance server 310 can be configured to detect out of focus images and reject these images before performing mobile image quality assurance testing on the image. In other embodiments, detecting and out of focus image can be part of the mobile image quality assurance testing.

According to an embodiment, an image focus score can be calculated as a function of maximum video gradient, gray level dynamic range and pixel pitch. For example, in one embodiment:

$$\text{Image Focus Score} = (\text{Maximum Video Gradient}) * (\text{Gray Level Dynamic Range}) * (\text{Pixel Pitch}) \quad (\text{eq. 1})$$

The video gradient may be the absolute value of the gray level for a first pixel "i" minus the gray level for a second pixel "i+1". For example:

$$\text{Video Gradient} = \text{ABS}[(\text{Grey level for pixel ``}i\text{''}) - (\text{Gray level for pixel ``}i+1\text{''})] \quad (\text{eq. 2})$$

The gray level dynamic range may be the average of the "n" lightest pixels minus the average of the "n" darkest pixels. For example:

$$\text{Gray Level Dynamic Range} = [\text{AVE}(\text{``}N\text{'' lightest pixels}) - \text{AVE}(\text{``}N\text{'' darkest pixels})] \quad (\text{eq. 3})$$

In equation 3 above, N can be defined as the number of pixels used to determine the average darkest and lightest pixel gray levels in the image. In some embodiments, N can be chosen to be 64. Accordingly, in some embodiments, the 64 darkest pixels are averaged together and the 64 lightest pixels are averaged together to compute the gray level dynamic range value.

The pixel pitch can be the reciprocal of the image resolution, for example, in dots per inch.

$$\text{Pixel Pitch} = [1/\text{Image Resolution}] \quad (\text{eq. 4})$$

In other words, as defined above, the pixel pitch is the distance between dots on the image because the Image Resolution is the reciprocal of the distance between dots on an image.

Detecting and Correcting Perspective Distortion

Figure 7:
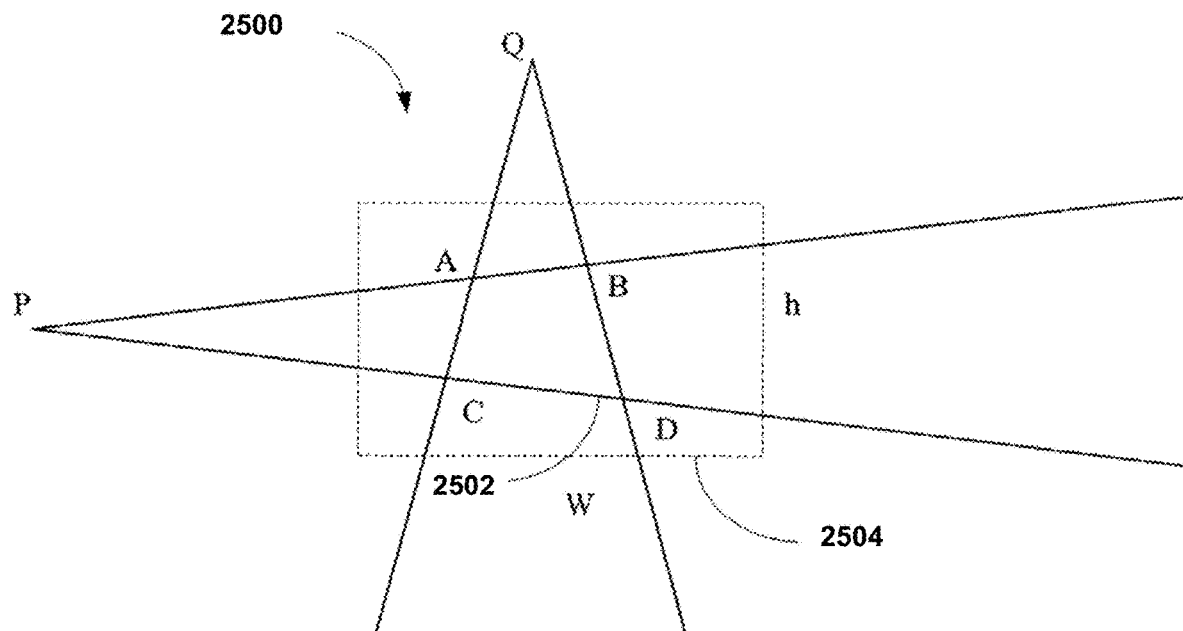
FIG. 7 and its related description above provide some examples of how a perspective transformation can be constructed for a quadrangle defined by the corners A, B, C, and D according to an embodiment.

FIG. 7 is a diagram illustrating an example of perspective distortion in an image of a rectangular shaped document. An image can contain perspective transformation distortions 2500 such that a rectangle can become a quadrangle ABCD 2502, as illustrated in the figure. The perspective distortion can occur because an image is taken using a camera that is placed at an angle to a document rather than directly above the document. When directly above a rectangular document it will generally appear to be rectangular. As the imaging device moves from directly above the surface, the document distorts until it can no longer be seen and only the edge of the page can be seen.

The dotted frame 2504 comprises the image frame obtained by the camera. The image frame is be sized h×w, as illustrated in the figure. Generally, it can be preferable to contain an entire document within the h×w frame of a single image. It will be understood, however, that some documents are too large or include too many pages for this to be preferable or even feasible.

In some embodiments, an image can be processed, or preprocessed, to automatically find and "lift" the quadrangle 2502. In other words, the document that forms quadrangle 502 can be separated from the rest of the image so that the document alone can be processed. By separating quadrangle 2502 from any background in an image, it can then be further processed.

The quadrangle 2502 can be mapped onto a rectangular bitmap in order to remove or decrease the perspective distortion. Additionally, image sharpening can be used to improve the out-of-focus score of the image. The resolution of the image can then be increased and the image converted to a black-and-white image. In some cases, a black-and-white image can have a higher recognition rate when processed using an automated document processing system in accordance with the systems and methods described herein.

An image that is bi-tonal, e.g., black-and-white, can be used in some systems. Such systems can require an image that is at least 200 dots per inch resolution. Accordingly, a color image taken using a mobile device can need to be high enough quality so that the image can successfully be converted from, for example, a 24 bit per pixel (24 bit/pixel) RGB image to a bi-tonal image. The image can be sized as if the document, e.g., check, payment coupon, etc., was scanned at 200 dots per inch.

Figure 8:
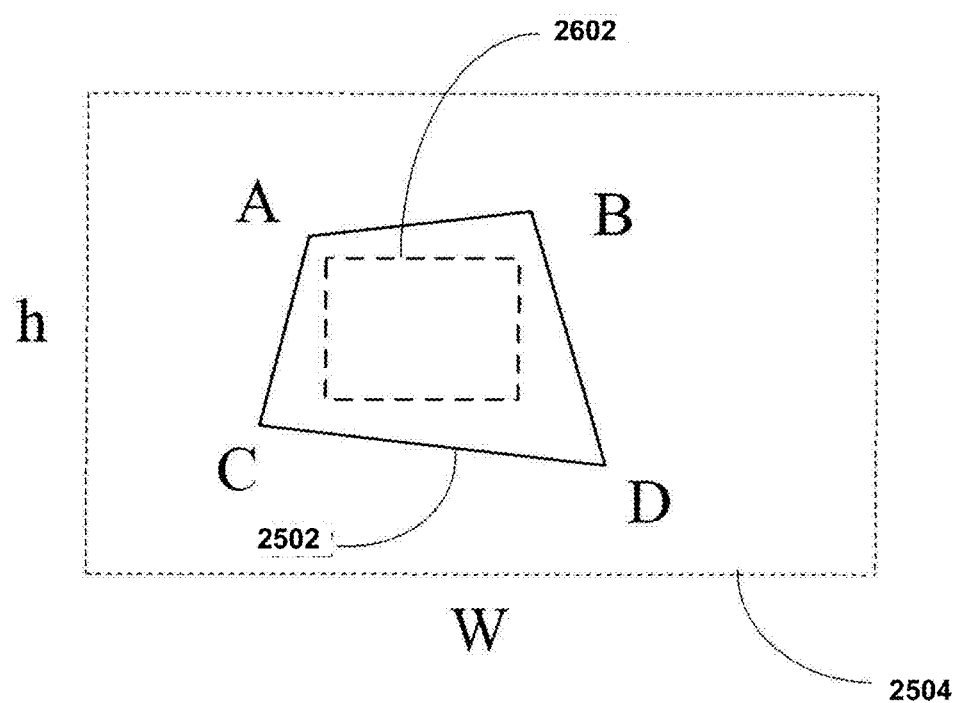
FIG. 8 is a diagram illustrating an example original image, focus rectangle and document quadrangle ABCD in accordance with the example of FIG. 7.

FIG. 8 is a diagram illustrating an example original image, focus rectangle and document quadrangle ABCD in accordance with the example of FIG. 7. In some embodiments it can be necessary to place a document for processing at or near the center of an input image close to the camera. All points A, B, C and D are located in the image, and the focus rectangle 2602 is located inside quadrangle ABCD 2502. The document can also have a low out-of-focus score and the background surrounding the document can be selected to be darker than the document. In this way, the lighter document will stand out from the darker background.

Image Correction Module

Figure 6:
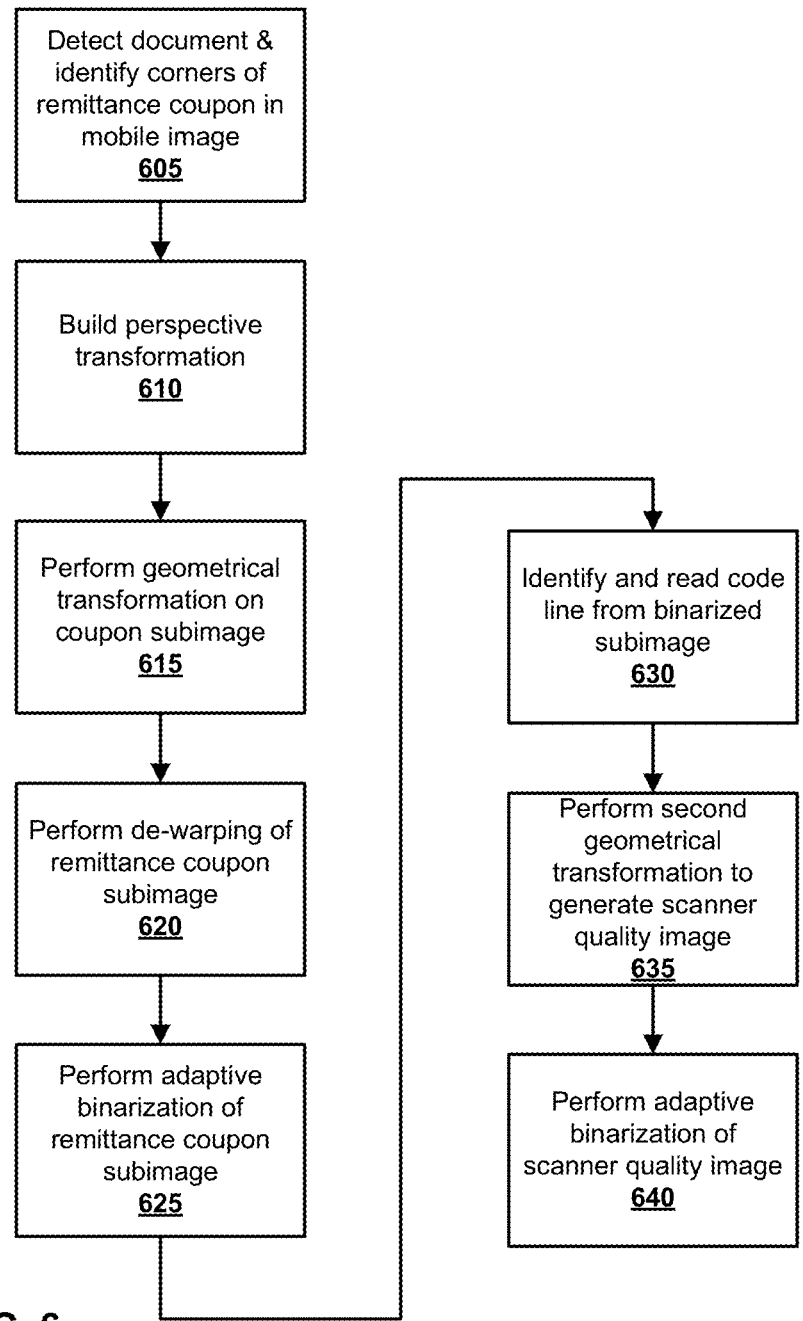
FIG. 6 is a flow diagram illustrating a method for correcting defects to mobile image according to an embodiment.

FIG. 6 is a flow diagram illustrating a method for correcting defects to mobile image according to an embodiment. According to an embodiment, the method illustrated in FIG. 6 can be performed by an image correction module implemented on the mobile remittance server 310. The method illustrated in FIG. 6 can be implemented as part of step 510 of the method illustrated in FIG. 5. The image correction module can also receive a mobile image an processing parameters from a mobile device (step 505 of FIG. 5). According to some embodiments, some or all of the image correction functionality of the image correction module can be implemented on the mobile device 340, and the mobile device 340 can be configured to send a corrected mobile image to the mobile remittance server 310 for further processing.

According to an embodiment, the image correction module can also be configured to detect an out of focus image using the technique described above and to reject the mobile image if the image focus score for the image falls below a predetermined threshold without attempting to perform other image correction techniques on the image. According to an embodiment, the image correction module can send a message to the mobile device 340 indicating that the mobile image was too out of focus to be used and requesting that the user retake the image.

Figure 9:
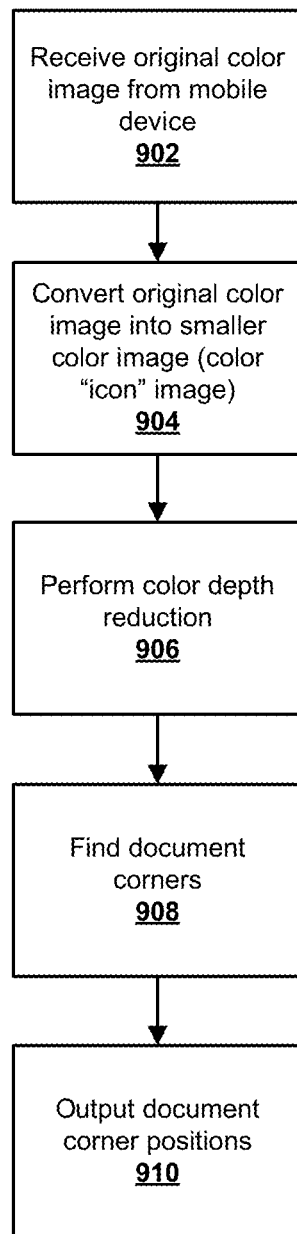
FIG. 9 is a flow chart for a method that can be used to identify the corners of the remittance coupon in a color image according to an embodiment.

The image correction module can be configured to first identify the corners of a coupon or other document within a mobile image (step 605). One technique that can be used to identify the corners of the remittance coupon in a color image is illustrated in FIG. 9 and is described in detail below. The corners of the document can be defined by a set of points A, B, C, and D that represent the corners of the document and define a quadrangle.

The image correction module can be configured to then build a perspective transformation for the remittance coupon (step 610). As can be seen in FIG. 1, the angle at which an image of a document is taken can cause the rectangular shape of the remittance coupon to appear distorted. FIG. 7 and its related description above provide some examples of how a perspective transformation can be constructed for a quadrangle defined by the corners A, B, C, and D according to an embodiment. For example, the quadrangle identified in step 605 can be mapped onto a same-sized rectangle in order to build a perspective transformation that can be applied to the document subimage, i.e. the portion of the mobile image that corresponds to the remittance coupon, in order to correct perspective distortion present in the image.

A geometrical transformation of the document subimage can be performed using the perspective transformation built in step 610 (step 615). The geometrical transformation corrects the perspective distortion present in the document subimage. An example of results of geometrical transformation can be seen in FIG. 2 where a document subimage of the remittance coupon pictured in FIG. 1 has been geometrically corrected to remove perspective distortion.

Figure 35:
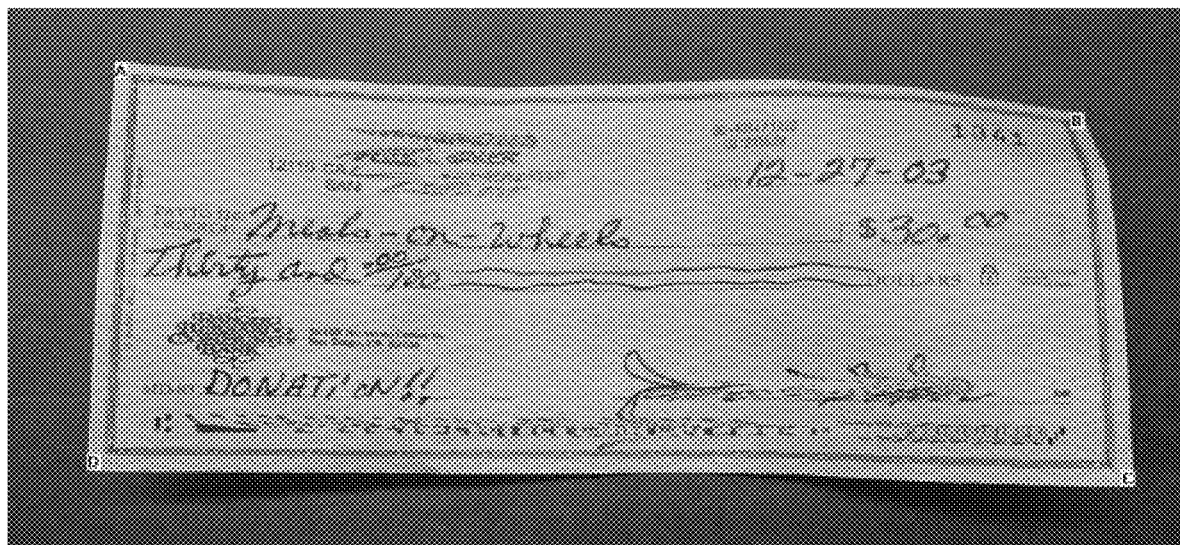
FIG. 35 illustrates an example of a mobile document image where the document is warped according to an embodiment.
Figure 36:
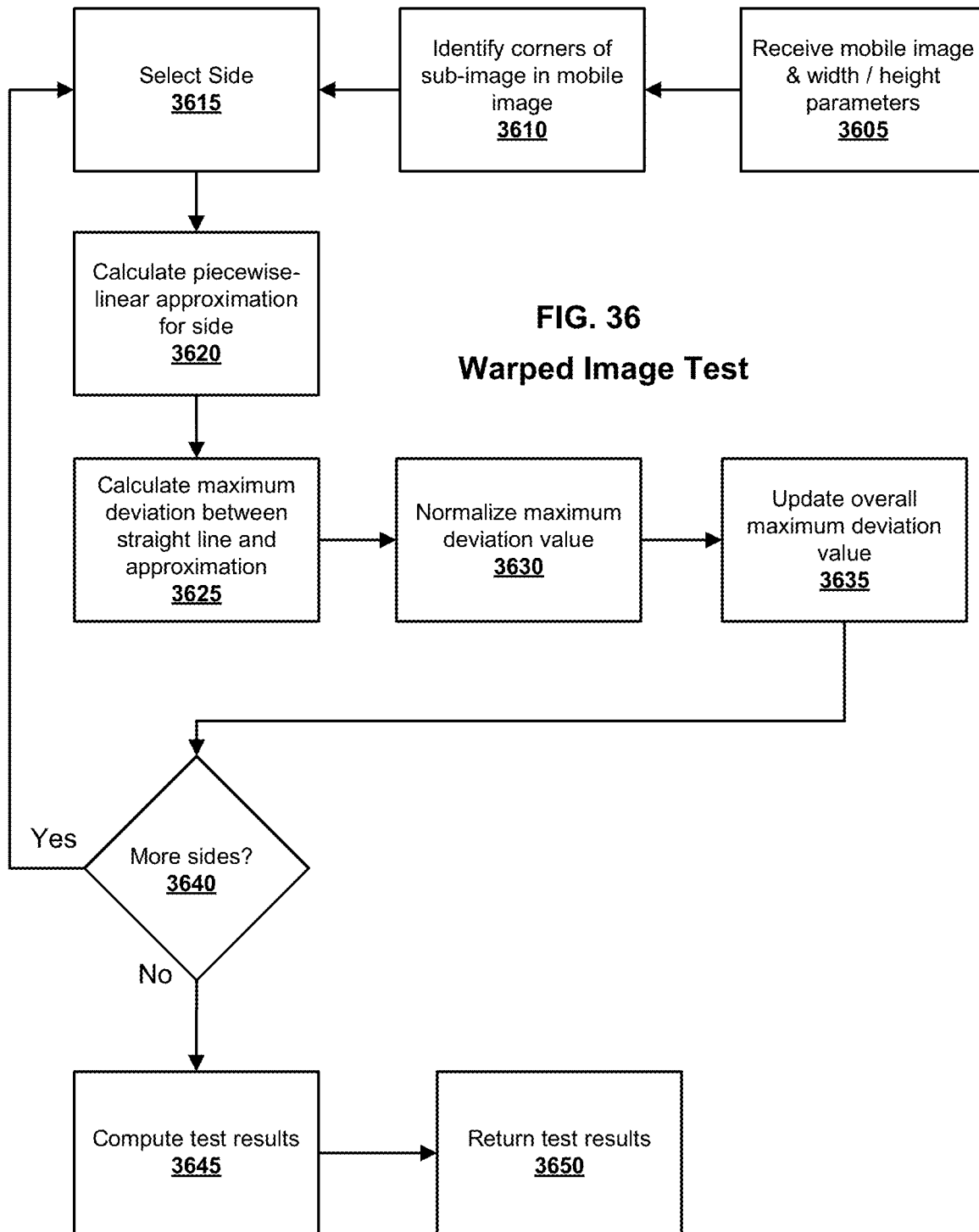
FIG. 36 is a flow diagram of a method for identifying a warped image and for scoring the image based on how badly the document subimage is warped according to an embodiment.

A "dewarping" operation can also be performed on the document subimage (step 620). An example of a warping of a document in a mobile image is provided in FIG. 35. Warping can occur when a document to be imaged is not perfectly flat or is placed on a surface that is not perfectly flat, causing distortions in the document subimage. A technique for identifying warping in a document subimage is illustrated in FIG. 36.

According to an embodiment, the document subimage can also binarized (step 625). A binarization operation can generate a bi-tonal image with color depth of 1 bit per a pixel (1 bit/pixel). Some automated processing systems, such as some Remote Deposit systems require bi-tonal images as inputs. A technique for generating a bi-tonal image is described below with respect to FIG. 10. FIG. 11 illustrates a binarized version of the geometrically corrected mobile document image of the remittance coupon illustrated in FIG. 2. As illustrated, in the bi-tonal image of FIG. 11, the necessary information, such as payees, amounts, account number, etc., has been preserved, while extra information has been removed. For example, background patterns that might be printed on the coupon are not present in the bi-tonal image of the remittance coupon. Binarization of the subimage also can be used to remove shadows and other defects caused by unequal brightness of the subimage.

Once the image has been binarized, the code line of the remittance coupon can be identified and read (step 630). As described above, many remittance coupons include a code line that comprises computer-readable text that can be used to encode account-related information that can be used to reconcile a payment received with the account for which the payment is being made. Code line 205 of FIG. 2 illustrates an example of code line on a remittance coupon.

Figure 20:
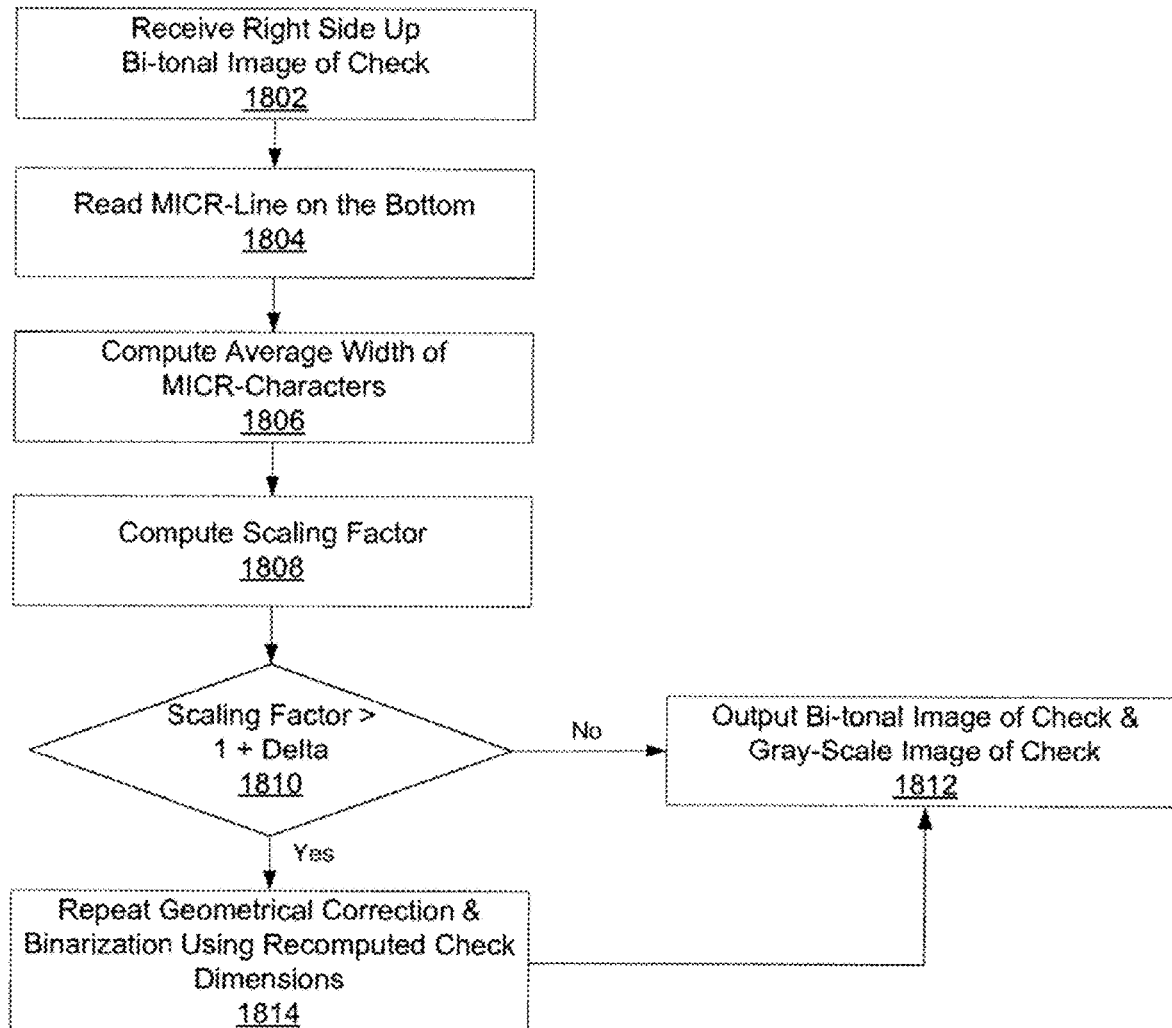
FIG. 20 provides a flowchart illustrating an example method for size correction of an image according to an embodiment.

Often, a standard optical character recognition font, the OCR-A font, is used for printing the characters comprising the code line. The OCR-A font is a fixed-width font where the characters are typically spaced 0.10 inches apart. Because the OCR-A font is a standardized fixed-width font, the image correction module can use this information to determining a scaling factor for the image of the remittance coupon. The scaling factor to be used can vary from image to image, because the scaling is dependent upon the position of the camera or other image capture device relative to the document being imaged and can also be dependent upon optical characteristics of the device used to capture the image of the document. FIG. 20 illustrates a scaling method that can be used to determine a scaling factor to be applied according to an embodiment. The method illustrated in FIG. 20 is related to scaling performed on a MICR-line of a check, but can be used to determined a scaling factor for an image of a remittance coupon based on the size of the text in the code line of the image of the remittance coupon.

Once the scaling factor for the image has been determined, a final geometrical transformation of the document image can be performed using the scaling factor (step 635). This step is similar to that in step 615, except the scaling factor is used to create a geometrically altered subimage that represents the actual size of the coupon at a given resolution. According to an embodiment, the dimensions of the geometrically corrected image produced by set 635 are identical to the dimensions of an image produced by a flat bed scanner at the same resolution.

During step 635, other geometrical corrections can also be made, such as correcting orientation of the coupon subimage. The orientation of the coupon subimage can be determined based on the orientation of the text of the code line.

Once the final geometrical transformation has been applied, a final adaptive binarization can be performed on the grayscale image generated in step 635 (step 640). The bi-tonal image output by the this step will have the correct dimensions for the remittance coupon because the bi-tonal image is generated using the geometrically corrected image generated in step 635.

According to an embodiment, the image correction module can be configured to use several different binarization parameters to generate two or more bi-tonal images of the remittance coupon. The use of multiple images can improve data capture results. The use of multiple bi-tonal images to improve data captures results is described in greater detail below.

Detecting Document within Color Mobile Image

Referring now to FIG. 9, a flowchart is provided illustrating an example method for automatic document detection within a color image from a mobile device. According to an embodiment, the method illustrated in FIG. 9 can be used to implement step 605 of the method illustrated in FIG. 6. Typically, the operations described within method of FIG. 9 are performed within an automatic document detection module of the mobile remittance server 310; however, embodiments exist where the operations reside in multiple modules. In addition, generally the automatic document detection module takes a variety of factors into consideration when detecting the document in the mobile image. The automatic document detection module can take into consideration arbitrary location of the document within the mobile image, the 3-D distortions within the mobile image, the unknown size of the document, the unknown color of the document, the unknown color(s) of the background, and various other characteristics of the mobile engine, e.g. resolution, dimensions, etc.

The method of FIG. 9 begins at step 902 by receiving the original color image from the mobile device. Upon receipt, this original color image is converted into a smaller color image, also referred to as a color "icon" image, at operation 904. This color "icon" image preserves the color contrasts between the document and the background, while suppressing contrasts inside the document. A detailed description of an example conversion process is provided with respect to FIG. 12.

A color reduction operation is then applied to the color "icon" image at step 906. During the operation, the overall color of the image can be reduced, while the contrast between the document and its background can be preserved within the image. Specifically, the color "icon" image of operation 904 can be converted into a gray "icon" image (also known as a gray-scale "icon" image) having the same size. An example, color depth reduction process is described with further detail with respect to FIG. 14.

The corners of the document are then identified within the gray "icon" image (step 910). As previously noted above with respect to FIG. 7, these corners A, B, C, and D make up the quadrangle ABCD (e.g. quadrangle ABCD 2502). Quadrangle ABCD, in turn, makes up the perimeter of the document. Upon detection of the corners, the location of the corners is outputted (step 910).

Binarization

Figure 10:
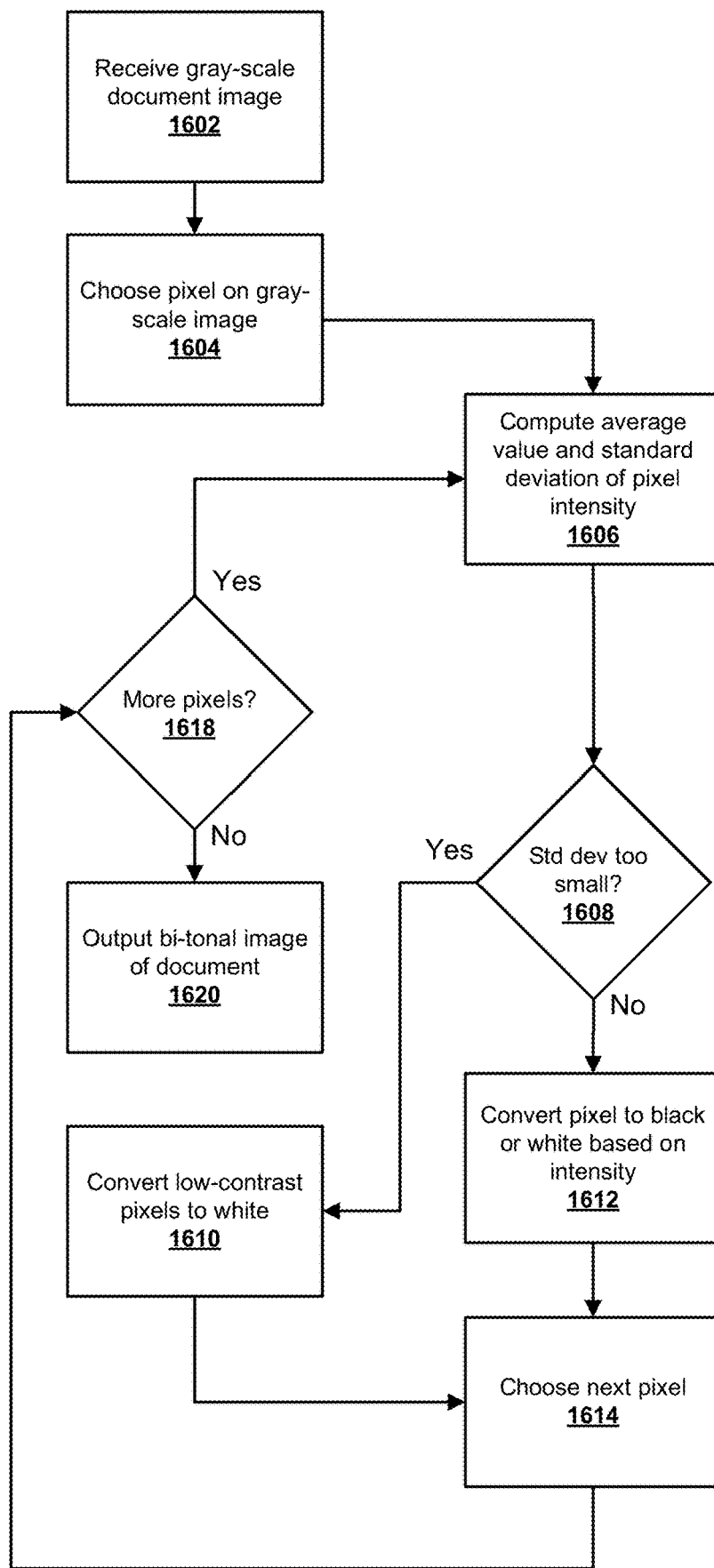
FIG. 10 is a flow diagram of a method for generating a bi-tonal image according to an embodiment.
Figure 11:
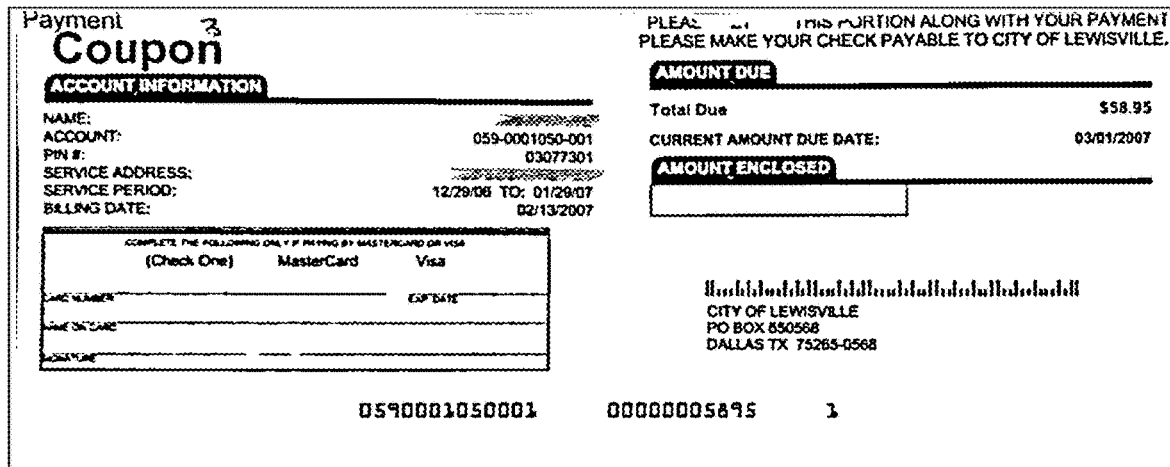
FIG. 11 illustrates an example image binarized image of a remittance coupon generated from the remittance geometrically corrected remittance coupon image illustrated in FIG. 2.

FIG. 10 illustrates a binarization method that can be used to generate a bi-tonal image from a document image according to an embodiment. The method illustrated in FIG. 10 can be used to implement the binarization step 625 of the method illustrated in FIG. 6. In an embodiment, the steps of the method illustrated in FIG. 10 can be performed within module of the mobile remittance server 310.

A binarization operation generates a bi-tonal image with color depth of 1 bit per a pixel (1 bit/pixel). In the case of documents, such as checks and deposit coupons, a bi-tonal image is required for processing by automated systems, such as Remote Deposit systems. In addition, many image processing engines require such an image as input. The method of FIG. 10 illustrates binarization of a gray-scale image of a document as produced by geometrical operation 1004. This particular embodiment uses a novel variation of well-known Niblack's method of binarization. As such, there is an assumption that the gray-scale image received has a the dimensions W pixel×H pixels and an intensity function $I(x,y)$ gives the intensity of a pixel at location $(x,y)$ in terms one of 256 possible gray-shade values (8 bit/pixel). The binarization operation will convert the 256 gray-shade value to a 2 shade value (1 bit/pixel), using an intensity function $B(x,y)$. In addition, to apply the method, a sliding window with dimensions w pixels×h pixels is defined and a threshold T for local (in-window) standard deviation of gray image intensity $I(x,y)$ is defined. The values of w, h, and T are all experimentally determined.

A gray-scale image of the document is received at step 1602, the method 1600 chooses a pixel $p(x,y)$ within the image at step 1604. In FIG. 10, the average (mean) value ave and standard deviation $\sigma$ of the chosen pixel's intensity $I(x,y)$ within the w×h current window location (neighborhood) of pixel $p(x,y)$ are computed (step 1606). If the standard deviation $\sigma$ is determined to be too small at operation 1608 (i.e. $\sigma<T$), pixel $p(x,y)$ is considered to low-contrast and, thus, part of the background. Accordingly, at step 1610, low-contrast pixels are converted to white, i.e.

set B(x,y) set to 1, which is white; however, if the deviation σ is determined to be larger or equal to the threshold T, i.e. σ≥T, the pixel p(x,y) is considered to be part of the foreground. In step 1612, if I(p)<ave−k*σ, pixel p is considered to be a foreground pixel and therefore B(x,y) is set to 0 (black). Otherwise, the pixel is treated as background and therefore B(x,y) is set to 1. In the formula above, k is an experimentally established coefficient.

Subsequent to the conversion of the pixel at either step 1610 or operation 1612, the next pixel is chosen at step 1614, and operation 1606 is repeated until all the gray-scale pixels (8 bit/pixel) are converted to a bi-tonal pixel (1 bit/pixel). However, if no more pixels remain to be converted 1618, the bi-tonal image of the document is then outputted at step 1620.

Conversion of Color Image to Icon Image

Figure 12:
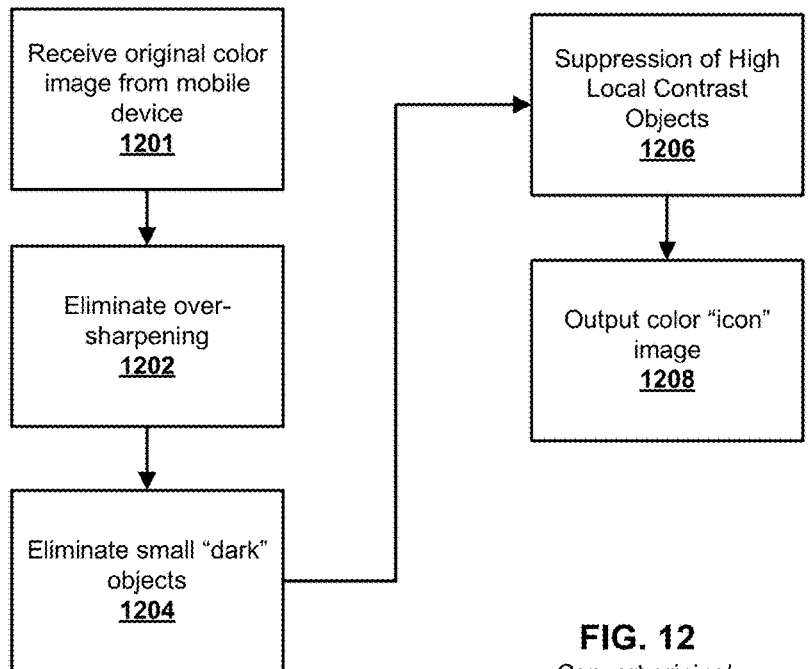
FIG. 12 is a flow diagram of a method for converting a document image into a smaller color icon image according to an embodiment.

Referring now to FIG. 12, a flowchart is provided describing an example method for conversion of a color image to a smaller "icon" image according to an embodiment. This method can be used to implement step 904 of the method illustrated FIG. 9. The smaller "icon" image preserves the color contrasts between the document depicted therein and its background, while suppressing contrasts inside the document. Upon receipt of the original color image from the mobile device (step 1201), over-sharpening is eliminated within the image (step 1202). Accordingly, assuming the color input image I has the dimensions of W×H pixels, operation 1202 averages the intensity of image I and down-scales image I to image I', such that image I' has dimensions that are half that of image/(i.e. W'=W/2 and H' H/2). Under certain embodiments, the color transformation formula can be described as the following:

$$C(p') = \text{ave}\{C(q): q \text{ in } S \times S\text{-window of } p\}, \text{ where} \quad \text{(eq. 5)}$$

C is any of red, green or blue components of color intensity;
p' is any arbitrary pixel on image I' with coordinates (x',y');
p is a corresponding pixel on image L:p=p(x,y), where x=2*x' and y=2*y';
q is any pixel included into S×S-window centered in p;
S is established experimentally; and
ave is averaging over all q in the S×S-window.

Small "dark" objects within the image can then be eliminated (step 1204). Examples of such small "dark" objects include, but are not limited to, machine-printed characters and hand-printed characters inside the document. Hence, assuming operation 1204 receives image I' from step 1202, step 1204 creates a new color image I" referred to as an "icon" with width W" set to a fixed small value and height H" set to W"*(H/W), thereby preserving the original aspect ratio of image I. In some embodiments, the transformation formula can be described as the following:

$$C(p'') = \max\{C(q'): q' \text{ in } S' \times S'\text{-window of } p'\}, \text{ where} \quad \text{(eq. 6)}$$

C is any of red, green or blue components of color intensity;
p" is an arbitrary pixel on image I";
p' is a pixel on image I' which corresponds to p" under similarity transformation, as previously defined;
q' is any pixel on image I' included into S'×S'-window centered in p';
max is maximum over all q' in the S'×S'-window;
W" is established experimentally;
S' is established experimentally for computing the intensity I"; and I"(p") is the intensity value defined by maximizing the intensity function I' (p) within the window of corresponding pixel p' on image I', separately for each color plane.

The reason for using the "maximum" rather than "average" is to make the "icon" whiter (white pixels have a RGB-value of (255,255,255)).

Figure 13A:
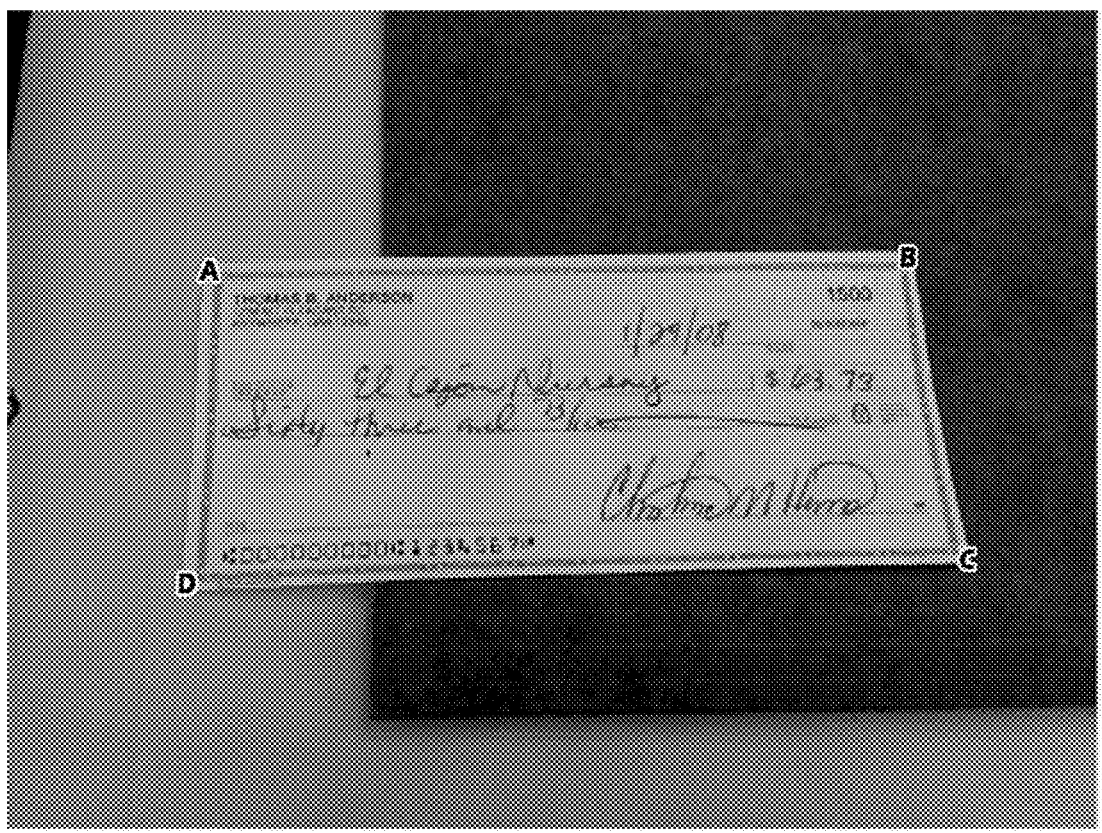
FIG. 13A is a mobile image of a check according to an embodiment.
Figure 13B:
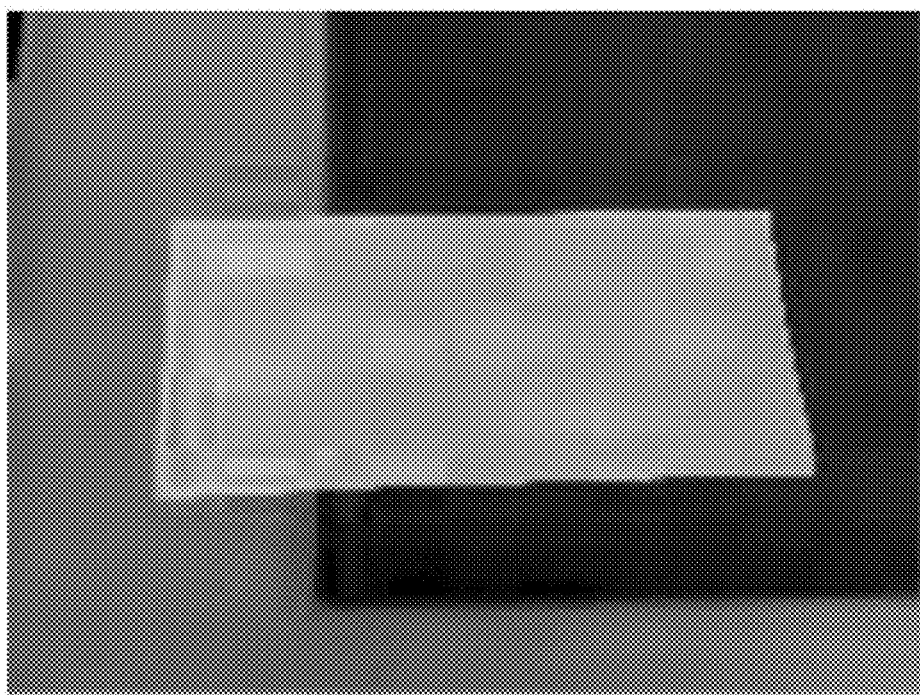
FIG. 13B is an example of a color icon image generated using the method of FIG. 12 on the example mobile image of a check illustrated in FIG. 13A according to an embodiment.

In the next operation 1206, the high local contrast of "small" objects, such as lines, text, and handwriting on a document, is suppressed, while the other object edges within the "icon" are preserved. Often, these other object edges are bold. In various embodiments of the invention, multiple dilation and erosion operations, also known as morphological image transformations, are utilized in the suppression of the high local contrast of "small" objects. Such morphological image transformations are commonly known and used by those of ordinary skill in the art. The sequence and amount of dilation and erosion operations used is determined experimentally. Subsequent to the suppression operation 1206, a color "icon" image is outputted at operation 1208. FIG. 13B depicts an example of the mobile image of a check illustrated in FIG. 13A after being converted into a color "icon" image according to an embodiment.

Color Depth Reduction

Figure 14:
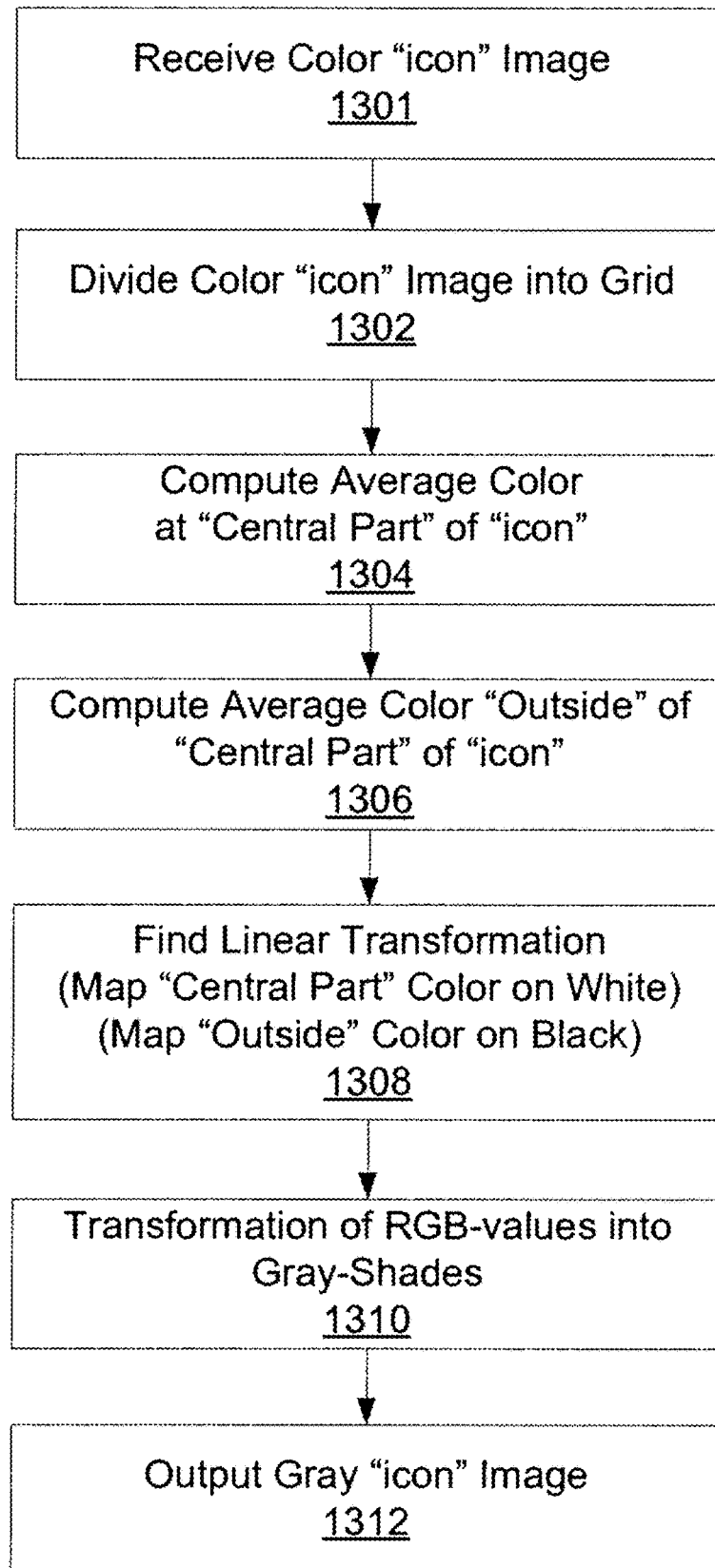
FIG. 14 is a flow diagram of a method for reducing the color depth of an image according to an embodiment.
Figure 15A:
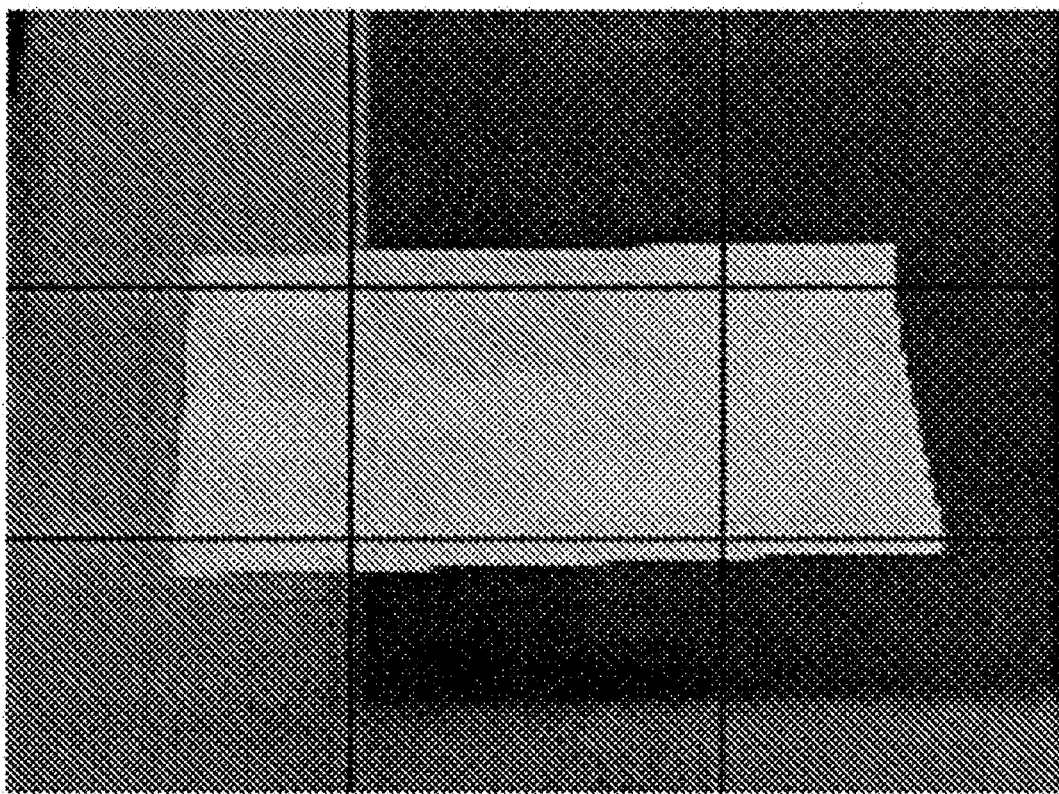
FIG. 15A depicts an example of the color "icon" image of FIG. 13B after operation 1302 has divided it into a 3×3 grid in accordance with one embodiment of the invention.

Referring now to FIG. 14, a flowchart is provided illustrating an example method that provides further details with respect to the color depth reduction operation 906 as illustrated in FIG. 9. At step 1301, a color "icon" image for color reduction is received. The color "icon" image is divided into a grid (or matrix) of fixed length and width with equal size grid elements at operation 1302. In some embodiments, the preferred grid size is such that there is a center grid element. For example, a grid size of 3×3 may be employed. FIG. 15A depicts an example of the color "icon" image of FIG. 13B after operation 1302 has divided it into a 3×3 grid in accordance with one embodiment of the invention.

Then, at step 1304, the "central part" of the icon, which is usually the center most grid element, has its color averaged. Next, the average color of the remaining parts of the icon is computed at step 1306. More specifically, the grid elements "outside" the "central part" of the "icon" have their colors averaged. Usually, in instances where there is a central grid element, e.g. 3×3 grid, the "outside" of the "central part" comprises all the grid elements other than the central grid element.

Figure 15B:
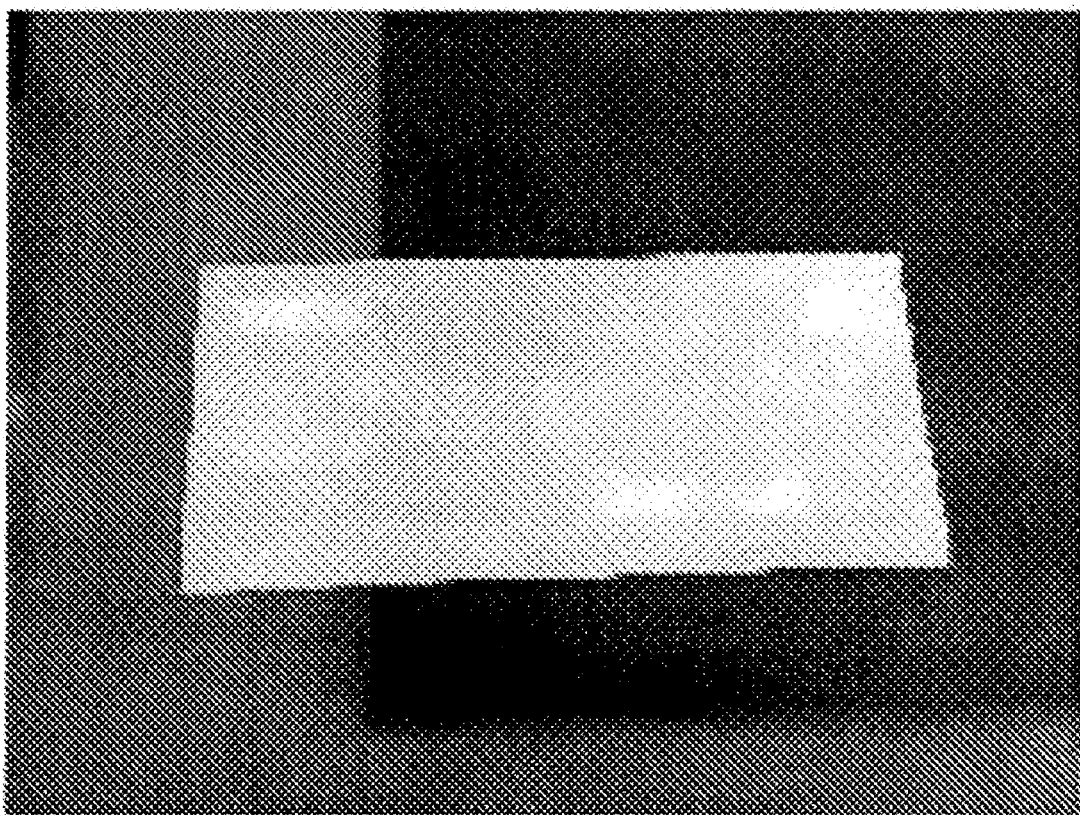
FIG. 15B depicts an example of the color "icon" image of FIG. 13B converted to a gray "icon" image using the method illustrated in FIG. 14 according to an embodiment.

Subsequently, a linear transformation for the RGB-space is determined at step 1308. The linear transformation is defined such that it maps the average color of the "central part" computed during operation 1304 to white, i.e. 255, while the average color of the "outside" computed during operation 1306 maps to black, i.e. 0. All remaining colors are linearly mapped to a shade of gray. This linear transformation, once determined, is used at operation 1310 to transform all RGB-values from the color "icon" to a gray-scale "icon" image, which is then outputted at operation 1312. Within particular embodiments, the resulting gray "icon" image, also referred to as a gray-scale "icon" image, maximizes the contrast between the document background, assuming that the document is located close to the center of the image and the background. FIG. 15B depicts an example of the color "icon" image of FIG. 13B once it has been converted to a gray "icon" image in accordance with one embodiment.

Figure 16:
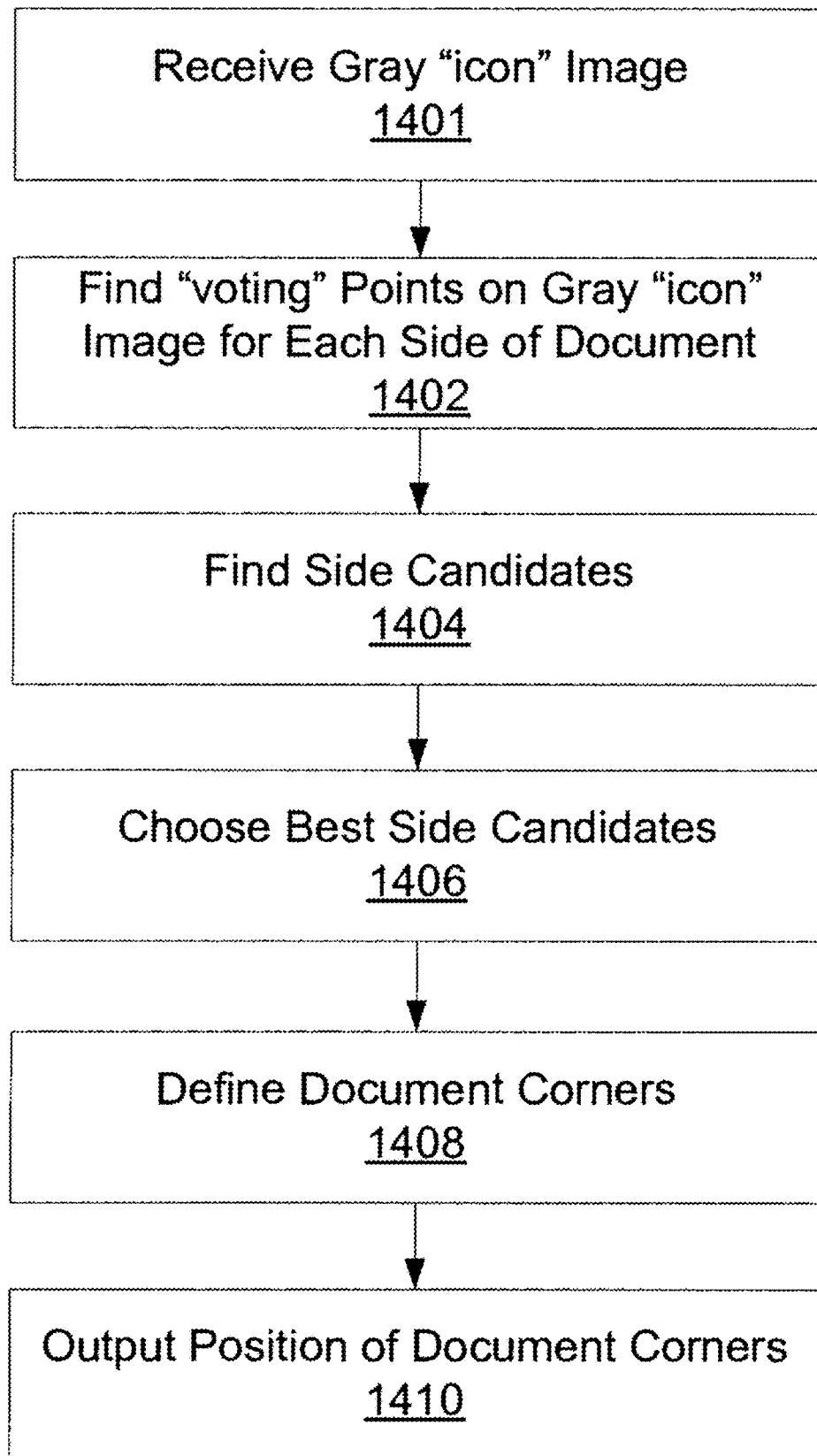
FIG. 16 is a flowchart illustrating an example method for finding document corners from a gray "icon" image containing a document according to an embodiment.

Referring now to FIG. 16, a flowchart is provided illustrating an example method for finding document corners from a gray "icon" image containing a document. The method illustrated in FIG. 16 can be used to implement step 908 of the method illustrated in FIG. 9. Upon receiving a gray "icon" image at operation 1401, the "voting" points on the gray "icon" image are found in step 1402 for each side of the document depicted in the image. Consequently, all positions on the gray "icon" image that could be approximated with straight line segments to represent left, top, right, and bottom sides of the document are found.

In accordance with one embodiment, this goal is achieved by first looking for the "voting" points in the half of the "icon" that corresponds with the current side of interest. For instance, if the current side of interest is the document's top side, the upper part of the "icon" (Y<H/2) is examined while the bottom part of the "icon" (Y≥H/2) is ignored.

Within the selected half of the "icon," the intensity gradient (contrast) in the correct direction of each pixel is computed. This is accomplished in some embodiments by considering a small window centered in the pixel and, then, breaking the window into an expected "background" half where the gray intensity is smaller, i.e. where it is supposed to be darker, and into an expected "doc" half where the gray intensity is higher, i.e. where it is supposed to be whiter. There is a break line between the two halves, either horizontal or vertical depending on side of the document sought to be found. Next the average gray intensity in each half-window is computed, resulting in an average image intensity for the "background" and an average image intensity of the "doc." The intensity gradient of the pixel is calculated by subtracting the average image intensity for the "background" from the average image intensity for the "doc."

Eventually, those pixels with sufficient gray intensity gradient in the correct direction are marked as "voting" points for the selected side. The sufficiency of the actual gray intensity gradient threshold for determining is established experimentally.

Continuing with method 1400, candidate sides, i.e. line segments that potentially represent the sides of the document, i.e. left, top, right, and bottom sides, are found. In order to do so, some embodiments find all subsets within the "voting" points determined in step 1402 that could be approximated by a straight line segment (linear approximation). In many embodiments, the threshold for linear approximation is established experimentally. This subset of lines is defined as the side "candidates." As an assurance that the set of side candidates is never empty, the gray "icon" image's corresponding top, bottom, left, and right sides are also added to the set.

Next, in step 1406 chooses the best candidate for each side of the document from the set of candidates selected in operation 1404, thereby defining the position of the document within the gray "icon" image. In accordance with some embodiments, the following process is used in choosing the best candidate for each side of the document:

The process starts with selecting a quadruple of line segments {L, T, R, B}, where L is one of the candidates for the left side of the document, T is one of the candidates for the top side of the document, R is one of the candidates for the right side of the document, and B is one of the candidates for the bottom side of the document. The process then measures the following characteristics for the quadruple currently selected.

The amount of "voting" points is approximated and measured for all line segments for all four sides. This amount value is based on the assumption that the document's sides are linear and there is a significant color contrast along them. The larger values of this characteristic increase the overall quadruple rank.

The sum of all intensity gradients over all voting points of all line segments is measured. This sum value is also based on the assumption that the document's sides are linear and there is a significant color contrast along them. Again, the larger values of this characteristic increase the overall quadruple rank.

The total length of the segments is measured. This length value is based on the assumption that the document occupies a large portion of the image. Again, the larger values of this characteristic increase the overall quadruple rank.

The maximum of gaps in each corner is measured. For example, the gap in the left/top corner is defined by the distance between the uppermost point in the L-segment and the leftmost point in the T-segment. This maximum value is based on how well the side-candidates suit the assumption that the document's shape is quadrangle. The smaller values of this characteristic increase the overall quadruple rank.

The maximum of two angles between opposite segments, i.e. between L and R, and between T and R, is measured. This maximum value is based on how well the side-candidates suit the assumption that the document's shape is close to parallelogram. The smaller values of this characteristic increase the overall quadruple rank.

The deviation of the quadruple's aspect ratio from the "ideal" document aspect ratio is measured. This characteristic is applicable to documents with a known aspect ratio, e.g. checks. If the aspect ratio is unknown, this characteristic should be excluded from computing the quadruple's rank. The quadruple's aspect ratio is computed as follows:

a) Find the quadrangle by intersecting the quadruple's elements;
b) Find middle-point of each of the four quadrangle's sides;
c) Compute distances between middle-points of opposite sides, say D1 and D2;
d) Find the larger of the two ratios: R=max(D1/D2, D2/D1);
e) Assuming that the "ideal" document's aspect ratio is known and Min/MaxAspectRatio represent minimum and maximum of the aspect ratio respectively, define the deviation in question as:
0, if MinAspectRatio<=R<=MaxAspectRatio
MinAspectRatio−R, if R<MinAspectRatio
R−MaxAspectRatio, if R>MaxAspectRatio.
f) For checks, MinAspectRatio can be set to 2.0 and MaxAspectRatio can be set to 3.0.

This aspect ratio value is based on the assumption that the document's shape is somewhat preserved during the perspective transformation. The smaller values of this characteristic increase the overall quadruple rank.

Following the measurement of the characteristics of the quadruple noted above, the quadruple characteristics are combined into a single value, called the quadruple rank, using weighted linear combination. Positive weights are assigned for the amount of "voting" points, the sum all of intensity gradients, and the total length of the segments. Negatives weights are assigned for maximum gaps in each corner, maximum two angles between opposite segments, and the deviation of the quadruple's aspect ratio. The exact values of each of the weights are established experimentally.

The operations set forth above are repeated for all possible combinations of side candidates, eventually leading to the "best" quadruple, which is the quadruple with the highest rank. The document's corners are defined as intersections of the "best" quadruple's sides, i.e. the best side candidates.

In, step 1408 the corners of the document are defined using the intersections of the best side candidates. A person of ordinary skill in the art would appreciate that these corners can then be located on the original mobile image by transforming the corner locations found on the "icon" using the similarity transformation previously mentioned. Method 1400 concludes at step 1410 where the locations of the corners defined in step 1408 are output.

Geometric Correction

Figure 17:
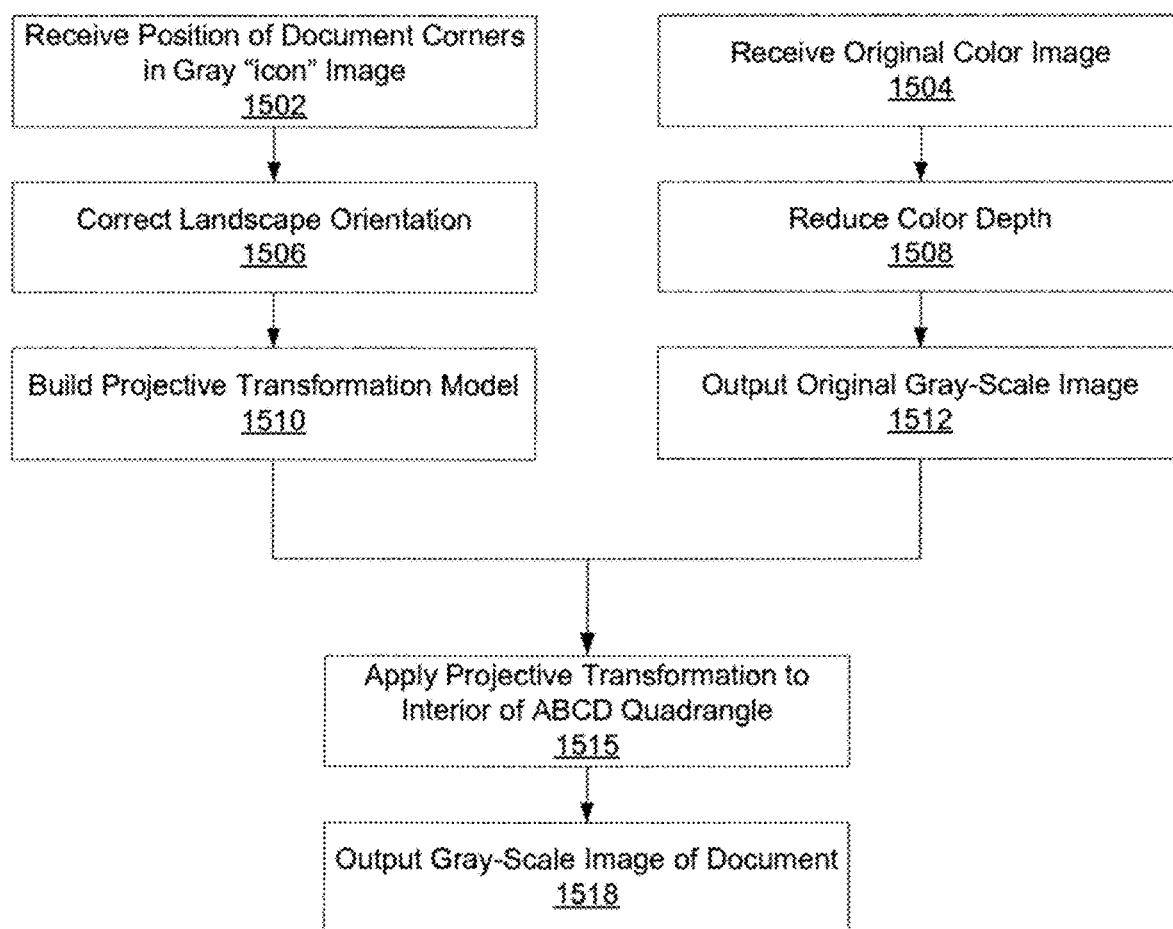
FIG. 17 is a flowchart that illustrates an example method for geometric correction according to an embodiment.

FIG. 17 provides a flowchart that illustrates an example method for geometric correction in accordance with the invention according to an embodiment. According to an embodiment, the method illustrated in FIG. 17 can be used to implement steps 610, 615, and 635 of the method illustrated in FIG. 6. As previously mentioned, geometric correction is needed to correct any possibly perspective distortions that exist in the original mobile image. Additionally, geometric correction can correct the orientation of the documentation within the original mobile image, e.g. document is orientated at 90, 180, or 270 degrees where the right-side-up orientation is 0 degrees. It should be noted that in some embodiments, the orientation of the document depends on the type of document depicted in the mobile image, as well as the fields of relevance on the document.

Figure 18A:
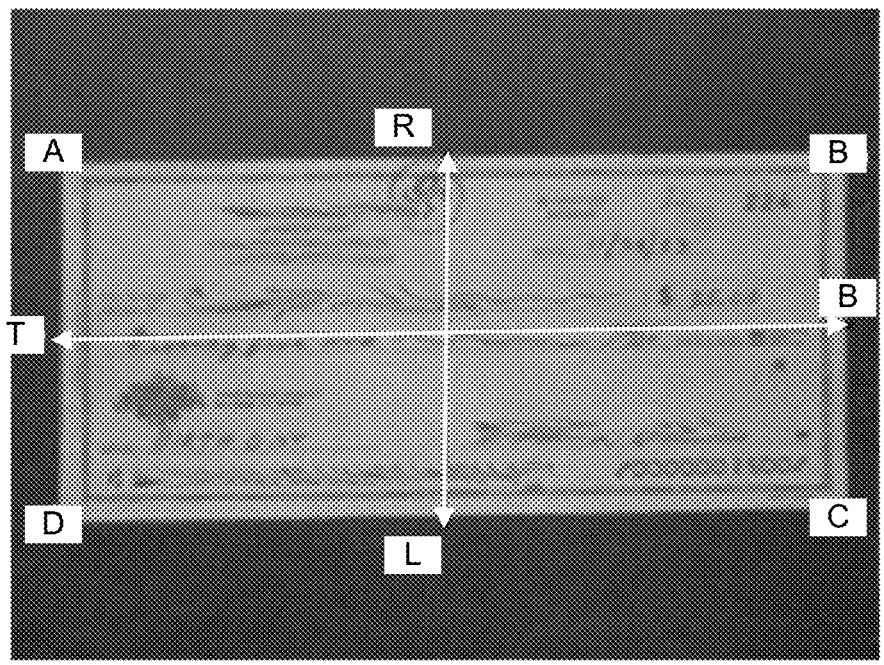
FIG. 18A is an image illustrating a mobile image of a check that is oriented in landscape orientation according to an embodiment.

In instances where the document is in landscape orientation (90 or 270 degrees), as illustrated by the check in FIG. 18A, geometric correction is suitable for correcting the orientation of the document. Where the document is at 180 degree orientation, detection of the 180 degree orientation and its subsequent correction are suitable when attempting to locate an object of relevance on the document. A codeline for a remittance coupon can be located in various locations on the remittance coupon, and might not be located along the bottom of the coupon. The ability to detect a codeline in an image of the remittance coupon changes significantly after the document has been rotated 180-degrees. In contrast, the MICR-line of check is generally known to be at a specific location along the bottom of the document, and the MICR-line can be used to determine the current orientation of the check within the mobile image. In some embodiments, the object of relevance on a document depends on the document's type. For example, where the document is a contract, the object of relevance may be a notary seal, signature, or watermark positioned at a known position on the contract. Greater detail regarding correction of a document (specifically, a check) having upside-down orientation (180 degree orientation) is provided with respect to FIG. 19.

According to some embodiments, a mathematical model of projective transformations is built and converts the distorted image into a rectangle-shaped image of predefined size. According to an embodiment, this step corresponds to step 610 of FIG. 6. In an example, where the document depicted in mobile image is a check, the predefined size is established as 1200×560 pixels, which is roughly equivalent to the dimensions of a personal check scanned at 200 DPI. In other embodiments, where the document depicted is a remittance coupon, the size of the remittance coupons may not be standardized. However, the size and spacing of the characters comprising the code line can be used to determine a scaling factor to be applied to the image to correct the size of the image of the remittance coupon relative to a specific resolution.

Continuing with reference to the method of FIG. 17, there are two separate paths of operations that are either performed sequentially or concurrently, the outputs of which are eventually utilized in the final output. One path of operations begins at step 1504 where the original mobile image in color is received. In step 1508, the color depth of the original mobile image is reduced from a color image with 24 bit per a pixel (24 bit/pixel) to a gray-scale image with 8 bit per a pixel (8 bit/pixel). This image is subsequently outputted to step 1516 as a result of step 1512.

The other path of operations begins at step 1502, where the positions of the document's corners within the gray "icon" image are received. Based off the location of the corners, the orientation of the document is determined and the orientation is corrected (step 1506). In some embodiments, this operation uses the corner locations to measure the aspect ratio of the document within the original image. Subsequently, a middle-point between each set of corners can be found, wherein each set of corners corresponds to one of the four sides of the depicted document, resulting in the left (L), top (T), right (R), and bottom (B) middle-points (step 1506). The distance between the L to R middle-points and the T to B middle points are then compared to determine which of the two pairs has the larger distance. This provides step 1506 with the orientation of the document.

In some instances, the correct orientation of the document depends on the type of document that is detected. For example, as illustrated in FIG. 18A, where the document of interest is a check, the document is determined to be in landscape orientation when the distance between the top middle-point and bottom middle-point is larger than the distance between the left middle-point and the right middle-point. The opposite might be true for other types of documents.

If it is determined in step 1506 that an orientation correction is necessary, then the corners of the document are shifted in a loop, clock-wise in some embodiments and counter-clockwise in other embodiments.

At step 1510, the projective transformation is built to map the image of the document to a predefined target image size of width of W pixels and height of H pixels. In some embodiments, the projective transformation maps the corners A, B, C, and D of the document as follows: corner A to (0,0), corner B to (W,0), corner C to (W,H), and corner D to (0,H). Algorithms for building projective transformation are commonly known and used amongst those of ordinary skill in the art.

Figure 18B:
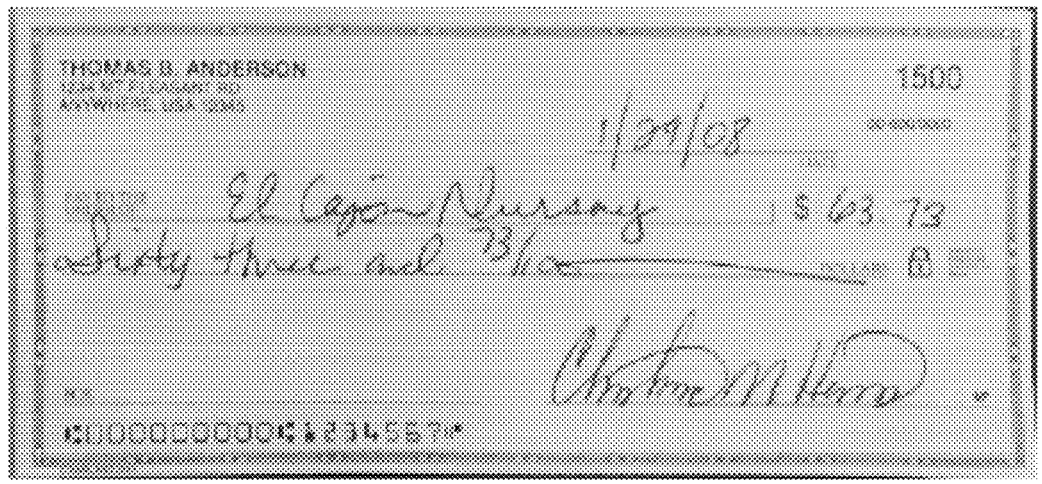
FIG. 18B example gray-scale image of the document depicted in FIG. 13A once a geometrical correction operation has been applied to the image according to an embodiment.

At step 1516, the projective transformation created during step 1514 is applied to the mobile image in gray-scale as outputted as a result of step 1512. The projective transformation as applied to the gray-scale image of step 1512 results in all the pixels within the quadrangle ABCD depicted in the gray-scale image mapping to a geometrically corrected, gray-scale image of the document alone. FIG. 18B is an example gray-scale image of the document depicted in FIG. 13A once a geometrical correction operation in accordance with the invention is applied thereto. The process concludes at operation 1518 where the gray-scale image of the document is outputted to the next operation.

Correcting Landscape Orientation

Figure 19:
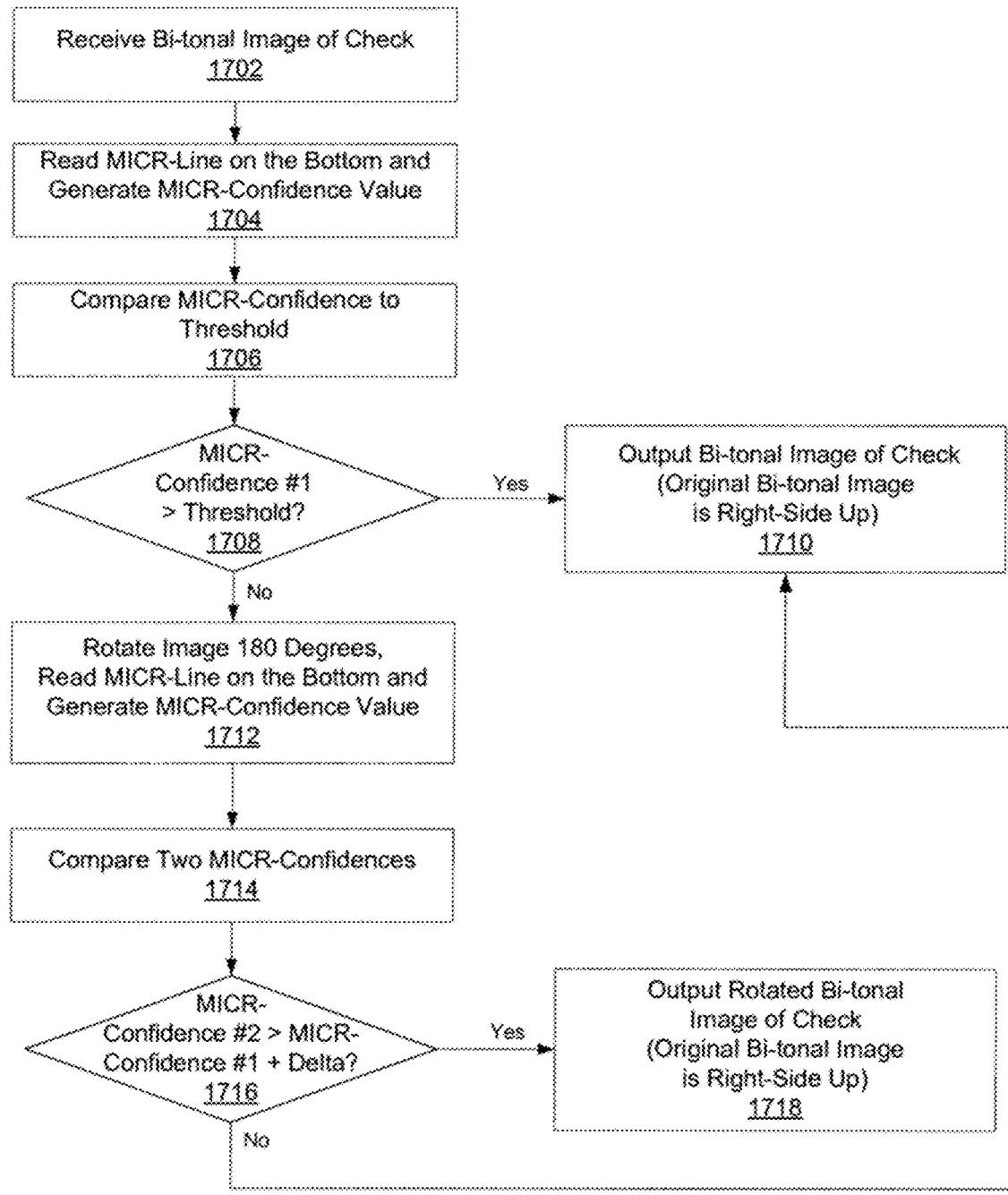
FIG. 19 is a flow chart illustrating a method for correcting landscape orientation of a document image according to an embodiment.

FIG. 19 is a flow chart illustrating a method for correcting landscape orientation of a document image according to an embodiment. As previously noted, the geometric correction operation as described in FIG. 17 is one method in accordance with the invention for correcting a document having landscape orientation within the mobile image. However, even after the landscape orientation correction, the document still may remain in upside-down orientation. In order to the correct upside-down orientation for certain documents, some embodiments of the invention require the image containing the document be binarized beforehand. Hence, the orientation correction operation included in step 635 usually follows the binarization operation of 625. While the embodiment described herein uses the MICR-line of a check or determine the orientation of an image, the code line of a remittance coupon can be used to determine the orientation of a remittance coupon using the technique described herein.

Upon receiving the bi-tonal image of the check at operation 1702, the MICR-line at the bottom of the bi-tonal check image is read at operation 1704 and an MICR-confidence value is generated. This MICR-confidence value (MC1) is compared to a threshold value T at operation 1706 to determine whether the check is right-side-up. If MC1>T at operation 1708, then the bi-tonal image of the check is right side up and is outputted at operation 1710.

However, if MC1≤T at operation 1708, then the image is rotated 180 degrees at operation 1712, the MICR-line at the bottom read again, and a new MICR-confidence value generated (MC2). The rotation of the image by 180 degree is done by methods commonly-known in the art. The MICR-confidence value after rotation (MC2) is compared to the previous MICR-confidence value (MC1) plus a Delta at operation 1714 to determine if the check is now right-side-up. If MC2>MC2+Delta at operation 1716, the rotated bi-tonal image has the check right-side-up and, thus, the rotated image is outputted at operation 1718. Otherwise, if MC2<MC2+Delta at operation 1716, the original bi-tonal image of the check is right-side-up and outputted at operation 1710. Delta is a positive value selected experimentally that reflects a higher apriori probability of the document initially being right-side-up than upside-down.

Size Correction

FIG. 20 provides a flowchart illustrating an example method for size correction of an image according to an embodiment. The method of FIG. 20 can be used to implement the size correction step described in relation to step 630 of FIG. 6. Specifically, FIG. 20 illustrates an example method, in accordance with one embodiment, for correcting the size of a check within a bi-tonal image, where the check is oriented right-side-up. A person of ordinary skill in the art would understand and appreciate that this method can operate differently for other types of documents, e.g. deposit coupons, remittance coupons.

Since many image processing engines are sensitive to image size, it is crucial that the size of the document image be corrected before it can be properly processed. For example, a form identification engine may rely on the document size as an important characteristic for identifying the type of document that is being processed. Generally, for financial documents such as checks, the image size should be equivalent to the image size produced by a standard scanner running at 200 DPI.

In addition, where the document is a check, during the geometric correction operation of some embodiments of the invention, the geometrically corrected predefined image size is at 1200×560 pixels (See, for e.g., FIG. 15 description), which is roughly equivalent to the size of a personal check scanned at 200 DPI; however, the size of business checks tend to vary significantly, with most business checks having a width greater than 1200 pixels when scanned at 200 DPI. Some business checks are known to be as wide as 8.75", which translates to be 1750 pixels in width when scanned at 200 DPI. Hence, in order to restore the size of business checks that have been geometrically corrected in accordance with the invention at a predefined image size of 1200×560 pixels, the size correction operation is performed.

Referring now to FIG. 20, after receiving a bi-tonal image containing a check that is orientated right-side-up at operation 1802, the MICR-line at the bottom of the check is read at operation 1804. This allows the average width of the MICR-characters to be computed at operation 1806. In doing so, the computer average width gets compared to the average size of an MICR-character at 200 DPI at operation 1808, and a scaling factor is computed accordingly. In some embodiments of the invention, the scaling factor SF is computer as follows:

$$SF = AW_{200}/AW, \text{ where} \quad \text{(eq. 7)}$$

AW is the average width of the MICR-character found; and $AW_{200}$ is the corresponding "theoretical" value based on the ANSI x9.37 standard (Specifications for Electronic Exchange of Check and Image Data) at 200 DPI.

The scaling factor is used at operation 1810 to determine whether the bi-tonal image of the check requires size correction. If the scaling SF is determined to be less than or equal to 1.0+Delta, then the most recent versions of the check's bi-tonal image and the check's the gray-scale image are output at operation 1812. Delta defines the system's tolerance to wrong image size.

If, however, the scaling factor SF is determined to be higher than 1.0+Delta, then at operation 1814 the new dimensions of the check are computed as follows:

$$AR = H_S/W_S \quad \text{(eq. 8)}$$

$$W' = W*SF \quad \text{(eq. 9)}$$

$$H' = AR*W', \text{ where} \quad \text{(eq. 10)}$$

$H_S$ and $W_S$ are the height and width of the check snippet found on the original image;

AR is the check aspect ratio which we want to maintain while changing the size;

W is the width of geometrically corrected image before it's size is adjusted;

W' is the adjusted check's width in pixels; and

H' is the adjusted check's height in pixels.

Subsequent to re-computing the new dimensions, operation 1814 repeats geometrical correction and binarization using the newly dimensioned check image. Following the repeated operations, operation 1812 outputs the resulting bi-tonal image of the check and gray-scale image of the check.

Image Quality Assurance

Once the mobile remittance server 310 has processed a mobile image (see step 510 of the method illustrated in FIG. 5), the mobile remittance server 310 can be configured to perform image quality assurance processing on the mobile image to determine whether the quality of the image is sufficient to submit to a remittance processor 215.

Figure 21:
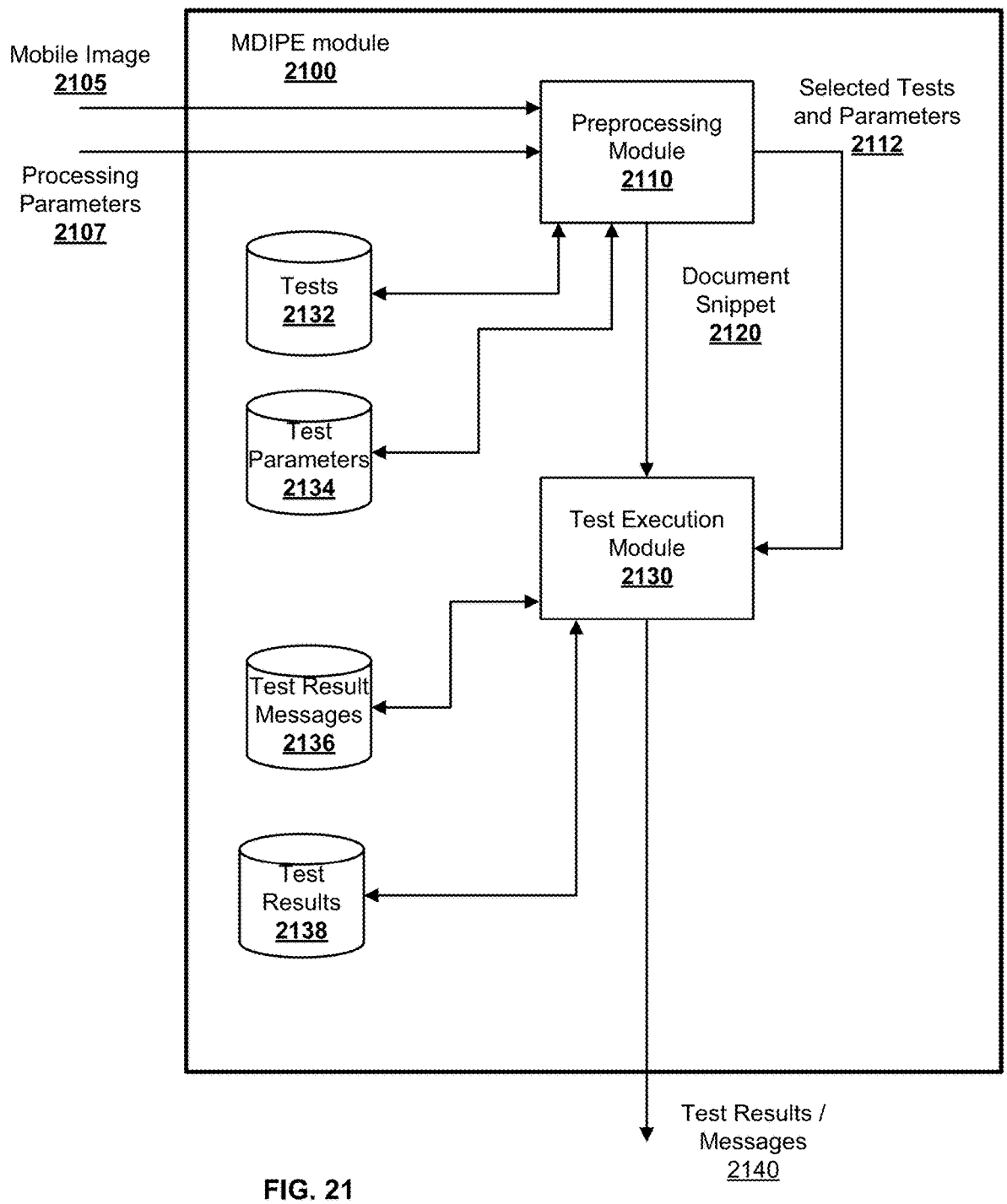
FIG. 21 illustrates a mobile document image processing engine (MDIPE) module 2100 for performing quality assurance testing on mobile document images according to an embodiment.

FIG. 21 illustrates a mobile document image processing engine (MDIPE) module 2100 for performing quality assurance testing on mobile document images according to an embodiment. The MDIPE module 2100 can receive a mobile document image captured by a mobile device, or multiple mobile images for some tests; perform preprocessing on the mobile document image; select tests to be performed on the mobile document image; and execute the selected tests to determine whether the quality of the image of a high enough quality for a particular mobile application. The MDIPE module 2100 includes a preprocessing module 2110 and test execution module 2130. The preprocessing module 2110 can be configured to receive a mobile image 2105 captured using a camera of a mobile device as well as processing parameters 2107. According to an embodiment, the mobile image 2105 and the processing parameters 2107 can be passed to MDIPE 2100 by a mobile application on the mobile device where the mobile application provides the mobile image 2105 to the MDIPE 2100 to have the quality of the mobile image 2105 assessed.

The processing parameters 2107 can include various information that the MDIPE 2100 can use to determine which tests to run on the mobile image 2105. For example, the processing parameters 2107 can identify the type of device used to capture the mobile image 2105, the type of mobile application that will be used to process the mobile image if the mobile image passes the IQA testing, or both. The MDIPE 2100 can use this information to determine which tests to select from test data store 2132 and which test parameters to select from test parameter data store 2134. For example, if a mobile image is being tested for a mobile deposit application that expects an image of a check, a specific set of tests related to assessing the image quality for a mobile image of a check can be selected, such as an MICR-line test, or a test for whether an image is blurry, etc. The MDIPE 2100 can also select test parameters from test parameters data store 2134 that are appropriate for the type of image to be processed, or for the type of mobile device that was used to capture the image, or both. In an embodiment, different parameters can be selected for different mobile phones that are appropriate for the type of phone used to capture the mobile image. For example, some mobile phones might not include an autofocus feature.

The preprocessing module 2110 can process the mobile document image to extract a document snippet that includes the portion of the mobile document that actually contains the document to be processed. This portion of the mobile document image is also referred to herein as the document subimage. The preprocessing module 2110 can also perform other processing on the document snippet, such as converting the image to a grayscale or bi-tonal document snippet, geometric correction of the document subimage to remove view distortion, etc. Different tests can require different types of preprocessing to be performed, and the preprocessing module 2110 can produce mobile document snippets from a mobile document image depending on the types of mobile IQA tests to be executed on the mobile document image.

The test execution module 2130 receives the selected tests and test parameters 2112 and the preprocessed document snippet (or snippets) 120 from the preprocessing mobile 110. The test execution module 2130 executes the selected tests on the document snippet generated by the preprocessing module 2110. The test execution module 2130 also uses the test parameters provided by the preprocessing module 2110 when executing the test on the document snippet. The selected tests can be a series of one or more tests to be executed on the document snippets to determine whether the mobile document image exhibits geometrical or other defects.

The test execution module 2130 executes each selected test to obtain a test result value for that test. The test execution module 2130 then compares that test result value to a threshold value associated with the test. If the test result value is equal to or exceeds the threshold, then the mobile image has passed the test. Otherwise, if the test result value is less than the threshold, the mobile document image has failed the test. According to some embodiments, the test execution module 2130 can store the test result values for the tests performed in test results data store 2138.

According to an embodiment, the test threshold for a test can be stored in the test parameters data store 2134 and can be fetched by the preprocessing module 2110 and included with the test parameters 2112 provided to the test execution module 2130. According to an embodiment, different thresholds can be associated with a test based on the processing parameters 2107 received by the preprocessing module 2110. For example, a lower threshold might be used for an image focus IQA test for image capture by camera phones that do not include an autofocus feature, while a higher threshold might be used for the image focus IQA test for image capture by camera phones that do include an autofocus feature.

According to an embodiment, a test can be flagged as "affects overall status." These tests are also referred to here as "critical" tests. If a mobile image fails a critical test, the MDIPE 2100 rejects the image and can provide detailed information to the mobile device user explaining why the image was not of a high enough quality for the mobile application and that provides guidance for retaking the image to correct the defects that caused the mobile document image to fail the test, in the event that the defect can be corrected by retaking the image.

According to an embodiment, the test result messages provided by the MDIPE 2100 can be provided to the mobile application that requested the MDIPE 2100 perform the quality assurance testing on the mobile document image, and the mobile application can display the test results to the user of the mobile device. In certain embodiments, the mobile application can display this information on the mobile device shortly after the user takes the mobile document image to allow the user to retake the image if the image is found to have defects that affect the overall status of the image. In some embodiments, where the MDIPE 2100 is implemented at least in part on the mobile device, the MDIPE 2100 can include a user interface module that is configured to display the test results message on a screen of the mobile device.

FIG. 21 merely provides a description of the logical components of the MDIPE 2100. In some embodiments, the MDIPE 2100 can be implemented on the mobile device 340, in software, hardware, or a combination thereof. In other embodiments, the MDIPE 2100 can be implemented on the mobile remittance server 310, and the mobile device can send the mobile image 2105 and the processing parameters 2107, e.g., via a wireless interface, to the mobile remittance server 310 for processing, and the mobile remittance server 310 can send the test results and test messages 2140 to the mobile device to indicate whether the mobile image passed testing. In some embodiments, part of the functionality of the MDIPE 2100 can be implemented on the mobile device while other parts of the MDIPE 2100 are implemented on the remote server. The MDIPE 2100 can be implemented in software, hardware, or a combination thereof. In still other embodiments, the MDIPE 2100 can be implemented entirely on the remote server, and can be implemented using appropriate software, hardware, or a combination there.

Figure 22:
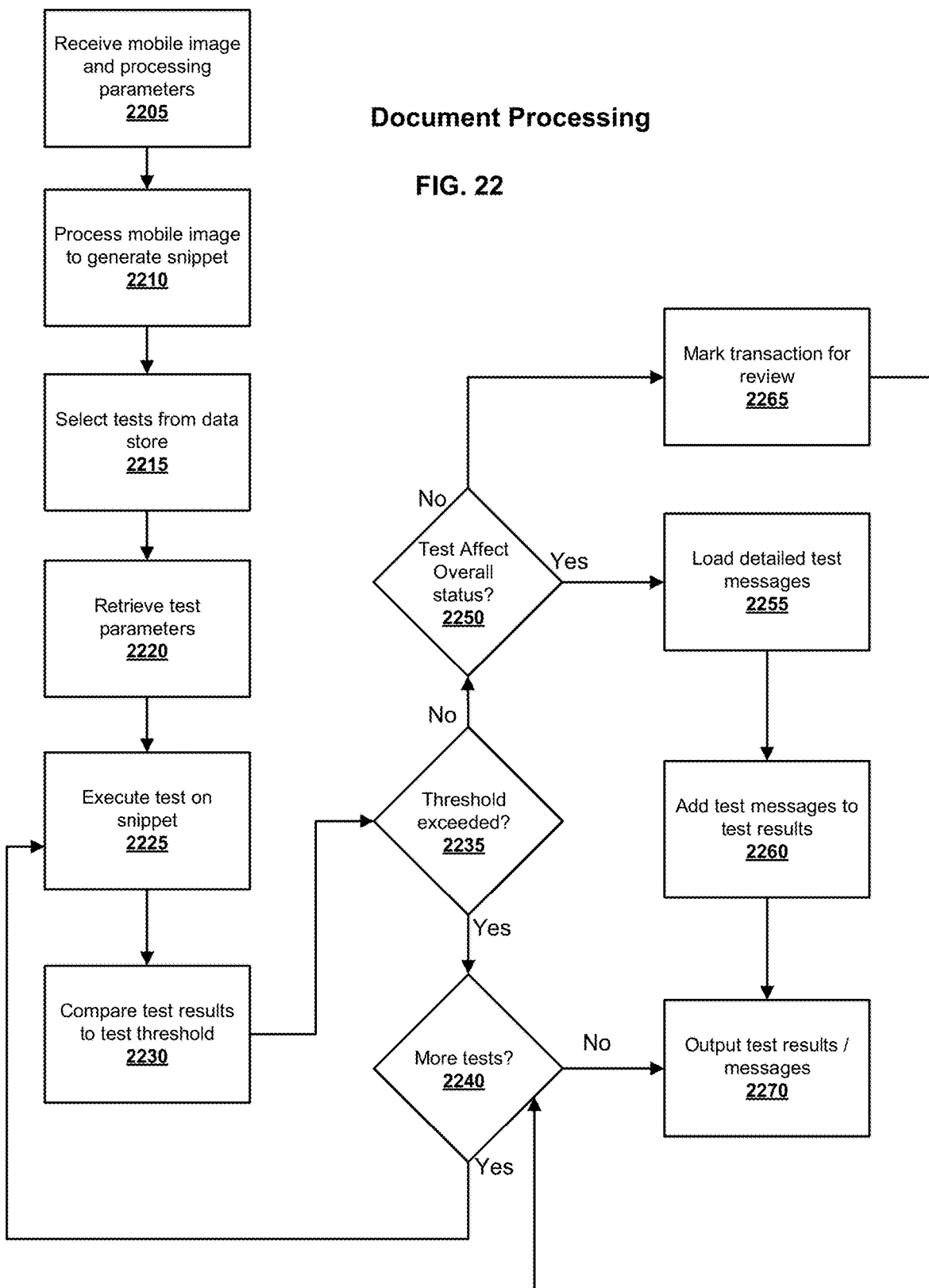
FIG. 22 is a flow diagram of a process for performing mobile image quality assurance on an image captured by a mobile device according to an embodiment.

FIG. 22 is a flow diagram of a process for performing mobile image quality assurance on an image captured by a mobile device according to an embodiment. The process illustrated in FIG. 22 can be performed using the MDIPE 2100 illustrated in FIG. 21.

The mobile image 2105 captured by a mobile device is received (step 2205). The mobile image 2105 can also be accompanied by one or more processing parameters 2107.

As described above, the MDIPE 2100 can be implemented on the mobile device, and the mobile image can be provided by a camera that is part of or coupled to the mobile device. In some embodiments, the MDIPE 2100 can also be implemented at least in part on a remote server, and the mobile image 2105 and the processing parameters 2107 can be transmitted to the remove server, e.g., via a wireless interface included in the mobile device.

Once the mobile image 2105 and the processing parameters 2107 have been received, the mobile image is processed to generate a document snippet or snippets (step 2210). For example, preprocessing module 2110 of MDIPE 2100 can be used to perform various preprocessing on the mobile image. One part of this preprocessing includes identifying a document subimage in the mobile image. The subimage is the portion of the mobile document image that includes the document. The preprocessing module 2110 can also perform various preprocessing on the document subimage to produce what is referred to herein as a "snippet." For example, some tests can require that a grayscale image of the subimage be created. The preprocessing module 2110 can create a grayscale snippet that represents a grayscale version of the document subimage. In another example, some tests can require that a bitonal image of the subimage be created. The preprocessing module 2110 can create a bitonal snippet that represents a bitonal version of the document subimage. In some embodiments, the MDIPE 2100 can generate multiple different snippets based on the types of tests to be performed on the mobile document image.

After processing the mobile document image to generate a snippet, the MDIPE 2100 then selects one or more tests to be performed on the snippet or snippets (step 2215). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2220). According to an embodiment, the test parameters can be used to configure or customize the tests to be performed. For example, different test parameters can be used to configure the tests to be more or less sensitive to certain attributes of the mobile image. In an embodiment, the test parameters can be selected based on the processing parameters 2107 received with the mobile image 2105. As described above, these processing parameters can include information, such as the type of mobile device used to capture the mobile image as well as the type of mobile application that is going to be used to process the mobile image if the mobile image passes scrutiny of the mobile image IQA system.

Once the tests and the test parameters have been retrieved and provided to the test execution module 2130, a test is selected from tests to be executed, and the test is executed on the document snippet to produce a test result value (step 2225). In some embodiments, more than one document snippet may be used by a test. For example, a test can be performed that tests whether images of a front and back of a check are actually images of the same document can be performed. The test engine can receive both an image of the front of the check and an image of the back of the check from the preprocessing module 2110 and use both of these images when executing the test.

The test result value obtained by executing the test on the snippet or snippets of the mobile document is then compared to test threshold to determine whether the mobile image passes or fails the test (step 2230) and a determination is made whether the test results exceed the threshold (step 2235). According to an embodiment, the test threshold can be configured or customized based on the processing parameters 2107 received with the mobile image. For example, the test for image blurriness can be configured to use a higher threshold for passing if the image is to be used to for a mobile deposit application where the MICR-line information needs to be recognized and read from the document image. In contrast, the test for blurriness can be configured use a lower threshold for passing the mobile image for some mobile applications. For example, the threshold for image quality may be lowered for if a business card is being imaged rather than a check. The test parameters can be adjusted to minimize the number of false rejects and false accept rate, the number of images marked for reviewing, or both.

The "affects overall status" flag of a test can also be configured based on the processing parameters 2107. For example, a test can be marked as not affecting the overall status for some types of mobile applications or for documents being processed, or both. Alternatively, a test can also be marked as affecting overall status for other types of mobile applications or documents being processed, or both. For example, a test that identifies the MICR-line of a check can be marked as "affecting overall status" so that if the MICR-line on the check cannot be identified in the image, the image will fail the test and the image will be rejected. In another example, if the mobile application is merely configured to receive different types of mobile document image, the mobile application can perform a MICR-line test on the mobile document image in an attempt to determine whether the document that was imaged was a check. In this example, the MICR-line may not be present, because a document other than a check may have been imaged. Therefore, the MICR-line test may be marked as not "affecting overall status," and if a document fails the test, the transaction might be flagged for review but not marked as failed.

Since different camera phones can have cameras with very different optical characteristics, image quality may vary significantly between them. As a result, some image quality defects may be avoidable on some camera phones and unavoidable on the others and therefore require different configurations. To mitigate the configuration problem, Mobile IQA test can be automatically configured for different camera phones to use different tests, or different thresholds for the tests, or both. For example, as described above, a lower threshold can be used for an image focus IQA test on mobile document images that are captured using a camera phone that does not include an autofocus feature than would be used for camera phones that do include an autofocus feature, because it can be more difficult for a user to obtain as clear an image on using a device that doesn't an autofocus feature.

In certain embodiments, if the test result exceeded or equaled the threshold, the image passed the test and a determination is made whether there are more tests to be executed (step 2240). If there are more tests to be executed, the next test can be selected and executed on the document snippet (step 2225). Otherwise, if there were not more tests to be executed, the test results, or test messages, or both are output by MDIPE 2100 (step 2270). There can be one or more test messages included with the results if the mobile image failed one more of the tests that were executed on the image.

In such embodiments, if the test result was less than the threshold, then the mobile image has failed the test. A determination is made whether the test affects the overall status (step 250). If the test affects the overall status of the image, detailed test result messages that explain why the image failed the test can be loaded from the test message data store 134 (step 2255) and the test result messages can be added to the test results (step 2260). The test results and test messages can then be output by the MDIPE 2100 (step 2270).

Alternatively, if the test did not affect the overall status, the test results can be loaded noted and the transaction can be flagged for review (step 2265). By flagging the transaction for review, a user of a mobile device can be presented with information indicating that a mobile image has failed at least some of the test that were performed on the image, but the image still may be of sufficient quality for use with the mobile application. The user can then be presented with the option to retake the image or to send the mobile image to the mobile application for processing. According to some embodiments, detailed test messages can be loaded from the test message data store 134 for all tests that fail and can be included with the test results, even if the test is not one that affects the overall status of the mobile image.

According to some embodiments, the mobile IQA test can also be configured to eliminate repeated rejections of a mobile document. For example, if an image of a check is rejected as have too low a contrast by a contrast test, the image is rejected, and the user can retake and resubmit the image via the mobile application, the processing parameters 2107 received with the mobile image can include a flag indicating that the image is being resubmitted. In some embodiments, the thresholds associated with the tests that the image failed can be lowered to see if the image can pass the test with a lower threshold. In some embodiments, the thresholds are only lowered for non-critical tests. According to an embodiment, the processing parameters 2107 can also include a count of the number of times that an image has been resubmitted and the thresholds for a test are only lowered after a predetermined number of times that the image is resubmitted.

FIG. 23 is a flow diagram of a process for performing mobile image quality assurance on an image of a check captured by a mobile device according to an embodiment. Like the process illustrated in FIG. 22, the process illustrated in FIG. 23 can be performed using the MDIPE 2100 illustrated in FIG. 21. The method illustrated in FIG. 23 can be used where an image of a check is captured in conjunction with a remittance payment. The method illustrated in FIG. 23 can be used to assess the quality of the image of the check.

The method illustrated in FIG. 23 illustrates how the mobile IQA and MDIPE 2100 can be used with the electronic check processing provided under the Check Clearing for the 21st Century Act. The Check Clearing for the 21st Century Act (also referred to as the "Check 21 Act") is a United States federal law (Pub.L. 108-100) that was enacted on Oct. 28, 2003. The law allows the recipient of a paper check to create a digital version of the original check called a "substitute check," which can be processed, eliminating the need to process the original physical document. The substitute check includes an image of the front and back sides of the original physical document. The mobile IQA tests can be used check the quality of the images captured by a mobile device. The snippets generated by the MDIPE 2100 can then be further tested by one or more Check 21 mobile IQA tests that perform image quality assurance on the snippets to determine whether the images meet the requirements of the Check 21 Act as well.

The mobile image 2105 captured by a mobile device is received (step 2305). In an embodiment, image of the front and back sides of the check can be provided. The mobile image 2105 can also be accompanied by one or more processing parameters 2107. Check data can also be optionally received (step 2307). The check data can be optionally provided by the user at the time that the check is captured. This check data can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check data, and other processing parameters to the MDIPE 2100.

Once the mobile image 2105, the processing parameters 2107, and the check data have been received, the mobile image is processed to generate a document snippet or snippets (step 2310). As described above, the preprocessing can produce one or more document snippets that include the portion of the mobile image in which the document was located. The document snippets can also have additional processing performed on them, such as conversion to a bitonal image or to grayscale, depending on the types of testing to be performed.

After processing the mobile document image to generate a snippet, the MDIPE 2100 then selects one or more tests to be performed on the snippet or snippets (step 2315). In an embodiment, the tests to be performed can be selected from test data store 2132. In an embodiment, the MDIPE 2100 selects the one or more tests based on the processing parameters 2107 that were received with the mobile image 2105.

After selecting the tests from the test data store 2132, test parameters for each of the tests can be selected from the test parameters data store 2134 (step 2320). As described above, the test parameters can be used to configure or customize the tests to be performed.

Once the tests and the test parameters have been retrieved and provided to the test execution module 2130, a test is selected from tests to be executed, and the test is executed on the document snippet to produce a test result value (step 2325). In some embodiments, more than one document snippet can be used by a test. For example, a test can be performed that tests whether images of a front and back of a check are actually images of the same document can be performed. The test engine can receive both an image of the front of the check and an image of the back of the check from the preprocessing module 2110 and use both of these images when executing the test. Step 2325 can be repeated until each of the tests to be executed is performed.

The test result values obtained by executing each test on the snippet or snippets of the mobile document are then compared to test threshold with that test to determine whether the mobile image passes or fails the test (step 2330) and a determination can be made whether the mobile image of the check passed the test indicating that image quality of mobile image is acceptable (step 2335). If the mobile document image of the check passed, the MDIPE 2100 passes then executes one or more Check 21 tests on the snippets (step 2340).

The test result values obtained by executing the Check 21 test or tests on the snippet or snippets of the mobile document are then compared to test threshold with that test to determine whether the mobile image passes or fails the test (step 2345) and a determination can be made whether the mobile image of the check passed the test indicating that image quality of mobile image is acceptable under the requirements imposed by the Check 21 Act (step 2350). Step 345 can be repeated until each of the Check 21 tests is performed. If the mobile document image of the check passed, the MDIPE 2100 passes the snippet or snippets to the mobile application for further processing (step 2370).

If the mobile document image of the check failed one or more mobile IQA or Check 21 tests, detailed test result messages that explain why the image failed the test can be loaded from the test message data store 134 (step 2355) and the test result messages can be added to the test results (step 2360). The test results and test messages are then output to the mobile application where they can be displayed to the user (step 2365). The user can use this information to retake the image of the check in an attempt to remedy some or all of the factors that caused the image of the check to be rejected.

Mobile IQA Tests

FIGS. 24A-41 illustrate various sample mobile document images and various testing methods that can be performed when assessing the image quality of a mobile document image. As described above, the preprocessing module 2110 can be configured to extract the document subimage, also referred to herein as the subimage, from the mobile document image. The subimage generally will be non-rectangular because of perspective distortion; however, the shape of the subimage can generally be assumed to be quadrangular, unless the subimage is warped. Therefore, the document can be identified by its four corners.

In some embodiments, a mobile IQA test generates a score for the subimage on a scale that ranges from 0-1000, where "0" indicates a subimage having very poor quality while a score of "1000" indicates that the image is perfect according to the test criteria.

Figure 24A:
FIG. 24A illustrates a mobile image where the document captured in the mobile document image exhibits view distortion.
Figure 24B:
FIG. 24B illustrates an example of a grayscale geometrically corrected subimage generated from the distorted image in FIG. 24A according to an embodiment.

Some tests use a geometrically corrected snippet of the subimage to correct view distortion. The preprocessing module 2110 can generate the geometrically corrected snippet. FIG. 24A illustrates a mobile image where the document captured in the mobile document image exhibits view distortion. FIG. 24B illustrates an example of a grayscale geometrically corrected subimage generated from the distorted image in FIG. 24A.

Image Focus IQA Test

According to some embodiments, an Image Focus IQA Test can be executed on a mobile image to determine whether the image is too blurry to be used by a mobile application. Blurry images are often unusable, and this test can help to identify such out-of-focus images and reject them. The user can be provided detailed information to assist the user in taking a better quality image of the document. For example, the blurriness may have been the result of motion blur caused by the user moving the camera while taking the image. The test result messages can suggest that the user hold the camera steadier when retaking the image.

Mobile devices can include cameras that have significantly different optical characteristics. For example, a mobile device that includes a camera that has an auto-focus feature can generally produce much sharper images than a camera that does not include such a feature. Therefore, the average image focus score for different cameras can vary widely. As a result, the test threshold can be set differently for different types of mobile devices. As described above, the processing parameters 2107 received by MDIPE 2100 can include information that identifies the type of mobile device and/or the camera characteristics of the camera used with the device in order to determine what the threshold should be set to for the Image Focus IQA Test.

Figure 25A:
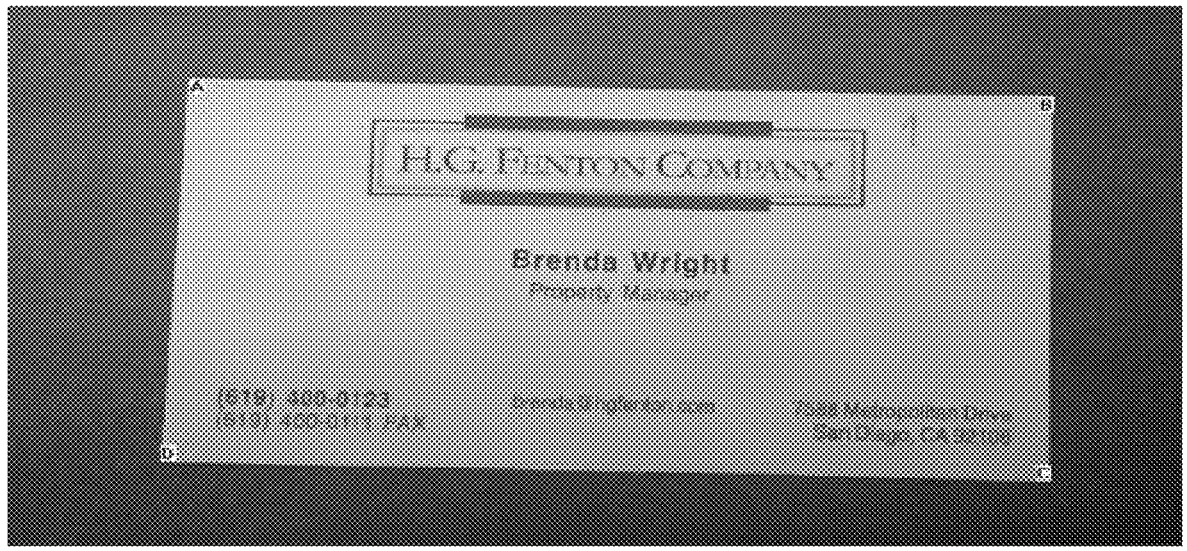
FIG. 25A illustrates an example of an in-focus mobile document image.
Figure 25B:
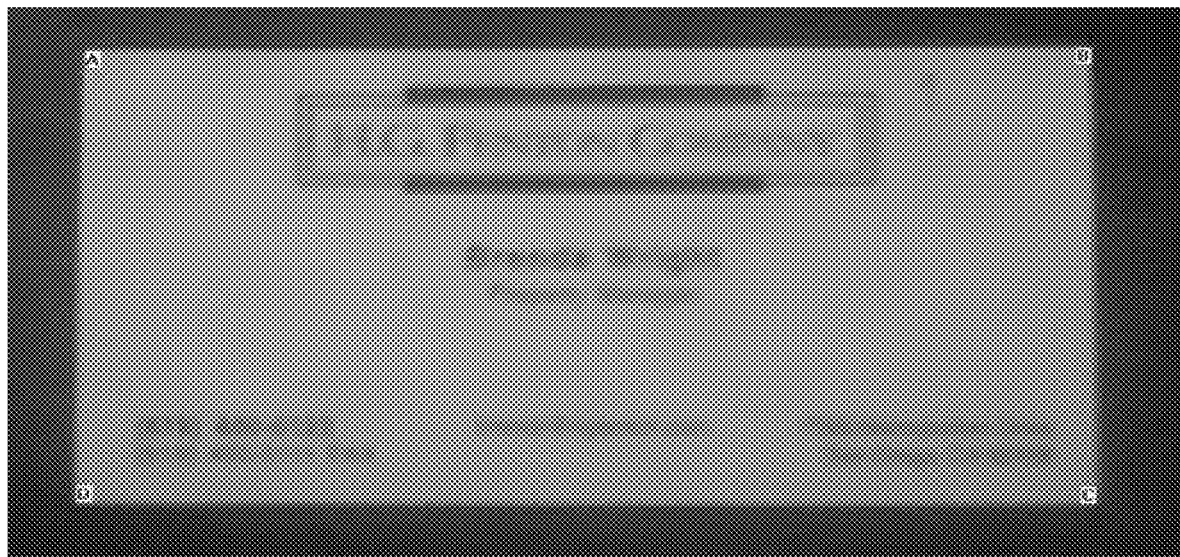
FIG. 25B illustrates an example of an out of focus document.

An in-focus mobile document image, such as that illustrated in FIG. 25A will receive a score of 1000, while an out of focus document, such as that illustrated in FIG. 25B will receive a much lower score, such as in the 50-100 range. Most of the time, images are not completely out of focus. Therefore, a score of 0 is uncommon.

According to an embodiment, the focus of the image can be tested using various techniques, and the results can then be normalized to the 0-1000 scale used by the MDIPE 2100.

In an embodiment, the Image Focus Score can be computed using the following technique: The focus measure is a ratio of maximum video gradient between adjacent pixels, measured over the entire image and normalized with respect to image's gray level dynamic range and "pixel pitch." According to an embodiment, the image focus score can be calculated using the following equation described in "The Financial Services Technology Consortium," Image Defect Metrics, IMAGE QUALITY & USABILITY ASSURANCE: Phase 1 Project, Draft Version 1.0.4. May 2, 2005, which is hereby incorporated by reference:

$$\text{Image Focus Score} = (\text{Maximum Video Gradient}) / [(\text{Gray Level Dynamic Range}) * (\text{Pixel Pitch})]$$

where Video Gradient=ABS [(Gray level for pixel "$i$")−(Gray level for pixel "$i+1$")]

Gray Level Dynamic Range=[(Average of the "$N$" Lightest Pixels)−(Average of the "$N$" Darkest Pixels)]

Pixel Pitch=[1/Image Resolution (in dpi)]

The variable N is equal to the number of pixels used to determine the average darkest and lightest pixel gray levels in the image. According to one embodiment, the value of N is set to 64. Therefore, the 64 lightest pixels in the image are averaged together and the 64 darkest pixels in the image are averaged together, to compute the "Gray Level Dynamic" range value. The resulting image focus score value is the multiplied by 10 in order to bring the value into the 0-1000 range used for the test results in the mobile IQA system.

The Image Focus Score determined using these techniques can be compared to an image focus threshold to determine whether the image is sufficiently in focus. As described above, the threshold used for each test may be determined at least in part by the processing parameters 2107 provided to MDIPE 2100. The Image Focus score can be normalized to the 0-1000 range used by the mobile IQA tests and compared to a threshold value associated with the test. If the Image Focus Score meets or exceeds this threshold, then the mobile document image is sufficiently focused for use with the mobile application.

Shadow Test

According to some embodiments, a Shadow Test can be executed on a mobile image to determine whether a portion of the image is covered by a shadow. A shadow can render parts of a mobile image unreadable. This test helps to identify whether a shadow coverage a least a portion of a subimage in a mobile document image, and to reject images if the shadow has too much of an effect on the image quality, so that the user can attempt to take a better quality image of the document where the shadow is not present.

Figure 26:
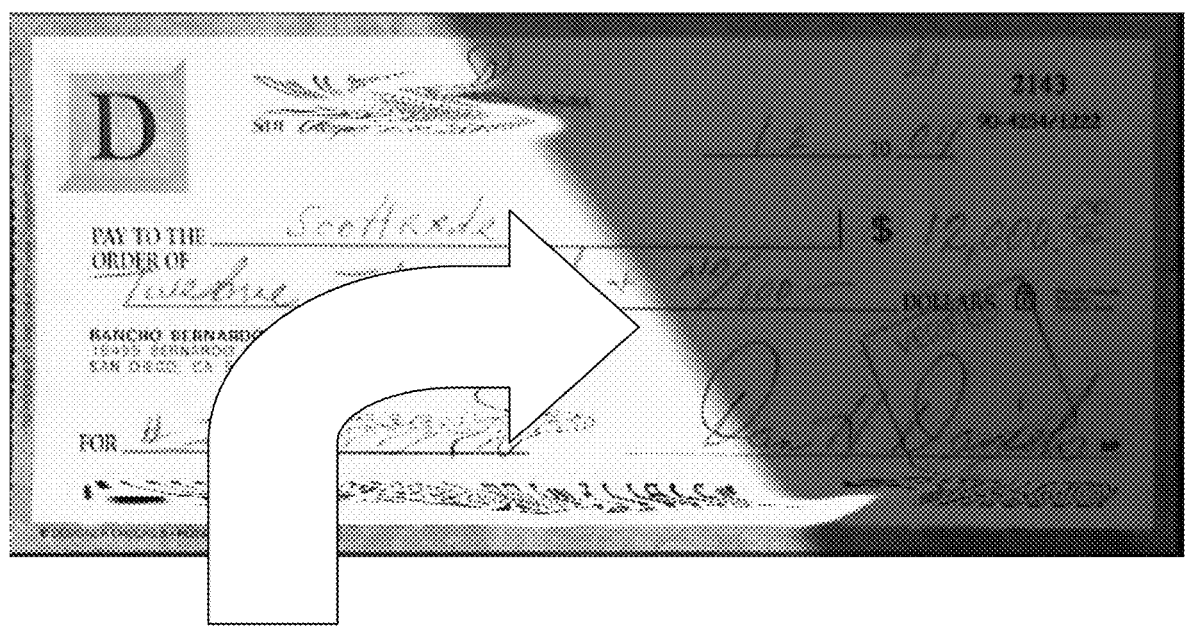
FIG. 26 illustrates an example of a shadowed document.

According to an embodiment, the presence of a shadow is measured by examining boundaries in the mobile image that intersect two or more sides of the document subimage. FIG. 26 illustrates an example of a shadowed document. The document subimage has been extracted from the mobile document image and converted to a grayscale snippet in this example. The shadow boundary clearly intersects the top and the bottom of the check pictured in the snippet.

The presence of shadows can be measured using the area and contrast. If a shadow covers the entire image, the result is merely an image that is darker overall. Such shadows generally do not worsen image quality significantly. Furthermore, shadows having a very small surface area also do not generally worsen image quality very much.

According to an embodiment, the Image Shadowed Score can be calculated using the following formula to determine the score for a grayscale snippet:

Image Shadowed score=1000 if no shadows were found, otherwise

Image Shadowed score=1000−min (Score(S[$i$])), where Score(S[$i$]) is computed for every shadow S[$i$] detected on the grayscale snippet In an embodiment, the Score for each shadow can be computed using the following formula:

Given shadow S[$i$] in the grayscale image, the score can be calculated Score(S[$i$]) as Score(S[$i$])= 2000*min(A[$i$]/A,1−A[$i$]/A)*(Contrast/256), where A[$i$] is the area covered by shadow S[$i$] (in pixels), A is the entire grayscale snippet area (in pixels), and Contrast is the difference of brightness inside and outside of the shadow (the maximum value is 256).

Due to the normalization factor 2000, Score(S[$i$]) fits into 0-1000 range. It tends to assume larger values for shadows that occupy about ½ of the snippet area and have high contrast. Score(S[1]) is typically within 100-200 range. In an embodiment, the Image Shadowed score calculated by this test falls within a range of 0-1000 as do the test results from other tests. According to an embodiment, a typical mobile document image with few shadows will have a test result value in a range form 800-900. If no shadows are on are found the document subimage, then the score will equal 1000. The Image Shadowed score can then be compared to a threshold associated with the test to determine whether the image is of sufficiently high quality for use with the mobile application requesting the assessment of the quality of the mobile document image.

Contrast Test

According to some embodiments, a Contrast Test can be executed on a mobile image to determine whether the contrast of the image is sufficient for processing. One cause of poor contrast is images taken with insufficient light. A resulting grayscale snippet generated from the mobile document image can have low contrast, and if the grayscale snippet is converted to a binary image, the binarization module can erroneously white-out part of the foreground, such as the MICR-line of a check, the code line of a remittance coupon, an amount, or black-out part of the background. The Contrast Test measures the contrast and rejects poor quality images, and instructs the user to retake the picture under brighter light to improve the contrast of the resulting snippets.

Figure 27:
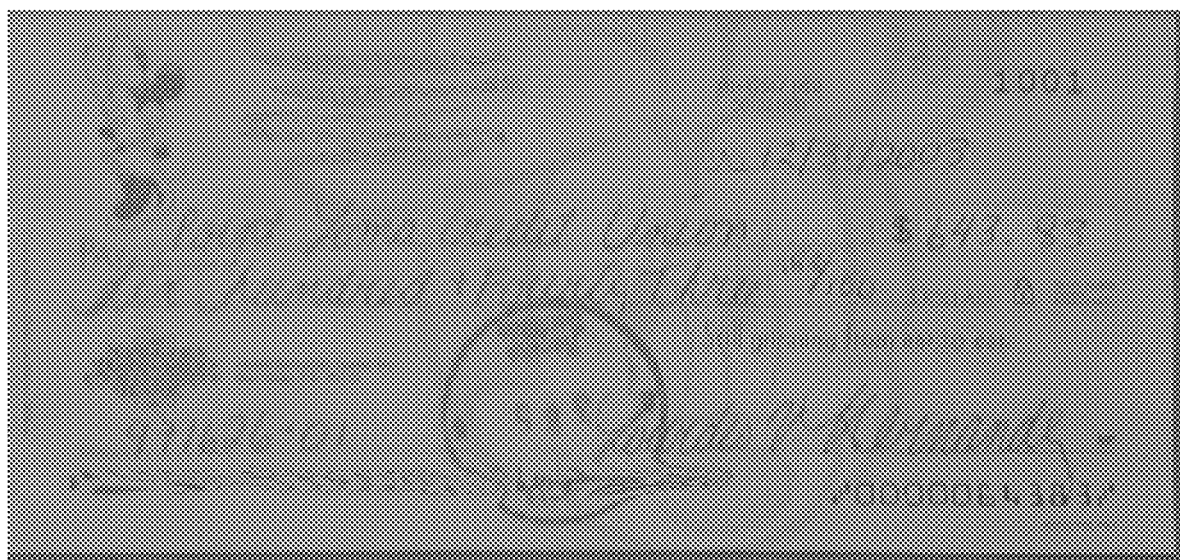
FIG. 27 illustrates an example of a grayscale snippet generated from a mobile document image of a check where the contrast of the image is very low according to an embodiment.
Figure 28:
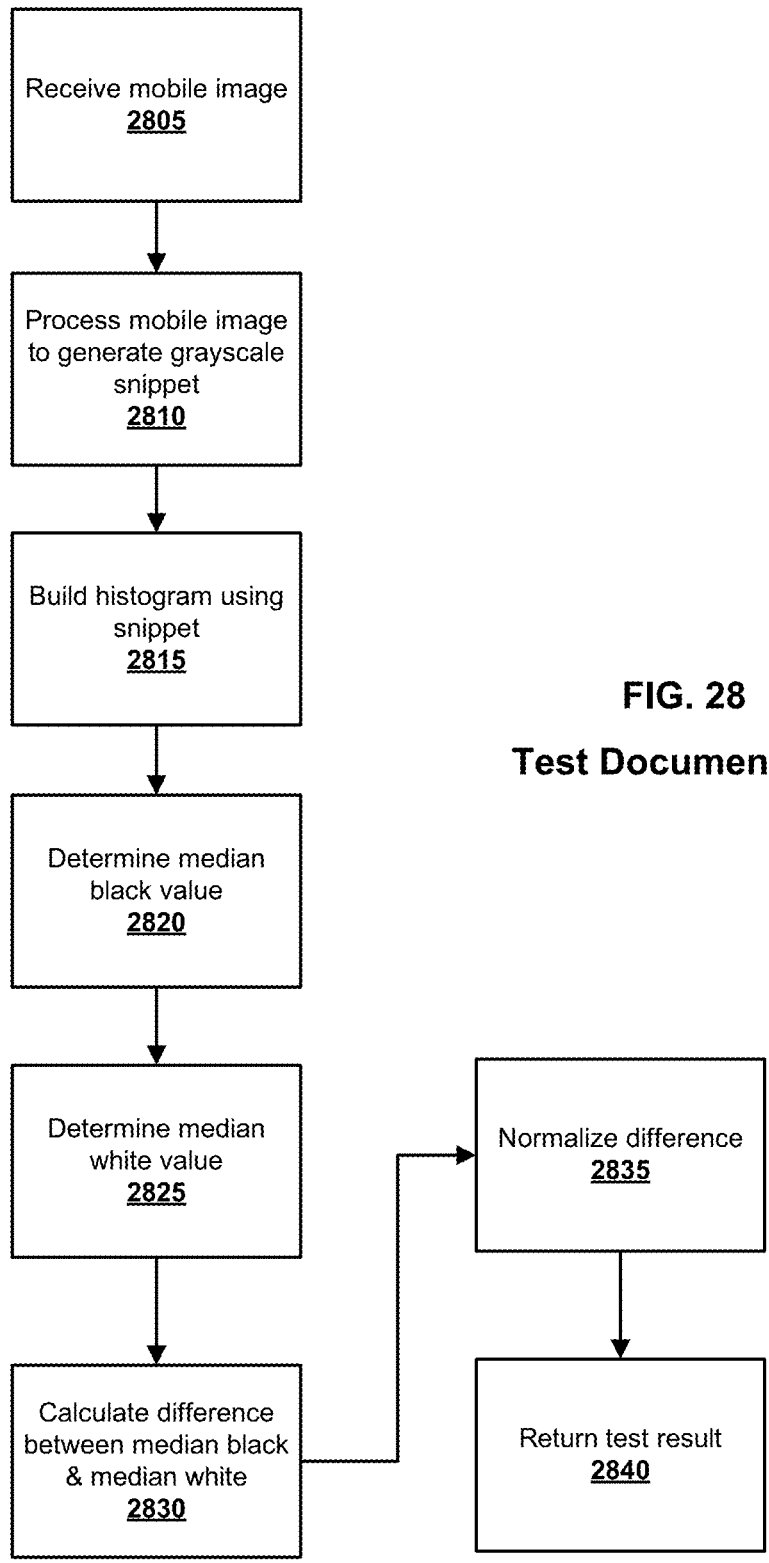
FIG. 28 illustrates a method for executing a Contrast IQA Test according to an embodiment.

FIG. 28 illustrates a method for executing a Contrast IQA Test according to an embodiment. The Contrast IQA Test illustrated in FIG. 28 is performed on a grayscale snippet generated from a mobile document image. The MDIPE 2100 receives the mobile image (step 2805) and generates a grayscale snippet that comprises a grayscale version of the document subimage (step 2810). FIG. 27 is an example of a grayscale snippet generated from a mobile document image of a check. As can be seen from FIG. 27, the contrast of the image is very low.

A histogram of the grayscale values in the grayscale snippet can then be built (step 2815). In an embodiment, the x-axis of the histogram is divided into bins that each represents a "color" value for the pixel in the grayscale image and the y-axis of the histogram represents the frequency of that color value in the grayscale image. According to an embodiment, the grayscale image has pixel in a range from 0-255, and the histogram is built by iterating through each value in this range and counting the number of pixels in the grayscale image having this value. For example, frequency of the "200" bin would include pixels having a gray value of 200.

A median black value can then be determined for the grayscale snippet (step 2820) and a median white value is also determined for the grayscale snippet (step 2825). The median black and white values can be determined using the histogram that was built from the grayscale snippet. According to an embodiment, the median black value can be determined by iterating through each bin, starting with the "0" bin that represents pure black and moving progressively toward the "250" bin which represents pure white. Once a bin is found that includes at least 20% of the pixels included in the image, the median black value is set to be the color value associated with that bin. According to an embodiment, the median white value can be determined by iterating through each bin, starting with the "255" bin which represents pure white and moving progressively toward the "0" bin which represents pure black. Once a bin is found that includes at least 20% of the pixels included in the image, the median white value is set to be the color value associated with that bin.

Once the median black and white values have been determined, the difference between the median black and white values can then be calculated (step 2830). The difference can then be normalized to fall within the 0-1000 test range used in the mobile IQA tests executed by the MDIPE 2100 (step 2835). The test result value can then be returned (step 2840). As described above, the test result value is provided to the test execution module 2130 where the test result value can be compared to a threshold value associated with the test. See for example, FIG. 22, step 2230, described above. If the mobile image fails the Contrast IQA Test, the MDIPE 2100 can reject the image, and load detailed test messages from the test message data store 134 that include detailed instructions that how the user might retake the image.

Planar Skew Test

According to some embodiments, a Planar Skew Test can be executed on a mobile image to determine whether the document subimage is skewed within the mobile image. See FIG. 29A for an example of a mobile document image that includes a remittance coupon or check that exhibits significant planar skew. Planar skew does not result in distortion of the document subimage; however, in an embodiment, the subimage detection module included in the preprocessing module assumes that the document subimage is nearly horizontal in the mobile document image. If the skew becomes too extreme, for example approaching 45 degrees from horizontal, cropping errors could occur when the document subimage is extracted from the mobile document image.

According to an embodiment, document skew can be measured by first identifying the corners of the document subimage using one of the techniques described above. The corners of the documents subimage can be identified by the preprocessing module 130 when performing projective transformations on the subimage, such as that described above with respect to FIGS. 24A and 24B. Various techniques for detecting the skew of the subimage can be used.

For example, techniques for detecting skew disclosed in the related '071 and '091 applications, can be used to detect the skew of the subimage. The results from the skew test can then be to fall within the 0-1000 test range used in the mobile IQA tests executed by the MDIPE 2100. The higher the skew of the document subimage, the lower the normalized test value. If the normalized test value falls below the threshold value associated with the test, the mobile document image can be rejected and the user can be provided detailed information from the test result messages data store 136 for how to retake the image and reduce the skew.

View Skew Test

Figure 29A:
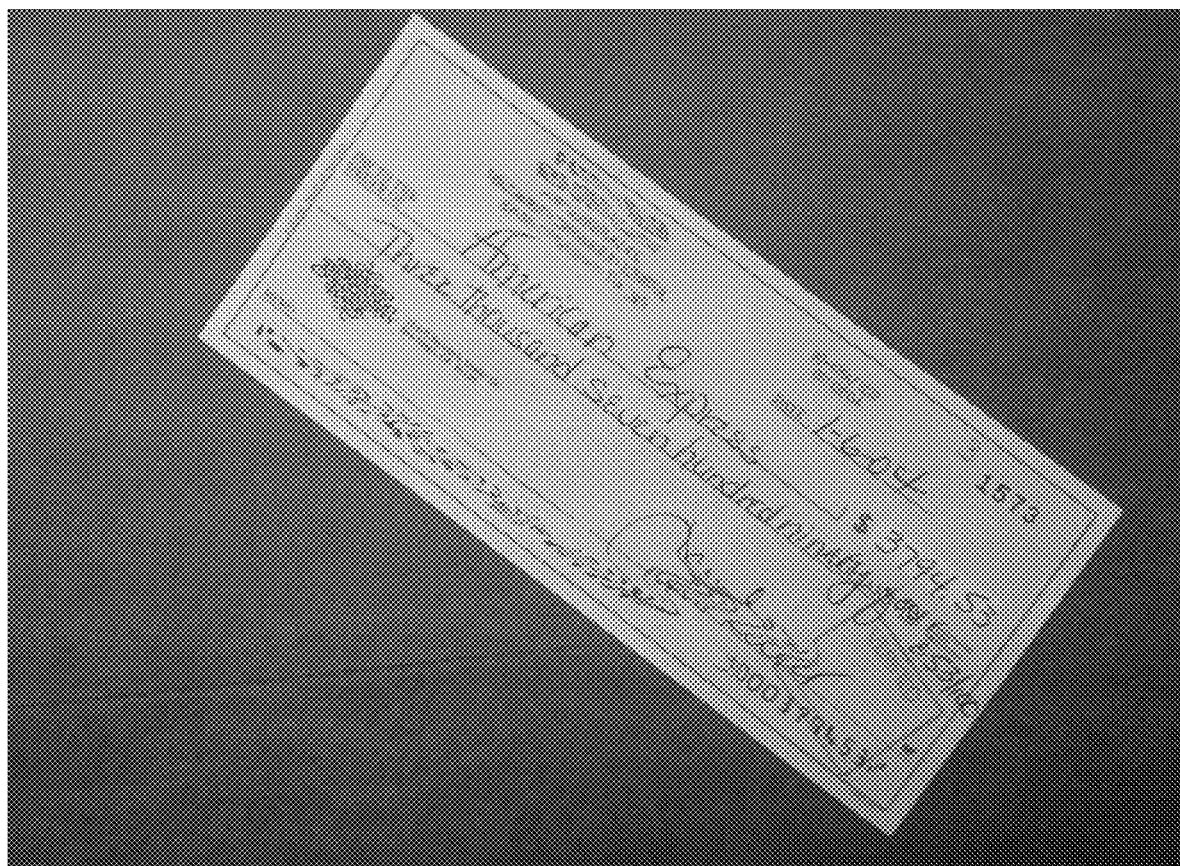
FIG. 29A is an example of a mobile document image that includes a check that exhibits significant planar skew according to an embodiment.
Figure 29B:
FIG. 29B illustrates an example of a document subimage that exhibits view skew according to an embodiment.

"View skew" denotes a deviation from direction perpendicular to the document in mobile document image. Unlike planar skew, the view skew can result in the document subimage having perspective distortion. FIG. 29B illustrates an example of a document subimage that exhibits view skew. View skew can cause problems in processing the subimage if the view skew becomes too great, because view skew changes the width-to-height ratio of the subimage. This can present a problem, since the true dimensions of the document pictured in the subimage are often unknown. For example, remittance coupons and business checks can be various sizes and can have different width-to-height ratios. View skew can result in content recognition errors, such as errors in recognition of the MICR-line data on a check or CAR/LAR recognition (which stands for Courtesy Amount Recognition and Legal Amount Recognition) or errors in recognition of the code line of a remittance coupon. By measuring the view skew, the view skew test can be used to reject images that have too much view skew, which can help reduce false rejects and false accepts rates by addressing an issue that can be easily corrected by a user retaking the mobile document image.

Figure 30:
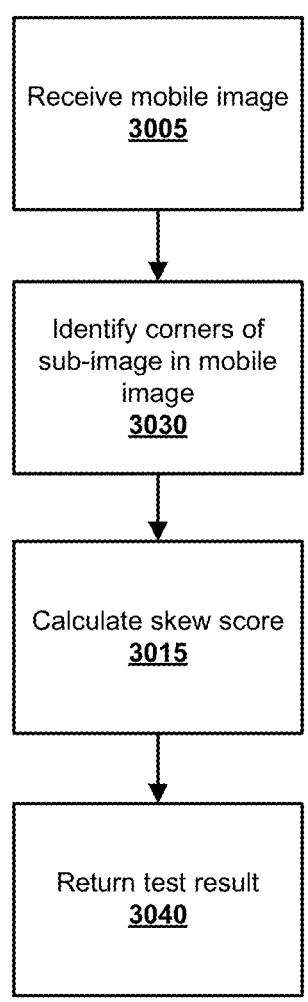
FIG. 30 is a flow chart illustrating a method for testing for view skew according to an embodiment.

FIG. 30 is a flow chart illustrating a method for testing for view skew according to an embodiment. The MDIPE 2100 receives the mobile image (step 3005) and identifies the corners of the document within the subimage (step 3010). A skew test score can then be determined for the document subimage (step 3015) and skew test score can then be returned (3040). As described above, the test result value can then be provided to the test execution module 2130 where the test result value can be compared to a threshold value associated with the test.

According to an embodiment, the view skew of a mobile document can be determined using the following formula:

View Skew score=1000−$F(A,B,C,D)$, where $F(A,B,C,D)=500*\max(\text{abs}(|AB|-|CD|)/(|DA|+|BC|),$
$\text{abs}(|BC|-|DA|)/(AB+CD))$, where |PQ| denotes the distance from point P to point Q, and the corners of the subimage are denoted as follows: A represents the top-left corner, B represents the top-right corner of the subimage, C represents the bottom-right corner of the subimage, and D represents the bottom-left corner of the subimage.

One can see that View Skew score can be configured to fit into [0, 1000] range used in the other mobile IQA tests described herein. In this example, the View Skew score is equal to 1000 when |AB|=|CD| and |BC|=|DA|, which is the case when there is no perspective distortion in the mobile document image and camera-to-document direction was exactly perpendicular. The View Skew score can then be compared to a threshold value associated with the test to determine whether the image quality is sufficiently high for use with the mobile application.

Cut Corner Test

Figure 31:
FIG. 31 illustrates an example of a mobile document image that features an image of a document where one of the corners of the document has been cut off in the picture.

Depending upon how carefully the user framed a document when capturing a mobile image, it is possible that one or more corners of the document can be cut off in the mobile document image. As a result, important information can be lost from the document. For example, if the lower left-hand corner of a check is cut off in the mobile image, a portion of the MICR-line of a check or the code line of a remittance coupon might be cut off, resulting in incomplete data recognition. FIG. 31 illustrates an example of a mobile document image that features a receipt where one of the corners has been cut off.

Figure 32:
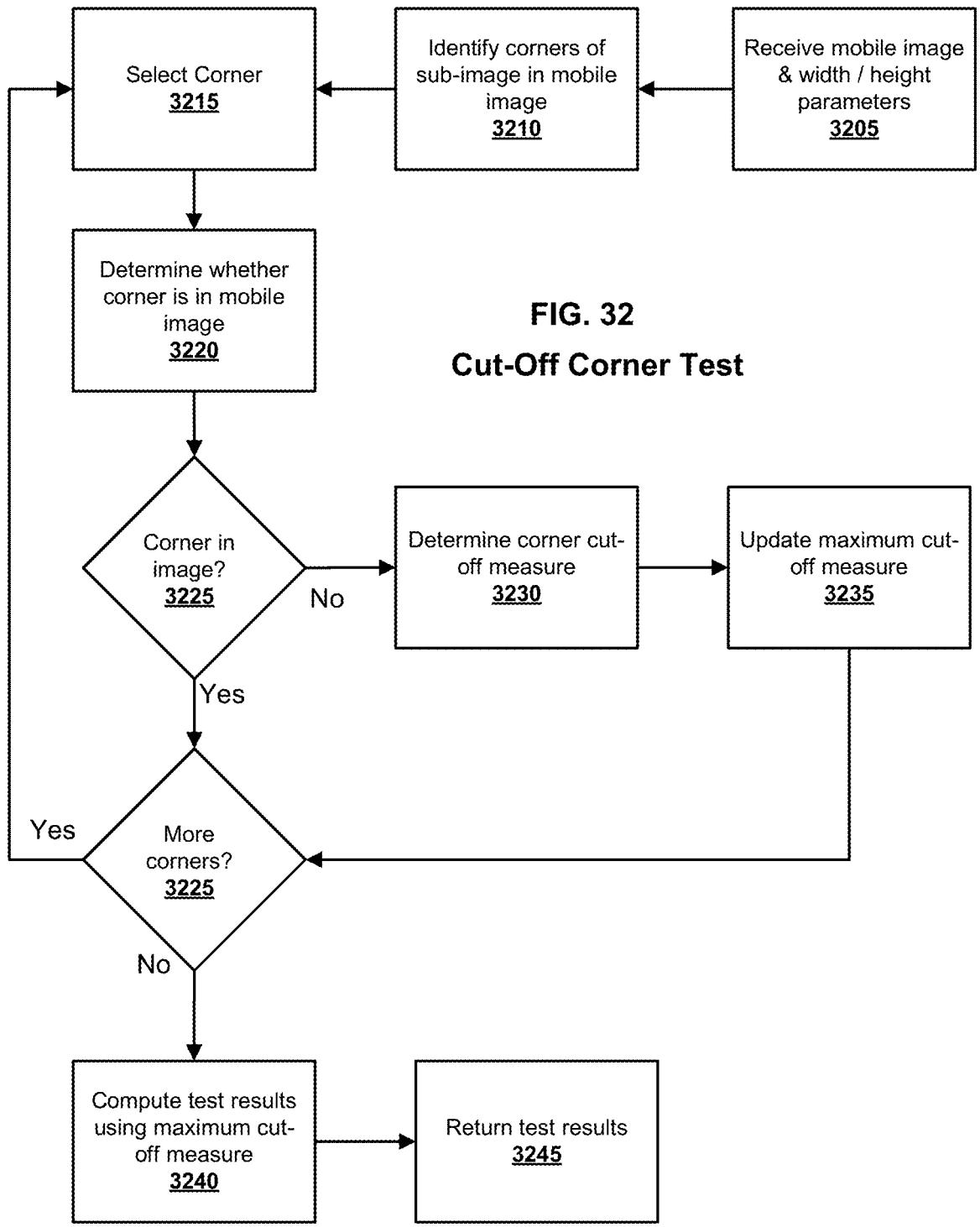
FIG. 32 illustrates a Cut-Off Corner Test that can be used for testing whether corners of a document in a document subimage have been cut off when the document was imaged according to an embodiment.

FIG. 32 illustrates a Cut-Off Corner Test that can be used with embodiments of the MDIPE 2100 for testing whether corners of a document in a document subimage have been cut off when the document was imaged. The mobile image including height and width parameters are received (step 3205). In an embodiment, the height and width of the mobile image can be determined by the preprocessing module 2110. The corners of the document subimage are then identified in the mobile document image (step 3210). Various techniques can be used to identify the corners of the image, including the various techniques described above. In an embodiment, the preprocessing module 2110 identifies the corners of the document subimage. As illustrated in FIG. 11, one or more of the corners of a document can be cut off. However, the preprocessing module 2110 can be configured to determine what the location of the corner should have been had the document not been cut off using the edges of the document in the subimage. FIG. 31 illustrates how the preprocessing module 2110 has estimated the location of the missing corner of the document by extending lines from the sides of the document out to the point where the lines intersect. The preprocessing module 2110 can then provide the corners information for the document to the test execution module 2130 to execute the Cut-Off Corner IQA Test. In an embodiment, test variables and the test results values to be returned by the test are set to default values: the test value V to be returned from the test is set to a default value of 1000, indicating that all of the corners of the document are within the mobile document image, and a maximum cut off variable (MaxCutOff) is set to zero indicating that no corner was cut off.

A corner of the document is selected (step 3220). In an embodiment, the four corners are received as an array of x and y coordinates CM, where I is equal to the values 1-4 representing the four corners of the document.

A determination is made whether the selected corner of the document is within the mobile document image (step 3225). The x & y coordinates of the selected corner should be at or between the edges of the image. According to an embodiment, the determination whether a corner is within the mobile document image can be determined using the following criteria: (1) C[I]x>=0 & C[I].x<=Width, where Width=the width of the mobile document image and C[I] x=the x-coordinate of the selected corner; and (2) C[I].y>= 0 & C[I].y<=Height, where Height=the height of the mobile document image and C[I].y=the y-coordinate of the selected corner.

If the selected corner fails to satisfy the criteria above, the corner is not within the mobile image and has been cut-off. A corner cut-off measurement is determined for the corner (step 3230). The corner cut-off measurement represents the relative distance to the edge of the mobile document image. According to an embodiment, the corner cut-off measurement can be determined using the following:

(1) Set H[I] and V[I] to zero, where H[I] represents the horizontal normalized cut-off measure and V[I] represents the vertical normalized cut-off measure.
(2) If C[I].x<0, then set H[I]=−1000*C[I].x/Width
(3) If C[I].x>Width, set H[I]=1000*(C[I].x−Width)/Width, where Width is the width of the mobile image
(4) If C[I].y<0, set V[I]=−1000*C[I].y/Height, where Height is the height of the mobile image
(5) If C[I].y>Height, set V[I]=1000*(C[I].y−Height)/Height
(6) Normalize H[I] and V[I] to fall within the 0-1000 range used by the mobile IQA tests by setting H[I]=min (1000, H[I]) and V[I]=min (1000, V[I]).
(7) Set CutOff[I]=min (H(I), V(I)), which is the normalized cut-off measure of the corner. One can see that the CutOff[I] lies within [0-1000] range used by the mobile IQA tests and the value increases as the corner moves away from mobile image boundaries.

An overall maximum cut-off value is also updated using the normalized cut-off measure of the corner (step 3235). According to an embodiment, the following formula can be used to update the maximum cut-off value: MaxCutOff=max (MaxCutOff, CutOff[I]). Once the maximum cut-off value is determined, a determination is made whether more corners are to be tested (step 3225).

If the selected corner satisfies the criteria above, the corner is within the mobile document image and is not cut-off. A determination is then made whether there are additional corners to be tested (step 3225). If there are more corners to be processed, a next corner to be test is selected (step 3215). Otherwise, if there are no more corners to be tested, the test result value for the test is computing using the maximum test cut-off measurement. In an embodiment, the test result value V=1000−MaxCutOff. One can see that V lies within [0-1000] range for the mobile IQA tests and is equal to 1000 when all the corners are inside the mobile image and decreases as one or more corner move outside of the mobile image.

The test result value is then returned (3245). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. The user may simply need to retake the image with the document corners within the frame.

Cut-Side Test

Depending upon how carefully the user framed a document when capturing a mobile image, it is possible that one or more sides of the document can be cut off in the mobile document image. As a result, important information can be lost from the document. For example, if the bottom a check is cut off in the mobile image, the MICR-line might be cut off, rendering the image unusable for a Mobile Deposit application that uses the MICR information to electronically deposit checks. Furthermore, if the bottom of a remittance coupon is cut off in the mobile image, the code line may be missing, the image may be rendered unusable by a Remittance Processing application that uses the code information to electronically process the remittance.

Figure 33:
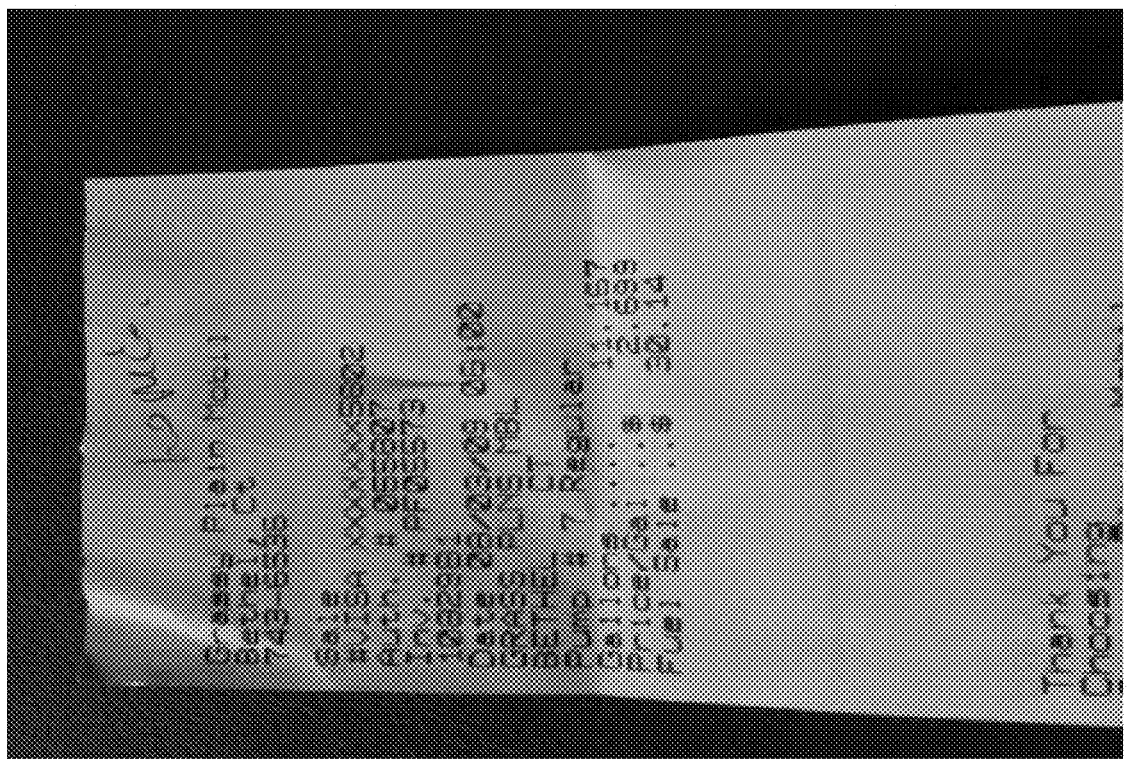
FIG. 33 illustrates an example of a mobile document image that features a document where one of the ends of the document has been cut off in the image.

FIG. 33 illustrates an example of a mobile document image that features a receipt where one of the ends of the receipt has been cut off in the image. Unlike the Cut-Corner Test described above which can be configured to allow a document to pass if the amount of cut-off falls is small enough that the document image still receives a test score that meets or exceeds the threshold associated with the test, the Cut-Side Test is either pass or fail. If one or more sides of the document subimage are cut off in the mobile document image, the potential to lose critical information is too high, and mobile document is marked as failing.

Figure 34:
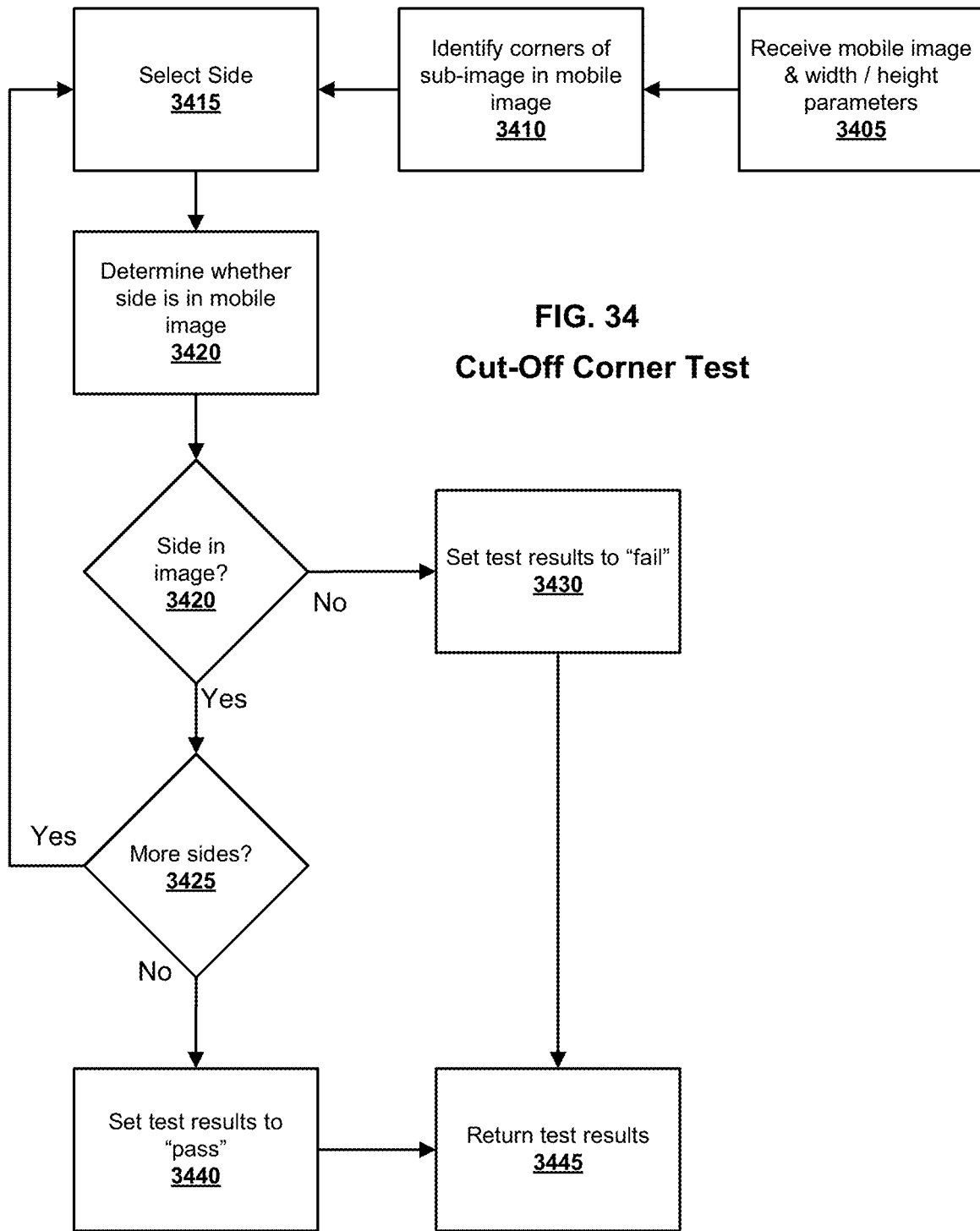
FIG. 34 is a flow diagram of a method for determining whether one or more sides of the document are cut off in the document subimage according to an embodiment.

FIG. 34 is a flow diagram of a method for determining whether one or more sides of the document are cut off in the document subimage according to an embodiment. The mobile image is received (step 3405). In an embodiment, the height and width of the mobile image can be determined by the preprocessing module 2110. The corners of the document subimage are then identified in the mobile document image (step 3410). Various techniques can be used to identify the corners of the image, including the various techniques described above. In an embodiment, the preprocessing module 2110 identifies the corners of the document subimage.

A side of the document is selected (step 3420). In an embodiment, the four corners are received as an array of x and y coordinates C[I], where I is equal to the values 1-4 representing the four corners of the document.

A determination is made whether the selected corner of the document is within the mobile document image (step 3425). According to an embodiment, the document subimage has four side and each side S[I] includes two adjacent corners C1[I] and C2[I]. A side is deemed to be cut-off if the corners comprising the side are on the edge of the mobile image. In an embodiment, a side of the document is cut-off if any of the following criteria are met:
(1) C1[I].x=C2[I].x=0, where x=the x-coordinate of the corner
(2) C1[I].x=C2[I].x=Width, where Width=the width of the mobile image
(3) C1[I].y=C2[I].y=0, where y=the y-coordinate of the corner
(4) C1[I].y=C2[I].y=Height, where Height=the height of the mobile image If the side does not fall within the mobile image, the test result value is set to zero indicating that the mobile image failed the test (step 3430), and the test results are returned (step 3445).

If the side falls within the mobile image, a determination is made whether there are more sides to be tested (step 3425). If there are more sides to be tested, an untested side is selected (step 3415). Otherwise, all of the sides were within the mobile image, so the test result value for the test is set to 1000 indicating the test passed (step 3440), and the test result value is returned (step 3445).

Warped Image Test

The warped image test identifies images where document is warped. FIG. 35 illustrates an example of a mobile document image where the document is warped. In some embodiments, the preprocessing module 2110 can be configured to include de-warping functionality for correcting warped images. However, in some embodiments, a Warped Image Test is provided to detect and reject warped images. One solution for correcting warped images is to instruct the user to retake the image after flattening the hardcopy of the document being imaged.

FIG. 36 is a flow diagram of a method for identifying a warped image and for scoring the image based on how badly the document subimage is warped according to an embodiment. A warped image test score value is returned by the test, and this value can be compared with a threshold value by the test execution module 2130 to determine whether the image warping is excessive.

The mobile image is received (step 3605). In an embodiment, the height and width of the mobile image can be determined by the preprocessing module 2110. The corners of the document subimage are then identified in the mobile document image (step 3610). Various techniques can be used to identify the corners of the image, including the various techniques described above. In an embodiment, the preprocessing module 2110 identifies the corners of the document subimage.

A side of the document is selected (step 3615). According to an embodiment, the document subimage has four side and each side S[I] includes two adjacent corners C1[I] and C2[I].

A piecewise linear approximation is built for the selected side (step 3620). According to an embodiment, the piecewise-linear approximation is built along the selected side by following the straight line connecting the adjacent corners C1[I] and C2[I] and detecting position of the highest contrast starting from any position within [C1[I], C2[I]] segment and moving in orthogonal direction.

After the piecewise linear approximation is built along the [C1[I], C2[I]] segment, the [C1[I], C2[I]] segment is walked to compute the deviation between the straight line and the approximation determined using piecewise linear approximation (step 3625). Each time the deviation is calculated, a maximum deviation value (MaxDev) is updated to reflect the maximum deviation value identified during the walk along the [C1[I], C2[I]] segment.

The maximum deviation value for the side is then normalized to generate a normalized maximized deviation value for the selected size of the document image (step 3630). According to an embodiment, the normalized value can be determined using the following formula:

$$\text{NormMaxDev}[I]=1000*\text{MaxDev}[I]/\text{Dim, where Dim is the mobile image dimension perpendicular to side } S[I].$$

An overall normalized maximum deviation value is then updated using the normalized deviation value calculated for the side. According to an embodiment, the overall maximum deviation can be determined using the formula:

$$\text{OverallMaxDeviation}=\max(\text{OverallMaxDeviation}, \text{NormMaxDev}[I])$$

A determination is then made whether there are anymore sides to be tested (step 3640). If there are more sides to be tested, an untested side is selected for testing (step 3615). Otherwise, if no untested sides remain, the warped image test value is computed. According to an embodiment, the warped image test value can be determined using the following formula:

$$V=1000-\text{OverallMaxDeviation}$$

One can see that V lies within [0-1000] range used by the image IQA system and is equal to 1000 when the sides S[I] are straight line segments (and therefore no warp is present). The computed test result is then returned (step 3650). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image after flattening out the hardcopy of the document being imaged in order to reduce warping.

Image Size Test

The Image Size Test detects the actual size and the effective resolution of the document subimage. The perspective transformation that can be performed by embodiments of the preprocessing module 2110 allows for a quadrangle of any size to be transformed into a rectangle to correct for view distortion. However, a small subimage can cause loss of detail needed to process the sub image.

Figure 37:
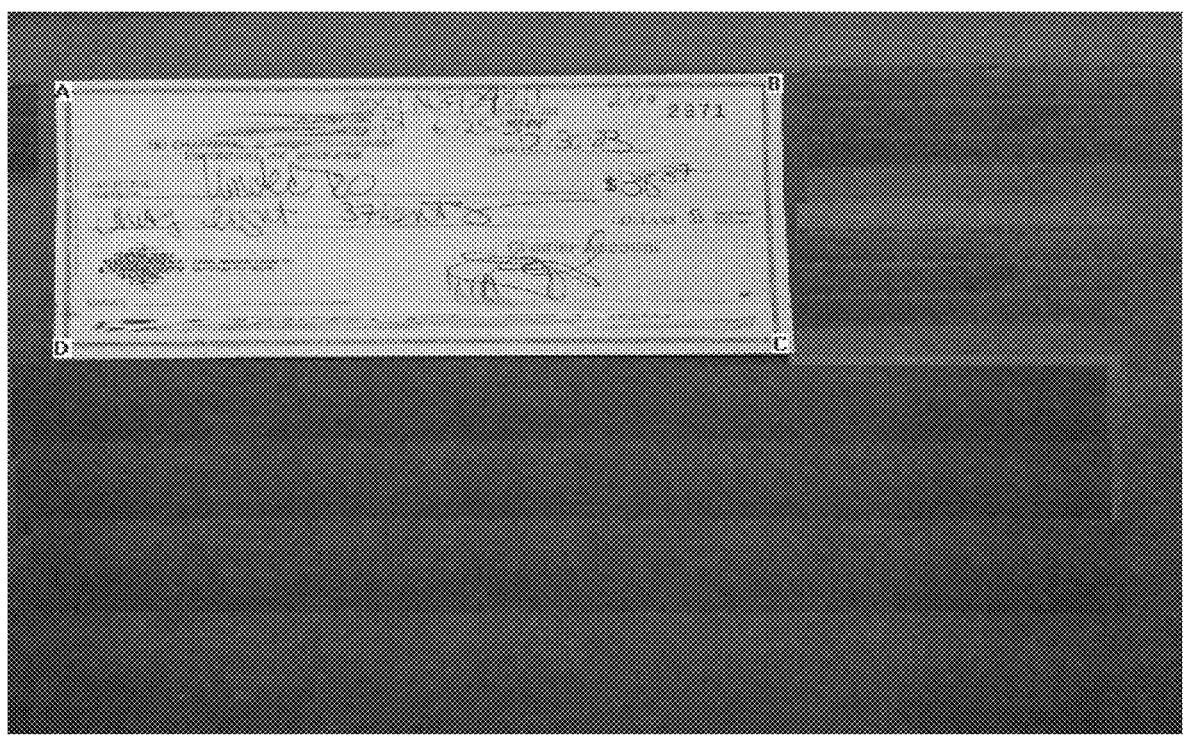
FIG. 37 illustrates an example of a document subimage within a mobile document image that is relatively small in comparison to the overall size of the mobile document image according to an embodiment.

FIG. 37 illustrates an example of a document subimage within a mobile document image that is relatively small. Small size of the subimage can cause the loss of important foreground information. This effect is similar to digital zooming in a digital camera where image of an object becomes larger, but the image quality of object can significantly degrade due to loss of resolution and important details can be lost.

FIG. 38 is a flow diagram of a process that for performing an Image Size Test on a subimage according to an embodiment. The mobile image is received (step 3805). In an embodiment, the height and width of the mobile image can be determined by the preprocessing module 2110. The corners of the document subimage are then identified in the mobile document image (step 3810). Various techniques can be used to identify the corners of the image, including the various techniques described above. In an embodiment, the preprocessing module 2110 identifies the corners of the document subimage. In the method the corners of the subimage are denoted as follows: A represents the top-left corner, B represents the top-right corner of the subimage, C represents the bottom-right corner of the subimage, and D represents the bottom-left corner of the sub image.

A subimage average width is computed (step 3815). In an embodiment, the subimage average width can be calculated using the following formula:

$$\text{Subimage average width as AveWidth}=(|AB|+|CD|)/2, \text{ where } |PQ| \text{ represents the Euclidian distance from point } P \text{ to point } Q.$$

A subimage average height is computed (step 3820). In an embodiment, the subimage average height can be calculated using the following formula:

$$\text{AveHeight}=(|BC|+|DA|)/2$$

The average width and average height values are then normalized to fit the 0-1000 range used by the mobile IQA tests (step 3822). The following formulas can be used determine the normalize the average width and height:

$$\text{NormAveWidth}=1000*\text{AveWidth/Width}$$

$$\text{NormAveHeight}=1000*\text{AveWidth/Height}$$

A minimum average value is then determined for the subimage (step 3825). According to an embodiment, the minimum average value is the smaller of the normalized average width and the normalized average height values. The minimum average value falls within the 0-1000 range used by the mobile IQA tests. The minimum average value will equal 1000 if the document subimage fills the entire mobile image.

The minimum average value is returned as the test result (step 3865). As described above, the test result value is provided to the test execution module 2130 where the test result value can be compared to a threshold value associated with the test. If the test result value falls below the threshold associated with the test, detailed test result messages can be retrieved from the test result message data store 2136 and provided to the user to indicate why the test failed and what might be done to remedy the test. For example, the user may simply need to retake the image by positioning the camera closer to the document.

MICR-Line Test

The MICR-line Test is used to determine whether a high quality image of a check front has been captured using the mobile device according to an embodiment. The MICR-line Test can be used in conjunction with a Mobile Deposit application to ensure that images of checks captures for processing with the Mobile Deposit information are of a high enough quality to be processed so that the check can be electronically deposited. Furthermore, if a mobile image fails the MICR-line Test, the failure may be indicative of incorrect subimage detections and/or poor overall quality of the mobile image, and such an image should be rejected anyway.

FIG. 39A is a flow chart of a method for executing a MICR-line Test according to an embodiment. A mobile image is received (step 3905) and a bitonal image is generated from the mobile image (step 3910). In an embodiment, preprocessor 110 extracts the document subimage from the mobile image as described above, including preprocessing such as geometric correction. The extracted subimage can then be converted to a bitonal snippet by the preprocessor 110. The MICR line is then identified in the bitonal snippet (step 3915). According to an embodiment, a MICR recognition engine is then applied to identify the MICR-line and to compute character-level and overall confidence values for the image (step 3920). These confidences can then be normalized to the 0-1000 scale used by the mobile IQA tests where 1000 means high quality and 0 means poor MICR quality. The confidence level is then returned (step 3925). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the MICR line on the document is damaged or incomplete and the document will continue to fail the test even if the image were retaken.

Code Line Test

The Code Line Test can be used to determine whether a high quality image of a remittance coupon front has been captured using the mobile device according to an embodiment. The Code Line Test can be used in conjunction with a Remittance Processing application to ensure that images of remittance coupon captures for processing with the Remittance Processing information are of a high enough quality to be processed so that the remittance can be electronically processed. Furthermore, if a mobile image fails the Code Line Test, the failure may be indicative of incorrect subimage detections and/or poor overall quality of the mobile image, and such an image should be rejected anyway.

FIG. 39B is a flow chart of a method for executing a Code Line Test according to an embodiment. A mobile image of a remittance coupon is received (step 3955) and a bitonal image is generated from the mobile image (step 3960). In an embodiment, preprocessor 110 extracts the document subimage from the mobile image as described above, including preprocessing such as geometric correction. The extracted subimage can then be converted to a bitonal snippet by the preprocessor 110. The code line is then identified in the bitonal snippet (step 3965). According to an embodiment, a code line recognition engine is then applied to identify the code line and to compute character-level and overall confidence values for the image (step 3970). These confidences can then be normalized to the 0-1000 scale used by the mobile IQA tests where 1000 means high quality and 0 means poor code line quality. The confidence level is then returned (step 3975). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the code line on the document is damaged or incomplete and the document will continue to fail the test even if the image were retaken.

Aspect Ratio Tests

The width of a remittance coupon is typically significantly longer than the height of the document. According to an embodiment, an aspect ratio test can be performed on a document subimage of a remittance coupon to determine whether the aspect ratio of the document in the image falls within a predetermined ranges of ratios of width to height. If the document image falls within the predetermined ranges of ratios, the image passes the test. An overall confidence value can be assigned to different ratio values or ranges of ratio values in order to determine whether the image should be rejected.

According to some embodiments, the mobile device can be used to capture an image of a check in addition to the remittance coupon. A second aspect ratio test is provided for two-sided documents, such as checks, where images of both sides of the document may be captured. According to some embodiments, a remittance coupon can also be a two-sided document and images of both sides of the document can be captured. The second aspect ratio test compares the aspect ratios of images that are purported to be of the front and back of a document to determine whether the user has captured images of the front and back of the same document according to an embodiment. The Aspect Ratio Test could be applied to various types two-sided or multi-page documents to determine whether images purported to be of different pages of the document have the same aspect ratio.

Figure 40:
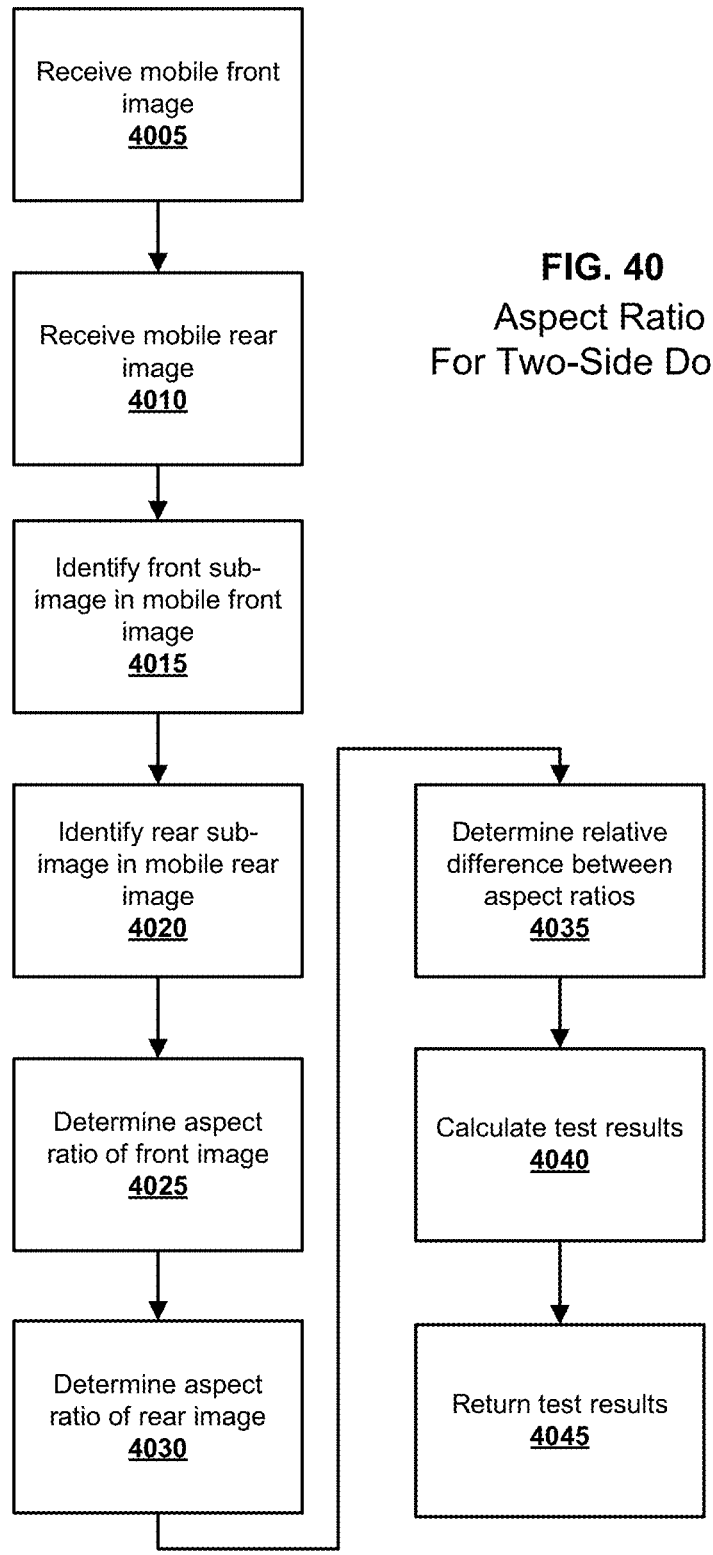
FIG. 40 illustrates a method for executing an Aspect Ratio Test according to an embodiment.

FIG. 40 illustrates a method for executing an Aspect Ratio Test for two-sided documents according to an embodiment. In the embodiment illustrated in FIG. 40, the test is directed to determining whether the images purported to be of the front and back side of a document have the same aspect ratio. However, the method could also be used to test whether two images purported to be from a multi-page and/or multi-sided document have the same aspect ratio.

A front mobile image is received (step 4005) and a rear mobile image is received (step 4010). The front mobile image is supposed to be of the front side of a document while the rear mobile image is supposed to be the back side of a document. If the images are really of opposite sides of the same document, the aspect ratio of the document subimages should match. Alternatively, images of two different pages of the same document may be provided for testing. If the images are really of pages of the same document, the aspect ratio of the document subimages should match.

The preprocessing module 2110 can process the front mobile image to generate a front-side snippet (step 4015) and can also process the back side image to generate a back-side snippet (step 4020).

The aspect ratio of the front-side snippet is then calculated (step 4025). In an embodiment, the AspectRatioFront=Width/Height, where Width=the width of the front-side snippet and Height=the height of the front-side snippet.

The aspect ratio of the back-side snippet is then calculated (step 4030). In an embodiment, the AspectRatioBack=Width/Height, where Width=the width of the back-side snippet and Height=the height of the back-side snippet.

The relative difference between the aspect ratios of the front and rear snippets is then determined (step 4035). According to an embodiment, the relative difference between the aspect ratios can be determined using the following formula:

$$RelDiff=1000*abs(AspectRatioFront-AspectRatioBack)/max(AspectRatioFront,AspectRatioBack)$$

A test result value is then calculated based on the relative difference between the aspect ratios (step 4040). According to an embodiment, the test value V can be computed using the formula V=1000−RelDiff.

The test results are then returned (step 4045). As described above, the test result value is provided to the test execution module 2130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may have mixed up the front and back images from two different checks having two different aspect ratios. If the document image fails the test, the user can be prompted to verify that the images purported to be the front and back of the same document (or images of pages from the same document) really are from the same document.

Front-as-Rear Test

Figure 41:
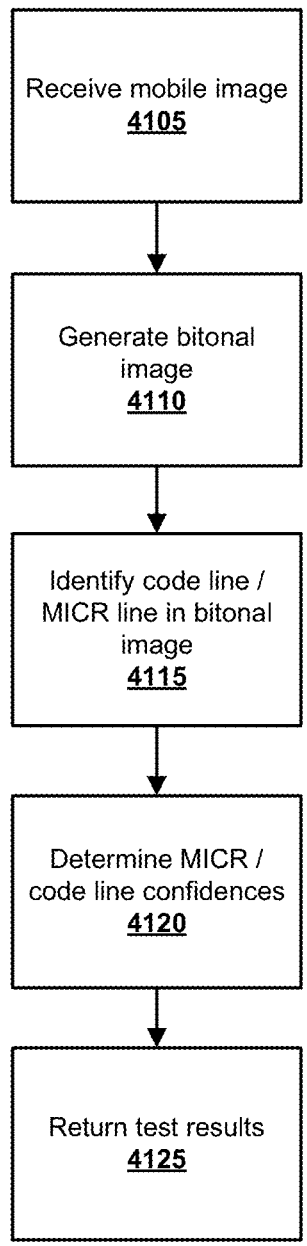
FIG. 41 illustrates a method for performing a front-as-rear test on a mobile document image.

FIG. 41 illustrates a method for performing a front-as-rear test on a mobile document image. The front-as-rear test can be adapted to be performed on images purported to be the front and back side of a check. The Front-as-Rear Test can be used to determine whether an image that is purported to be the back of a check is actually an image of the front of the document according to an embodiment. The Front-as-Rear Test can be used in embodiments where a user has captured an image of a check to be processed as payment for a remittance.

The Front-as-Rear Test is a check specific Boolean test. The test returns a value of 0 if an image fails the test and a value of 1000 if an image passes the test. According to an embodiment, if a MICR-line is identified on what is purported to be an image of the back of the check, the image will fail the test and generate a test message that indicates that the images of the check have been rejected because an image of the front of the check was mistakenly passed as an image of the rear of the check. Similarly, if a code line is identified on what is purported to be the back of a remittance coupon, the image will fail the test and generate a test message that indicates that the images of the remittance coupon have been rejected because an image of the front of the coupon was mistakenly passed as an image of the rear of the coupon.

An image of the rear of the document is received (step 4105) and the image is converted to a bitonal snippet by preprocessor 110 of the MDIPE 2100 (step 4110). The image may be accompanied by data indicating whether the image is of a check or of a remittance coupon. In some embodiments, no identifying information may be provided, and the testing will be performed to identify either a code line or an MICR line in the bitonal snippet.

If the document is identified as a check, a MICR recognition engine can then be applied to identify a MICR-line in the bitonal snippet (step 4115). Various techniques for identifying the MICR-line in an image of a check are described above. The results from the MICR recognition engine can then be normalized to the 0-1000 scale used by the mobile IQA tests, and the normalized value compared to a threshold value associated with the test. If the document is identified as a remittance coupon, a code line recognition engine can be applied to identify the code line in the image of the coupon. Various techniques for identifying the code line in an image of a remittance coupon are described above, such as identifying text in OCR-A font within the image. If no information as to whether the image to be tested includes a check or a remittance coupon is provided, both MICR-line and code line testing can be performed to see if either a MICR-line or code line can be found. In an embodiment, the highest normalized value from the MICR-line and code line tests can be selected for comparison to the threshold.

According to an embodiment, the test threshold can be provided as a parameter to the test along with the with mobile document image to be tested. According to an embodiment, the threshold used for this test is lower than the threshold used in the MICR-line Test described above.

If the normalized test result equals or exceeds the threshold, then the image includes an MICR-line or code line and the test is marked as failed (test result value=0), because a MICR-line or code line was identified in what was purported to be an image of the back of the document. If the normalized test result is less than the threshold, the image did not include a MICR line and the test is marked as passed (test result value=1000). The test results value is then returned (step 4125).

Form Identification of Remittance Coupon

According to an embodiment, the remittance processing step 525 of the method illustrated in FIG. 5 can include a form identification step. In the form identification step, the mobile remit server attempts to identify a coupon template that is associated with a remittance coupon that has been captured in a mobile image. A coupon template identifies the layout of information on a remittance coupon. This layout information can be used improve data capture accuracy because data should be in known locations on the remittance coupon.

Form identification can be used in a number of different situations. For example, form identification can be used for frequently processed remittance coupons. If the layout of the coupon is known, capturing the data from known locations on the coupon can be more accurate than relying on a dynamic data capture technique to extract the data from the coupon.

Form identification can also be used for remittance coupons that lack keywords that can be used to identify key data on the coupon. For example, if a coupon does not include an "Account Number" label for an account number field, the dynamic data capture may misidentify the data in that field. Misidentification can become even more likely if multiple fields have similar formats. Form identification can also be used for coupons having ambiguous data. For example, a remittance coupon might include multiple fields that include data having a similar format. If a remittance coupon includes multiple unlabeled fields having similar formats, dynamic data capture may be more likely to misidentify the data. However, if the layout of the coupon is known, the template information can be used to extract data from known positions in the image of the remittance coupon.

Form identification can also be used for remittance coupons having a non-OCR friendly layout. For example, a remittance coupon may use fonts where identifying keywords and/or form data is printed using a non-OCR friendly font. Form identification can also be used to improve the chance of correctly capturing remittance coupon data when a poor quality image is presented. A poor quality image of a remittance coupon can make it difficult to locate and/or read data from the remittance coupon.

Figure 42:
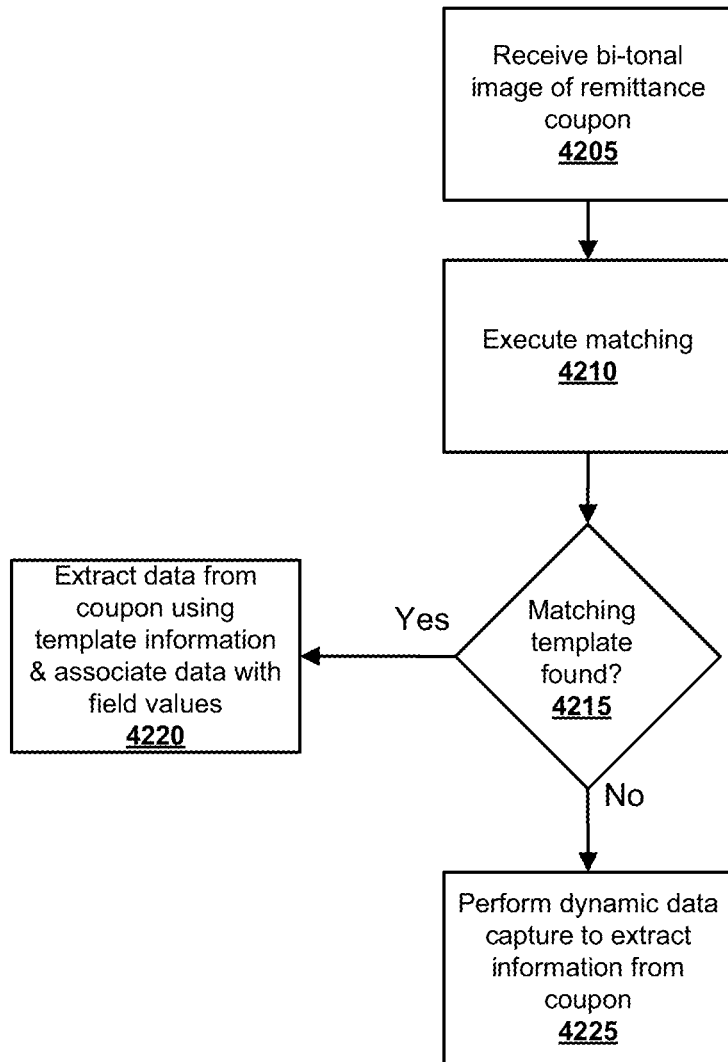
FIG. 42 is a flow chart of a method for processing an image of a remittance coupon using form identification according to an embodiment.

FIG. 42 is a flow chart of a method for processing an image of a remittance coupon using form identification according to an embodiment. The method of FIG. 42 can be executed in step 525 of the method illustrated in FIG. 5. According to an embodiment, the mobile remittance server can include a remittance processing module that can be configured to perform step 525 of the method illustrated in FIG. 5 and the method illustrated in FIG. 42. The method begins with receiving a binarized document image of a remittance coupon (step 4205). Various techniques for creating a bi-tonal subimage from a mobile image are provided above. For example, step 625 of FIG. 6 describes binarization of a document subimage. FIG. 10 also illustrates a method binarization of an image that can be used to generate a bi-tonal image from a mobile image of a remittance coupon.

A matching algorithm is executed on the bi-tonal image of the remittance coupon in an attempt to find a matching remittance coupon template (step 4210). According to an embodiment, the remittance server 310 can include a remittance template data store that can be used to store templates of the layouts of various remittance coupons. Various matching techniques can be used to match a template to an image of a coupon. For example, optical character recognition can be used to identify and read text content from the image. The types of data identified and the positions of the data on the remittance coupon can be used to identify a matching template. According to another embodiment, a remittance coupon can include a unique symbol or identifier that can be matched to a particular remittance coupon template. In yet other embodiments, the image of the remittance coupon can be processed to identify "landmarks" on the image that may correspond to labels and/or data. In some embodiments, these landmarks can include, but are not limited to positions of horizontal and/or vertical lines on the remittance coupon, the position and/or size of boxes and/or frames on the remittance coupon, and/or the location of pre-printed text. The position of these landmarks on the remittance coupon may be used to identify a template from the plurality of templates in the template data store. According to some embodiments, a cross-correlation matching technique can be used to match a template to an image of a coupon. In some embodiments, the positions of frames/boxes found on image and/or other such landmarks, can be cross-correlated with landmark information associated a template to compute the matching confidence score. If the confidence score exceeds a predetermined threshold, the template is considered to be a match and can be selected for use in extracting information from the mobile image of the remittance coupon.

A determination is made whether a matching template has been found (step 4215). If no matching template is found, a dynamic data capture can be performed on the image of the remittance coupon (step 4225). Dynamic data capture is described in detail below and an example method for dynamic data capture is illustrated in the flow chart of FIG. 43.

If a matching template is found, data can be extracted from the image of the remittance coupon using the template (step 4220). The template can provide the location of various data, such as the code line, amount due, account holder name, and account number. Various OCR techniques can be used to read text content from the locations specified by the template. Because the location of various data elements are known, ambiguities regarding the type of data found can be eliminated. The mobile remittance server 310 can distinguish between data elements having a similar data type.

Dynamic Data Capture

Figure 43:
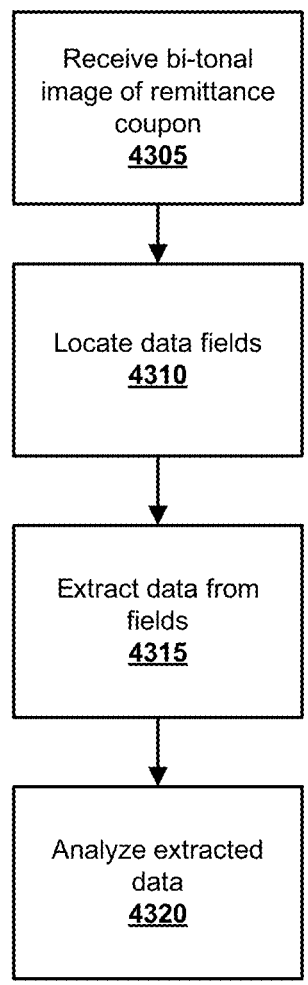
FIG. 43 is a flow chart of a method for processing an image of a remittance coupon using form identification according to an embodiment.

FIG. 43 is a flow chart of a dynamic data capture method for extracting data from an image of a remittance coupon using form identification according to an embodiment. The method of FIG. 42 can be executed in step 525 of the method illustrated in FIG. 5. The dynamic data capture method illustrated in FIG. 43 can be used if a form ID for identifying a particular format of remittance coupon is not available. The form ID can be provided by a user or in some instance be read from the image of the remittance coupon. The method illustrated in FIG. 43 can also be used if the form ID does not match any of the templates stored in the template data store. The method begins with receiving a binarized document image of a remittance coupon (step 4305). Various optical character recognition techniques can then be used to locate and read fields from the bitonal image of the remittance coupon (step 4310). Some example OCR techniques are described below. Once data fields have been located the data can be extracted from the image of the remittance coupon (step 4315). In some embodiments, steps 4310 and 4315 can be combined into a single step where the field data is located and the data extracted in a combined OCR step. Once the data has been extracted from the image, the data can be analyzed to identify what data has been extracted (step 4320). The data can also be analyzed to determine whether any additional data is required in order to be able to process the remittance coupon.

According to an embodiment, a keyword-based detection technique can be used to locate and read the data from the bitonal image of the remittance coupon in steps 4310 and 4315 of the method of FIG. 43. The method uses a set of field-specific keywords to locate fields of interest in the bitonal image. For example, the keywords "Account Number," "Account #," "Account No.," "Customer Number," and/or other variations can be used to identify the account number field on the remittance coupon. According to an embodiment, text located proximate to the keyword can be associated with the keyword. For example, text located within a predetermined distance to the right of or below an "Account Number" keyword could be identified and extracted from the image using OCR and the text found in this location can then be treated as the account number. According to an embodiment, the distance and directions in relation to the keyword in which the field data can be located can be configured based on the various parameters, such as locale or language. The position of the keyword in relation to field that includes the data associated with the keyword could vary based on the language being used, e.g. written right to left versus left to right.

According to an embodiment, a format-based detection technique can be used to locate and read the data from the bitonal image of the remittance coupon in steps 4310 and 4315 of the method of FIG. 43. For example, an OCR technique can be used to recognize text in the image of the remittance coupon. A regular expression mechanism can then be applied to the text extracted from the bitonal image. A regular expression can be used to formalize the format description for a particular field, such as "contains 7-12 digits," "may start with 1 or 2 uppercase letters," or "contains the letter "U" in the second position." According to an embodiment, multiple regular expressions could be associated with a particular field, such as an account number, in order to increase the likelihood of a correct match.

According to yet another embodiment, a combination of keyword-based and format-based matching can be used to identify and extract field data from the bitonal image (steps 4310 and 4315). This approach can be particularly effective where multiple fields of the same or similar format are included on the remittance coupon. A combination of keyword-based and format-based matching can be used to identify field data can be used to disambiguate the data extracted from the bitonal image.

According to an embodiment, a code-line validation technique can be used to locate and read the data from the bitonal image of the remittance coupon in steps 4310 and 4315 of the method of FIG. 43. One or more fields may be embedded into the code-line, such as amount field 215 on the coupon shown in FIG. 2, which appears in the code line 205. While parsing the code line itself may be difficult, code-line characters can be cross-checked against fields recognized in other parts of the remittance coupon. According to an embodiment, in the event that a particular field is different from a known corresponding value in the code line, the value in the code line can be selected over the field value because the code-line recognition may be more reliable.

According to an embodiment, a cross-validation technique can be used where multiple bitonal images of a remittance coupon have been captured, and one or more OCR techniques are applied the each of the bitonal images, such as the techniques described above. The results from the one or more OCR technique from one bitonal image can be compared to the results of OCR techniques applied one or more other bitonal images in order to cross-validate the field data extracted from the images. If conflicting results are found, a set of results having a higher confidence value can be selected to be used for remittance processing.

Exemplary Hardware Embodiments

Figure 44:
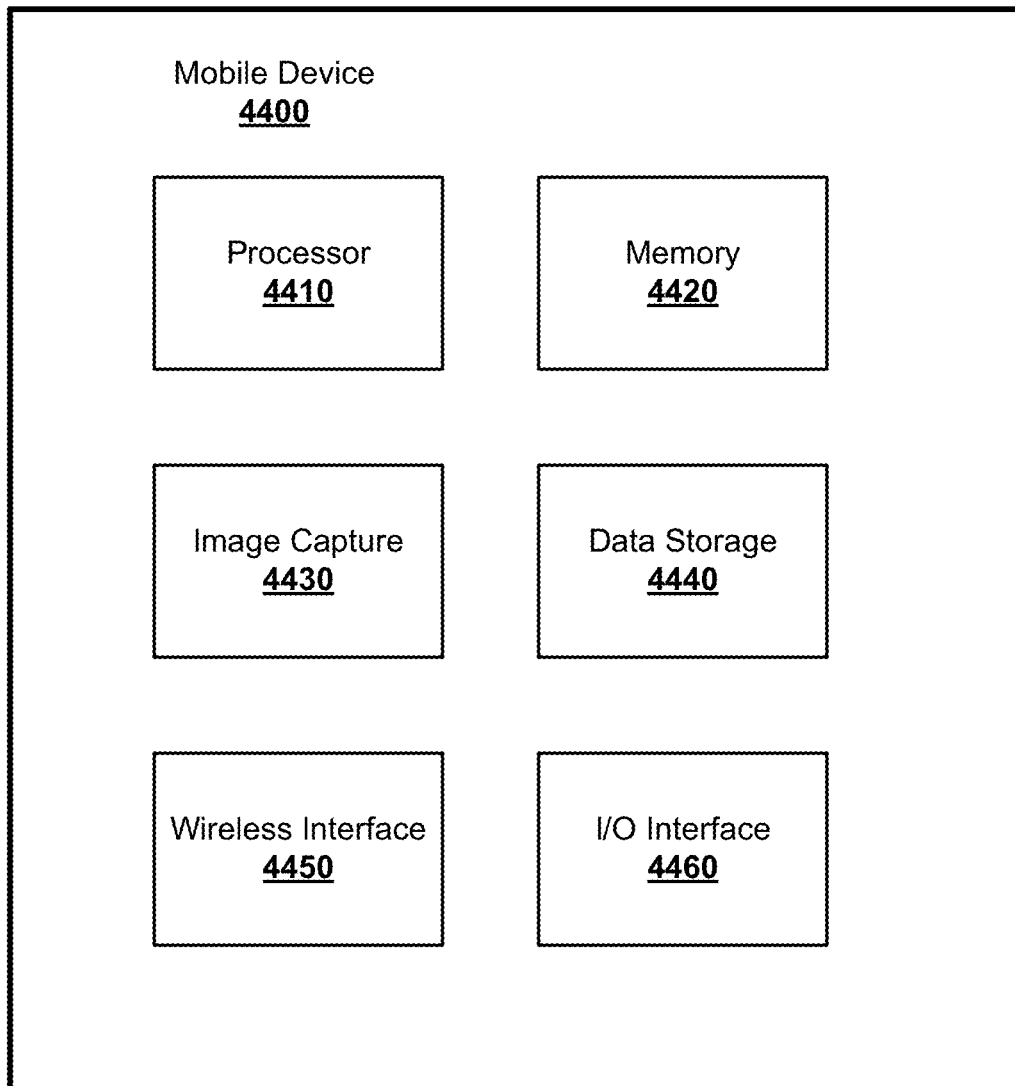
FIG. 44 is a block diagram of various functional elements of a mobile device that can be used with the various systems and methods described herein according to an embodiment.

FIG. 44 is an exemplary embodiment of a mobile device 4400 according to an embodiment. Mobile device 4400 can be used to implement the mobile device 340 of FIG. 3. Mobile device 4200 includes a processor 4410. The processor 4410 can be a microprocessor or the like that is configurable to execute program instructions stored in the memory 4420 and/or the data storage 4440. The memory 4420 is a computer-readable memory that can be used to store data and or computer program instructions that can be executed by the processor 4410. According to an embodiment, the memory 4420 can comprise volatile memory, such as RAM and/or persistent memory, such as flash memory. The data storage 4440 is a computer readable storage medium that can be used to store data and or computer program instructions. The data storage 4440 can be a hard drive, flash memory, a SD card, and/or other types of data storage.

The mobile device 4400 also includes an image capture component 4430, such as a digital camera. According to some embodiments, the mobile device 4400 is a mobile phone, a smart phone, or a PDA, and the image capture component 4430 is an integrated digital camera that can include various features, such as auto-focus and/or optical and/or digital zoom. In an embodiment, the image capture component 4430 can capture image data and store the data in memory 4220 and/or data storage 4440 of the mobile device 4400.

Wireless interface 4450 of the mobile device can be used to send and/or receive data across a wireless network. For example, the wireless network can be a wireless LAN, a mobile phone carrier's network, and/or other types of wireless network.

I/O interface 4460 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 4430 to the personal computer system.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 43. Various embodiments are described in terms of this example-computing module 1900. After reading this description, it will become apparent to a person skilled in the relevant art how to implement the invention using other computing modules or architectures.

Referring now to FIG. 43, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

ACH Enrollment

According to some embodiments, at least one of the mobile device 340 and the mobile remittance server 310 may include functionality for Automated Clearing House enrollment (ACH enrollment). ACH enrollment allows an originator (such as a gas company, a cable company, or an individual's employer) to directly debit or credit a receiver's bank account upon receiving written, verbal, or electronic authorization from the receiver along with the receiver's customer account number as well as a bank routing number. ACH transactions include a wide variety of transaction types, including direct deposit payroll and vendor payments made to a receiver's bank account, as well as consumer payments on insurance premiums, mortgage loans, and utility bill payments made by a receiver.

Figure 47:
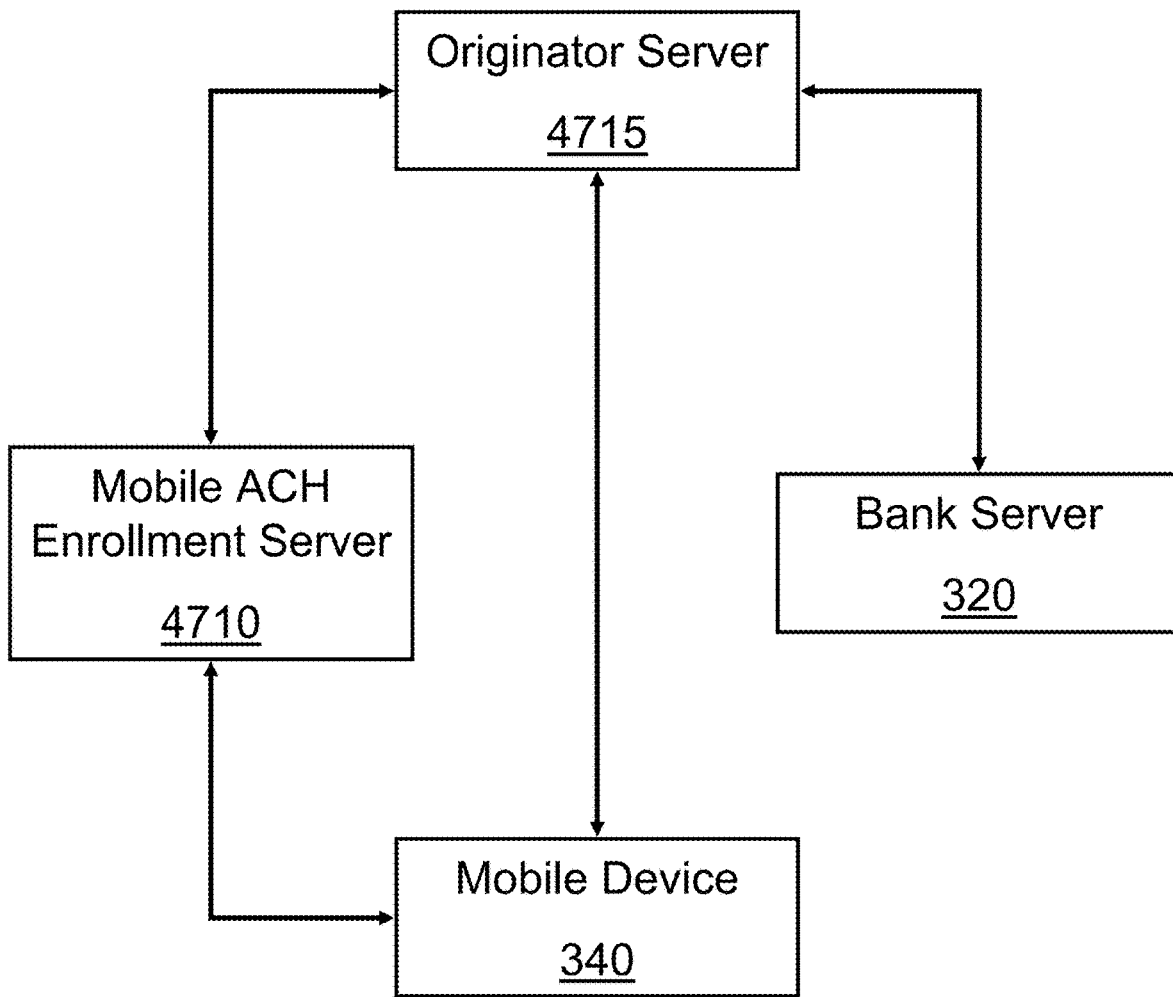
FIG. 47 is a block diagram illustrating an exemplary network for ACH enrollment according to an embodiment.

FIG. 47 is a block diagram illustrating an exemplary system for ACH enrollment according to one embodiment of the present invention. In one embodiment, an application running on a mobile device 340 is initially launched by a user of the mobile device. The application provides the user with an option to set up ACH enrollment with one or more originators by interacting with a graphical user interface (GUI) which may provide lists of different types of originators to pick from. In one embodiment, the originator may be determined from the content of the captured image, for example when the user takes a picture of a car insurance statement that they want to pay. The application may be resident within the mobile device 340 or accessible to the user from a remote computing device via a connected network (such as a local area network or over the Internet). In some embodiments, the remote computing device may be a mobile ACH Enrollment Server 4710 or a Mobile Remittance Server 310 (see FIG. 3).

Once an originator has been selected, the application may then prompt the user to provide an authorization for ACH enrollment with a particular originator (as discussed below with respect to FIG. 48). The authorization may be provided by having the user check a box on a particular GUI next to a statement indicating that the user is authorizing the setup of an ACH, or the user may have to provide an electronic signature by typing or signing their name in a signature field. In addition, the application may provide for audio or video-capture of the user's authorization by a camera and microphone on the mobile device 340.

The application will then require that the user capture an image of a document that contains account information needed to set up the ACH. The document may be a check bearing both the user's account and bank routing numbers, and the image of the check may be blank or voided; or in the alternative, be a cleared or canceled check. In additional embodiments described further herein, the document may be a bill or statement from a particular originator (such as the car insurance statement) or even an identification card such as a driver's license with the user's personal information. According to some embodiments, the captured image may then be preprocessed and transmitted to the mobile ACH Enrollment Server 4710 for image correction as well as image quality assurance (IQA). Any of the techniques already described above for image correction or IQA may be used for these purposes according to embodiments of the present invention.

If the processed image passes the specified IQA tests, data relevant to enrolling in an ACH service may then be extracted from the processed image (e.g., customer account and bank routing number). Otherwise, if IQA fails, the Mobile ACH Enrollment Server 4710 (and/or the application) may send a message to the user requesting a new image of the document.

In some embodiments, upon successful extraction of the relevant data from the processed image, the Mobile ACH Enrollment Server 4710 may open a network connection with an originator server 4715. A server address of the originator server 4715 may be locatable within an originator lookup table resident within the mobile ACH Enrollment Server 4710, or it may be determined at the mobile ACH Enrollment Server 4710 based upon user input. The Mobile ACH Enrollment Server 4710 may then forward the authorization and relevant data—such as the customer account number and bank routing number—to the originator server 4715. This data may then be used to enable the originator server 4715 to perform ACH transactions authorized by the user. The originator server 4715 may then interface with a bank server 320 associated with the customer account and bank routing number in order to perform the authorized ACH transactions.

In other embodiments, the Mobile ACH Enrollment Server 4710 may set a flag or otherwise mark an editable portion of a file (such as a file containing at least the data of the processed image) upon performing one or more successful image quality assurance tests and data extraction from the processed image. Alternatively, the Mobile ACH Enrollment Server 4710 may create a special file type indicating that such quality assurance tests and data extraction were successfully performed. This data may then be sent by the application to the originator server 4715 along with the user's authorization, customer account number, and bank routing number. The originator server 4715 may then perform the authorized ACH transactions by interfacing with a bank server 320 associated with the user's customer account and bank routing number.

Figure 48:
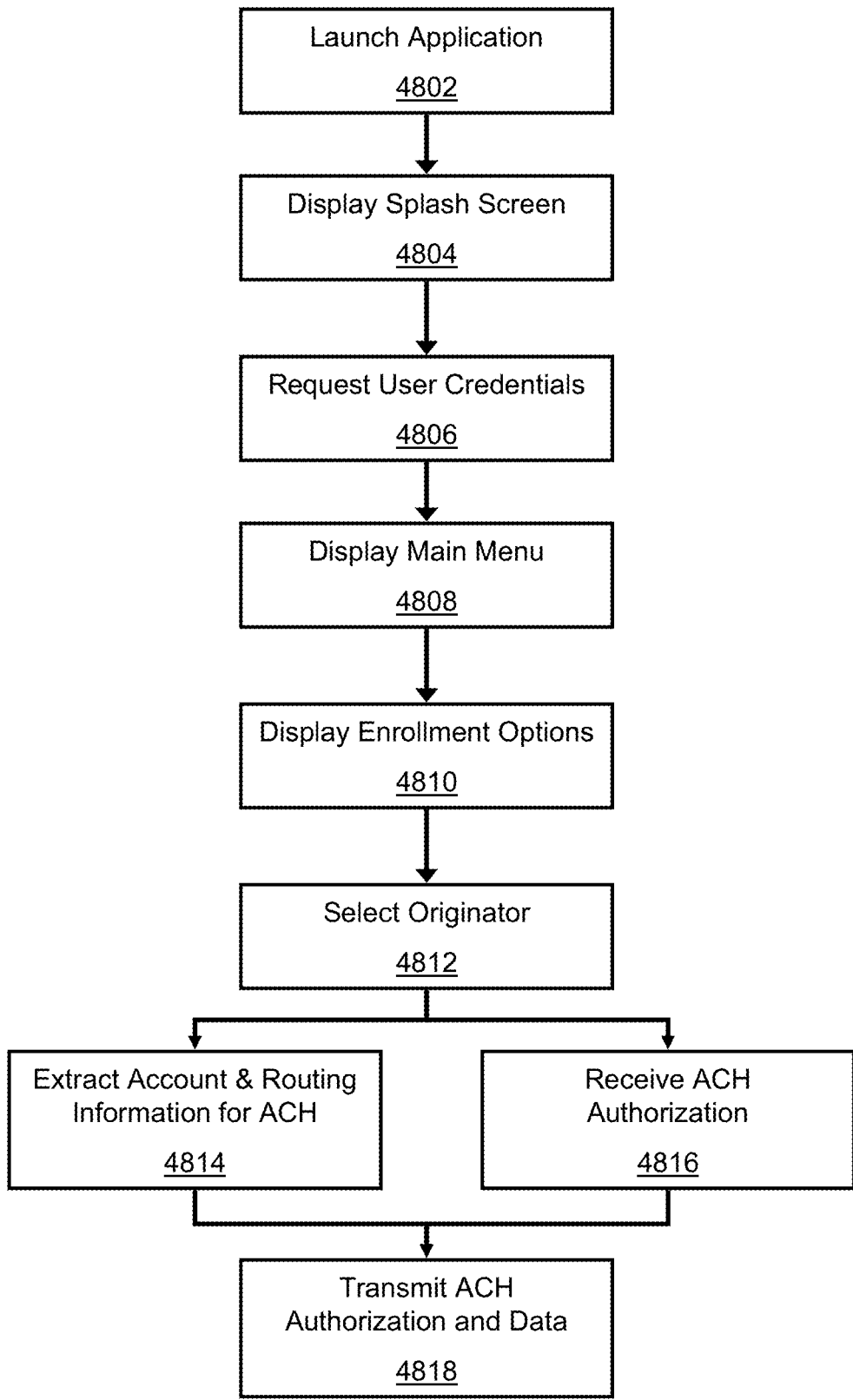
FIG. 48 is a flow diagram illustrating an exemplary method of configuring ACH enrollment with a designated originator according to an embodiment.

FIG. 48 is a flow diagram illustrating an exemplary method of configuring ACH enrollment with a designated originator according to one embodiment of the present invention. At block 4802, the relevant application supporting ACH enrollment is launched by a user with the mobile device. A splash screen may be displayed at block 4804, and the user may then be prompted to input that user's security credentials (such as a login and password) at block 4806. Once the user has successfully logged in, a main menu will be displayed to the user at block 4808. An option to set up ACH enrollment with respect to one or more originators is then presented to the user at block 4810. In some embodiments, this option may be accessible to the user via the main menu. In other embodiments, this option may be accessible from a sub-menu that is accessible to the user from the main menu.

When the option to set up ACH enrollment is selected by the user at block 4810, the application may then prompt the user to select an originator at block 4812. If ACH enrollment has already been configured for one or more originators, the user may be given the option to update ACH enrollment information associated with some or all of those originators. Otherwise, the user will be given the option to add ACH enrollment information for a new originator.

In some embodiments, the user may select an originator from a pre-populated or downloadable list of supported originators. In other embodiments, a special type of originator information file (i.e., containing information readable by the application) may be received by the user from an external memory source (such as CD, DVR, or flash memory), or otherwise this data may be downloadable from a remote location (such as a website associated with the originator). In still other embodiments, the user may have the option to manually enter data associated with a specific originator. Additionally, as previously mentioned, the originator may be identified by extracting data from a mobile-captured image of a document for which ACH enrollment is desired, such as a car insurance billing statement.

At block 4814, once the originator has been successfully selected, the user will be prompted to capture an image of a document with data relevant to ACH enrollment, such as a check, a billing or remittance statement, a driver's license, identification card, etc. The document may include a customer account number and bank routing number, a customer address, an originator name and address, and other pertinent information about the customer and originator.

The user will also be prompted to provide some form of ACH authorization at block 4816. ACH authorization may be electronic, oral, or written. Thus, according to some embodiments, an electronic form requesting ACH authorization may be completed by a user (e.g., via keyboard/mouse/touch input) and subsequently submitted to the requesting application. In other embodiments, a menu may prompt the user to sign ACH authorization forms and mail them to a designated mailing address. In still other embodiments, the application may receive a file from the user containing audio and/or video content that contains a user's verbal authorization for allowing a specific originator to perform ACH transactions. Conventional authentication mechanisms known in the art may be used to verify that the user granting ACH authorization is a user who has the power to perform bank transactions with respect to the specified bank account. Authorization may also be completed by requesting that the user capture an image of their driver's license, as this is a form of identification that the user normally has in their possession and which is difficult to fake. An image of the driver's license includes a plurality of personal information about the user which can be used to verify the user's identity, including an address, phone number, driver's license number, etc.

In some embodiments, a customer account number and a bank routing number may be directly provided to the requesting application via one or more peripheral input devices (e.g., a keyboard, mouse, and/or touch input device). In some embodiments, this information may be persistently stored in one or more computing devices order to expedite the completion of future ACH enrollment entries by the user (thereby enabling the same account and routing information to be loaded when configuring ACH transactions with other originators). Optionally, conventional cryptographic techniques may be used to secure the data so that it is not accessible by unauthorized individuals.

In other embodiments, the user may be prompted to provide the application with a captured image (e.g., a picture of a blank or voided check) bearing the customer's account and bank routing numbers. The captured image may then be preprocessed and transmitted to the mobile ACH Enrollment Server 4710 for image correction as well as image quality assurance. Any of the techniques described above for image correction or image quality assurance may be used for these purposes according to embodiments of the present invention. If the processed image passes the specified image quality assurance tests, the relevant data may then be extracted from the processed image (e.g., customer account and bank routing number). Otherwise, the Mobile ACH Enrollment Server 4710 (and/or the application) may send a message to the user requesting a new image of a check.

The ACH enrollment authorization, along with the data containing the customer account and bank routing numbers may then be provided to an originator server 4715 at block 4818. The originator server 4715 can then use this data to set up the authorized ACH transactions, and the process then ends.

Figure 49:
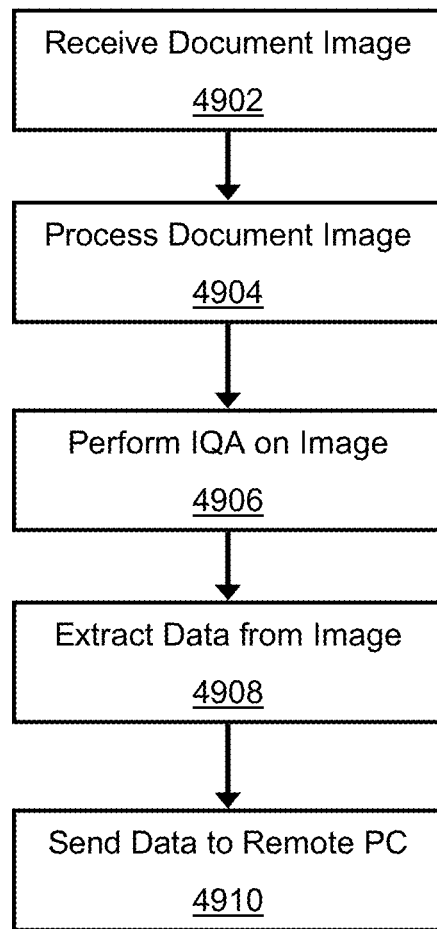
FIG. 49 is a flow diagram illustrating an exemplary method of processing an image of a check for ACH enrollment according to an embodiment.

FIG. 49 is a flow diagram illustrating an exemplary method of processing an image of a document for ACH enrollment according to one embodiment of the present invention. At block 4902, a document image is received, such as an image of a check, remittance statement, driver's license, etc. In one embodiment, the document image may be received from the mobile device 340 after being captured by a camera built into the mobile device 340 or connected with the mobile device (either wired or wirelessly). The document image may be stored within memory of the mobile device 340 prior to being received by the ACH enrollment system. In other embodiments, the document image may be received at a computing device that is remote from the mobile device 340 (e.g., at a mobile ACH Enrollment Server 4710 or at a mobile remittance server 310).

At block 4904, the document image may then be processed in any of the manners already described above to correct image defects such as skewing, warping, lighting, etc. In some embodiments, image quality assurance tests may then be run on the processed image. This is shown at block 4906.

If any or all of the image quality assurance tests fail, the user may be requested to provide a new image of a check. Otherwise, if the processed image passes the designated image quality assurance tests, data from the processed image may then be extracted at block 4908. This data may include, for example, a customer account number and a bank routing number. Any of the techniques mentioned above for extracting data from an image may be used for this purpose.

The data may then be forwarded to a remote computing device such as the originator server 4715 at block 4910. In one embodiment, if the image processing and IQA tests are performed at the mobile device 340, the data may be extracted at the mobile device 340 and then forwarded to the ACH enrollment server 4710. Optionally, an authorization for ACH enrollment may be forwarded to the remote computing device along with the data. The process then ends.

FIGS. 50A-50D illustrate one embodiment of a graphical user interface (GUI) of the mobile ACH enrollment system and method as has been described above. In FIG. 50A, a main menu 5002 is provided which explains the Mobile ACH Enrollment process and provides a button 5004 for capturing information. In FIG. 50B, the user is provided with three buttons corresponding to three options for capturing ACH enrollment data, including capturing check information 5006, capturing bill (remittance) information 5008 or capturing driver's license information 5010. One or more of these documents may be required for enrollment in ACH. Once a selection is made, a real-time mobile image capture interface 5012 is provided in FIG. 50C, as has been described above, which allows the user to use a camera on the mobile device to capture an image of the document or documents needed for ACH enrollment. Once the image has been captured, the relevant image processing and IQA tests are performed, after which data is extracted from the document and then displayed to the user in a verification screen 5014 shown in FIG. 50D, so the user can verify whether the captured information is correct.

FIGS. 51A-51D illustrate the workflow of ACH enrollment where an image of a check is captured and the checking account number and routing number are extracted from the image of the check. The GUI in FIG. 51A shows the primary real-time mobile image capture interface 5012 after the user has selected the capture check information button 5006 (see FIG. 50B). This first image capture interface 5012 shows a real-time image of the field of view of the image capture device—such as a camera—on the mobile device. A rectangle 5016 may appear as a border within the interface 5012 to help the user align all four edges of a check 5018 with the rectangle 5016 in order to capture an image of the check 5018 at an appropriate distance, angle and skew that will allow the data to be easily read. The rectangle 5016 may be color-coded on its border or within the borders (using shading) to help the user determine when the check 5018 is within the boundaries of the rectangle 5016 or when other image settings are met. For example, the rectangle 5016 may be red when the check is not within the boundaries and green when it is within the boundaries. Instructions may be provided on the real-time mobile image capture interface 5012 to instruct the user on how to capture a high-quality image. In this embodiment, the instructions 5020 tell the user simply to "Align the check in the rectangle," although much more detailed instructions may be provided. In one embodiment, the mobile image capture interface 5012 may have a separate button which the user can select to display a list of instructions and tips for capturing a high-quality image of the check.

In FIG. 51B, the mobile image capture interface 5012 is illustrated with the check 5018 properly aligned within the boundaries of the rectangle 5016, such that the rectangle will turn to a green color. In this embodiment, once the boundaries of the check are within the rectangle and other parameters are met, the application automatically activates the camera to capture an image of the check. In another embodiment, the image may only be captured when a button is depressed, either on the GUI or on the phone. Once the image is captured, it may be displayed to the user on the mobile image capture interface 5012 so the user can review it. If the image appears to be of good quality, the user can accept the captured image and select the "Done" button 5020.

Once the image has been accepted by the user, it is processed for further correction and then run through the IQA tests, as described above. If the image passes the IQA tests, the data, or content of the check is extracted to obtain the fields from the check needed to enroll the user in ACH. In FIG. 51C, a personal information confirmation screen 5022 is displayed with fields 5024 corresponding to the user's name and address that were extracted from the check 5018. If the information is correct, the user may select the "Done" button 5020 and proceed. If the information is incorrect, the user can select one or more of the fields 5024 and manually correct the information. An account confirmation screen 5026 may then be displayed with fields 5024 confirming the bank account number and routing number from the check 5018. Again, the user may manually correct the data in these fields if it is incorrect. Otherwise, the user selects the "done" button 5020.

In FIG. 51E, a completion screen 5028 is displayed to the user indicating that the extracted data has been transmitted to the originating server 4715 and the ACH service has been setup for future debits or deposits with the user's bank account.

FIGS. 52A-52D illustrate the ACH enrollment process for capturing an image of a remittance coupon for a service provider, such as a phone bill, cable bill, insurance bill, etc. The process is similar to that described in FIGS. 51A-51E, except that different information is captured from the remittance coupon than would be captured from the check. The capture of a remittance coupon may be used in conjunction with the capturing of a check as part of an overall ACH enrollment process of identifying the originator, identifying the receiver and then setting up an ACH service between the two for debit or deposit with the receiver's bank account. As will be described below with regard to FIGS. 53A-53H, capturing an image of the user's driver's license will also help in the overall ACH enrollment process by verifying the identity of the user.

Figure 52A:
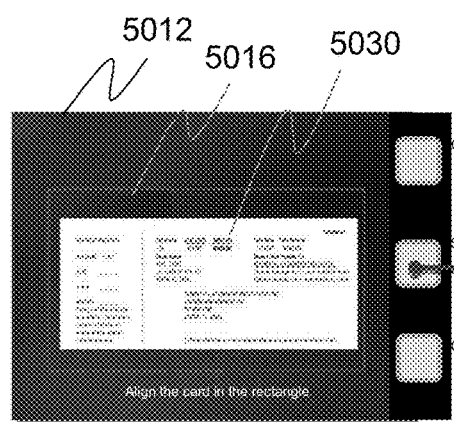
FIGS. 52A-52D illustrate the ACH enrollment process for capturing an image of a remittance coupon for a service provider, such as a phone bill, cable bill, insurance bill, etc.
Figure 52B:
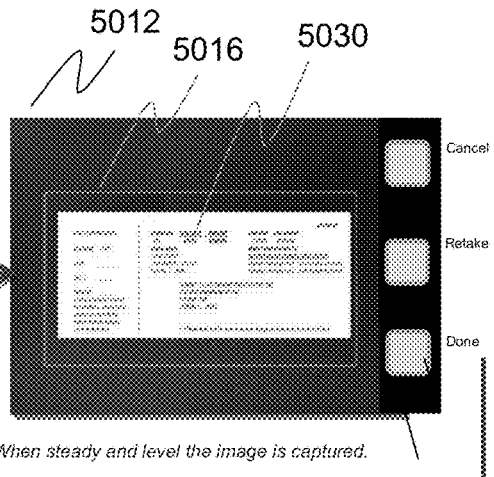
Figure 52C:
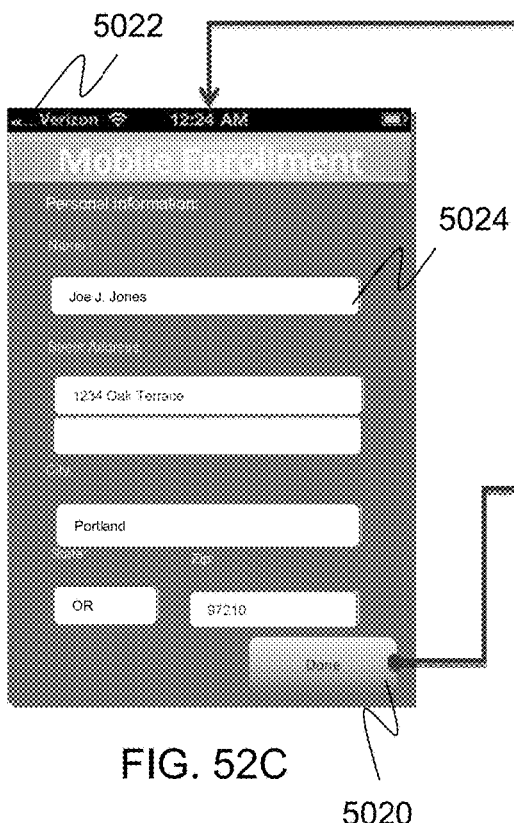
Figure 52D:
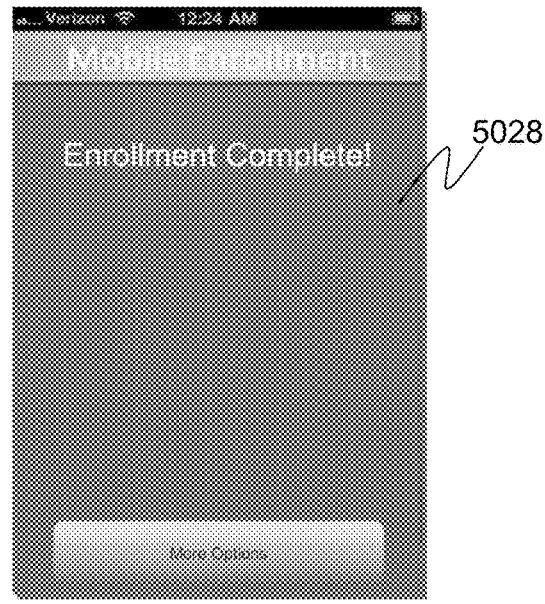

In FIGS. 52A and 52B, the mobile image capture interface 5012 is displayed with an image of a remittance coupon 5030. When the remittance coupon is contained within the rectangle 5016 and other image settings are met, such as the tilt and distance of the mobile device from the remittance coupon, an image is captured and then processed to correct any geometric defects and perform IQA tests. If the image is sufficient, the data from the remittance coupon is extracted and displayed in the personal information confirmation screen 5022 in FIG. 52C. If the information is correct, the user may select "Done" 5020, and the completion screen 5028 may be displayed.

Figures 53A, 53B, 53C:
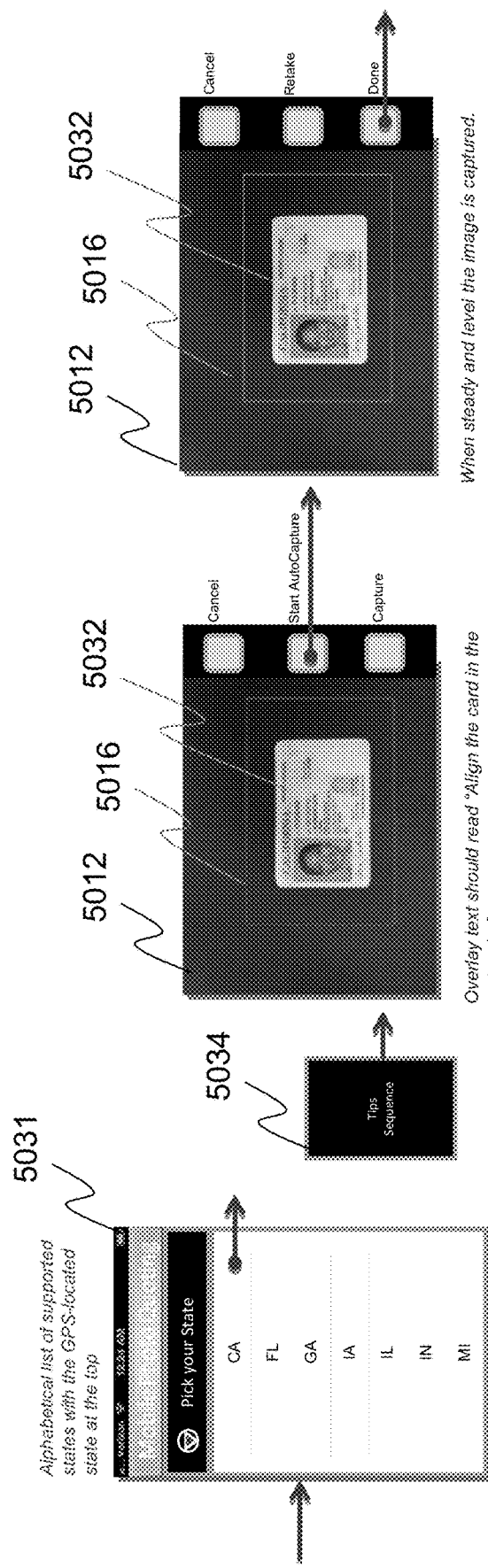
FIGS. 53A-53H illustrate one embodiment of a driver's license capture process of capturing and extracting data from a mobile-captured image of a driver's license.
Figures 53D, 53E, 53F:
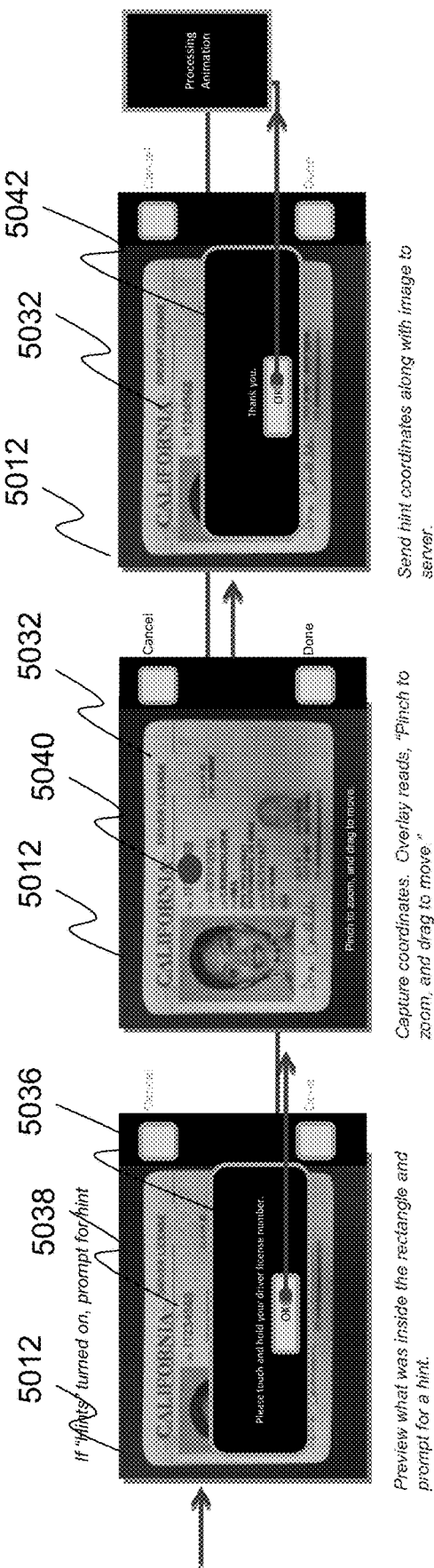
Figure 53G:
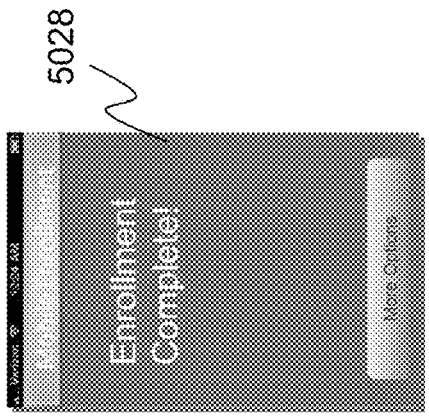
Figure 53H:
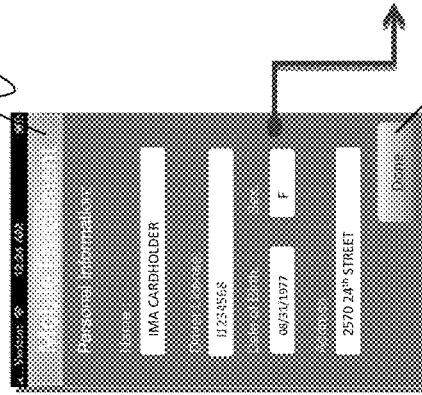

FIGS. 53A-53H illustrate one embodiment of an identification card capture process of capturing and extracting data from a mobile-captured image of an identification card, such as a driver's license. In FIG. 53A, the user is first presented with a state selection menu 5031 to select the state which issued their driver's license. The state selection menu 5031 will help narrow down the format, size and type of driver's license that the user has, which will help in creating a properly-sized alignment rectangle 5016 and in extracting data from particular locations on the image of the driver's license which is known to contain specific data. Once the user selects their state, the mobile image capture interface 5012 is displayed with the rectangle 5016 for aligning a driver's license 5032, in FIG. 53B. In one embodiment, a tips sequence 5034 may be displayed before the mobile image capture interface 5012 to provide tips to the user for capturing a high quality image of the driver's license 5032. Once the driver's license 5032 has been properly aligned, the image of the driver's license 5032 can be captured, as shown in FIG. 53C. The image of the driver's license is then processed and then tested with the various IQA tests, after which the data from the driver's license is extracted and displayed to the user in the personal information confirmation screen 5022 shown in FIG. 53G. If the information is correct, the user selects "Done" 5020 and the completion screen 5028 is displayed, as shown in FIG. 53H.

In one embodiment illustrated in FIGS. 53D-F, additional methods for extracting data from the driver's license 5032 are provided. In this method, the user is prompted to provide hints to the data extraction units as to the location of certain fields on the driver's license. As shown in FIG. 53D, a message 5036 may be displayed to the user instructing the user to touch (or select with an input device) a certain field on the image of the driver's license, such as the driver's license number. In FIG. 53E, the message 5036 disappears and the user selects the requested field 5038 on the image where the driver's license number is found. In one embodiment, a visual indicator of the location selected by the user is displayed, such as a circle 5040. As shown in FIG. 53F, a confirmation message 5042 may be displayed indicating that the field has been located or otherwise indicating that the hinting process is complete. The process may continue for one or more fields as needed. Once the hinting process is complete, the image of the driver's license is processed and quality tested, and the data from the driver's license is then extracted. However, the extraction process may be completed with higher confidence as to the manually-selected fields since the optical character recognition software can be programmed to scan the selected area for a specific format of data that corresponds to a driver's license number. The extracted data is then displayed to the user for confirmation in FIG. 53G, as has already been described.

The hinting process may be useful when the system cannot determine certain aspects of the image or certain basic fields, such as if the user does not know which state issued their driver's license.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising using at least one hardware processor to:
   receive at least one image of a document captured by a mobile device of a user, wherein receiving the at least one image of the document comprises
      displaying a real-time image of a field of view of a camera of the mobile device in a graphical user interface,
      displaying an alignment rectangle over the real-time image of the field of view, and
      automatically activating the camera to capture the at least one image of the document when the document is aligned with the alignment rectangle and without the user depressing a button;
   determine an identity of at least one first entity;
   extract automated clearing house (ACH) enrollment data for a second entity from the at least one image;
   receive authorization from the user; and
   use the ACH enrollment data to enroll the second entity in an ACH process with the at least one first entity, wherein the enrollment in the ACH process authorizes one or more future ACH transactions between the at least one first entity and the second entity based on the received authorization.

2. The method of claim 1, wherein the document comprises a remittance coupon.

3. The method of claim 1, wherein the document comprises a check.

4. The method of claim 1, wherein the document comprises a blank or voided check.

5. The method of claim 1, wherein the at least one image comprises a first image of a remittance coupon and a second image of a check.

6. The method of claim 1, wherein the document comprises a drivers license.

7. The method of claim 1, wherein the ACH enrollment data comprise a bank routing number and a bank account number.

8. The method of claim 1, wherein determining the identity of the at least one first entity comprises receiving the identity of the at least one first entity via a graphical user interface.

9. The method of claim 1, wherein determining the identity of the at least one first entity comprises extracting the identity of the at least one first entity from the at least one image.

10. The method of claim 1, further comprising using the at least one hardware processor to, prior to using the ACH enrollment data to enroll the second entity in the ACH process with the at least one first entity, generate a graphical user interface with one or more inputs that are prepopulated with the ACH enrollment data.

11. The method of claim 10, further comprising using the at least one hardware processor to, prior to using the ACH enrollment data to enroll the second entity in the ACH process with the at least one first entity and after generating the graphical user interface, receive a modification of the ACH enrollment data via the one or more inputs of the graphical user interface.

12. The method of claim 1, further comprising using the at least one hardware processor to set a color of the alignment rectangle according to a status of alignment between the alignment rectangle and the document in the real-time image of the field of view.

13. The method of claim 1, further comprising using the at least one hardware processor to, after capturing the at least one image of the document, display the at least one image of the document in the graphical user interface with a first input for accepting the at least one image of the document and a second input for retaking the at least one image of the document.

14. The method of claim 1, wherein extracting the ACH enrollment data comprises:
   performing optical character recognition (OCR) on the at least one image to produce text content; and
   searching for one or more keywords or regular expressions in the text content.

15. The method of claim 1, wherein extracting the ACH enrollment data comprises:
   identifying a template that corresponds to the document; and
   extracting the ACH enrollment data according to the template.

16. The method of claim 1, further comprising executing an image focus test on the at least one image that scores an amount of focus in the at least one image.

17. The method of claim 1, further comprising using the at least one hardware processor to correct the at least one image.

18. A system comprising:
   at least one hardware processor; and
   software configured to, when executed by the at least one hardware processor,
      receive at least one image of a document captured by a mobile device of a user, wherein receiving the at least one image of the document comprises
         displaying a real-time image of a field of view of a camera of the mobile device in a graphical user interface,
         displaying an alignment rectangle over the real-time image of the field of view, and
         automatically activating the camera to capture the at least one image of the document when the document is aligned with the alignment rectangle and without the user depressing a button,
      determine an identity of at least one first entity,
      extract automated clearing house (ACH) enrollment data for a second entity from the at least one image,
      receive authorization from the user, and
      use the ACH enrollment data to enroll the second entity in an ACH process with the at least one first entity, wherein the enrollment in the ACH process authorizes one or more future ACH transactions between the at least one first entity and the second entity based on the received authorization.

19. A non-transitory computer-readable medium having instructions stored thereon, wherein the instructions, when executed by a processor, cause the processor to:
   receive at least one image of a document captured by a mobile device of a user, wherein receiving the at least one image of the document comprises
      displaying a real-time image of a field of view of a camera of the mobile device in a graphical user interface,
      displaying an alignment rectangle over the real-time image of the field of view, and automatically activating the camera to capture the at least one image of the document when the document is aligned with the alignment rectangle and without the user depressing a button;

determine an identity of at least one first entity;

extract automated clearing house (ACH) enrollment data for a second entity from the at least one image;

receive authorization from the user; and use the ACH enrollment data to enroll the second entity in an ACH process with the at least one first entity, wherein the enrollment in the ACH process authorizes one or more future ACH transactions between the at least one first entity and the second entity based on the received authorization.

\* \* \* \* \*